(12) United States Patent
Hara et al.

(10) Patent No.: US 11,668,987 B2
(45) Date of Patent: Jun. 6, 2023

(54) DISPLAY DEVICE AND METHOD FOR MANUFACTURING DISPLAY DEVICE

(71) Applicant: SHARP KABUSHIKI KAISHA, Sakai (JP)

(72) Inventors: Yoshihito Hara, Sakai (JP); Hajime Imai, Sakai (JP); Masaki Maeda, Sakai (JP); Tatsuya Kawasaki, Sakai (JP); Yoshiharu Hirata, Sakai (JP); Tohru Daitoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 118 days.

(21) Appl. No.: 17/243,111

(22) Filed: Apr. 28, 2021

(65) Prior Publication Data

US 2021/0349340 A1    Nov. 11, 2021

(30) Foreign Application Priority Data

May 7, 2020    (JP) .............................. JP2020-082075

(51) Int. Cl.

| G02F 1/1362 | (2006.01) |
|---|---|
| G02F 1/1343 | (2006.01) |
| G02F 1/1333 | (2006.01) |
| G02F 1/1345 | (2006.01) |
| G02F 1/1368 | (2006.01) |

(52) U.S. Cl.
CPC ...... *G02F 1/13629* (2021.01); *G02F 1/13439* (2013.01); *G02F 1/13458* (2013.01); *G02F 1/133345* (2013.01); *G02F 1/134363* (2013.01); *G02F 1/136227* (2013.01); *G02F 1/136231* (2021.01); *G02F 1/136295* (2021.01); *G02F 1/1368* (2013.01)

(58) Field of Classification Search
CPC ........... G02F 1/13629; G02F 1/136295; G02F 1/136231; G02F 1/133345
See application file for complete search history.

(56) References Cited

U.S. PATENT DOCUMENTS

| 2016/0188040 | A1 | 6/2016 | Shin et al. | |
|---|---|---|---|---|
| 2017/0269739 | A1 | 9/2017 | Shin et al. | |
| 2019/0237696 | A1* | 8/2019 | Iizuka | ................. H01L 51/5253 |
| 2020/0012137 | A1* | 1/2020 | Hirato | .................. G02F 1/1339 |

FOREIGN PATENT DOCUMENTS

JP    2016-126778 A    7/2016

* cited by examiner

*Primary Examiner* — Lucy P Chien
(74) *Attorney, Agent, or Firm* — ScienBiziP, P.C.

(57) ABSTRACT

A display device includes a switching element having a pixel connection portion, a first insulating film having a first pixel contact hole formed therein so as to be in a place overlapping at least a part of the pixel connection portion, a common line, an intermediate electrode composed of the same conducting film as the common line, disposed to overlap the first pixel contact hole, and connected to the pixel connection portion, a common electrode not connected to the intermediate electrode but connected to the common line, a second insulating film having a second pixel contact hole formed therein so as to be in a place overlapping at least a part of the intermediate electrode, and a pixel electrode disposed so that at least a part of the pixel electrode overlaps the second pixel contact hole.

15 Claims, 42 Drawing Sheets

FIG.2
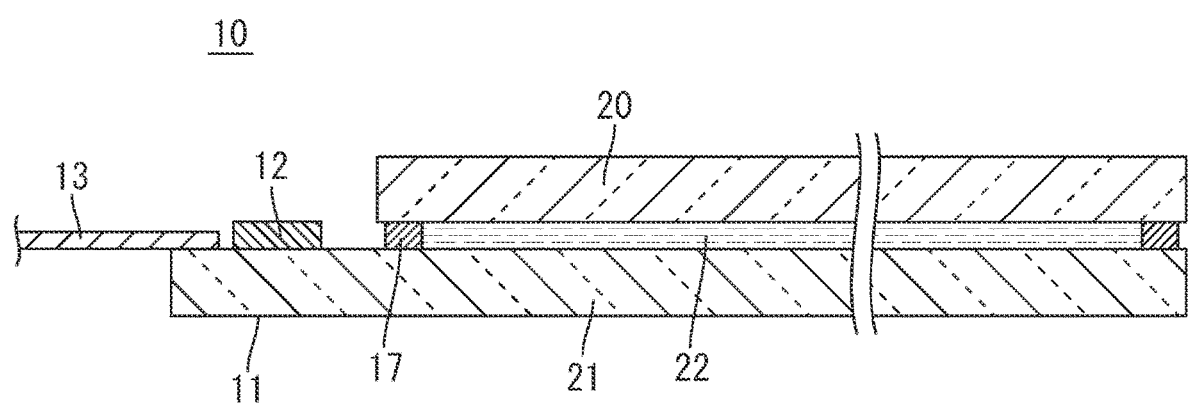
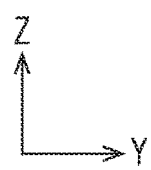

DISPLAY DEVICE AND METHOD FOR MANUFACTURING DISPLAY DEVICE

BACKGROUND

1. Field

The present disclosure relates to a display device and a method for manufacturing a display device.

2. Description of the Related Art

A conventionally known example of a display device with an integrated touch sensor is described in Japanese Unexamined Patent Application Publication No. 2016-126778. The display device with an integrated touch sensor described in Japanese Unexamined Patent Application Publication No. 2016-126778 includes: a gate line and a data line that are arrayed so as to intersect each other; a pixel electrode; a plurality of touch and common electrodes; and 1-1, 1-2, 2-1, and 2-2 routing wires. The 1-1 and 2-2 routing wires are connected to a 1-1 touch and common electrode disposed in an odd-numbered column of an odd-numbered row and a 2-2 touch and common electrode disposed in an even-numbered column of an even-numbered row, respectively, and are arrayed in a first direction or a second direction. The 1-2 and 2-1 routing wires are connected to a 1-2 touch and common electrode disposed in an even-numbered column of an odd-numbered row and a 2-1 touch and common electrode disposed in an odd-numbered column of an even-numbered row, respectively, and are arrayed in the second direction or the first direction.

In Japanese Unexamined Patent Application Publication No. 2016-126778, the 1-1 and 2-2 routing wires and the 1-2 and 2-1 routing wires are in such a relationship as to be orthogonal to each other; therefore, in this configuration, an insulating film is sandwiched between the 1-1 and 2-2 routing wires and the 1-2 and 2-1 routing wires for the avoidance of a short circuit between the 1-1 and 2-2 routing wires and the 1-2 and 2-1 routing wires. This tends to increase the number of photomasks that are used in manufacturing and, accordingly, tends to increase the number of steps involved in manufacturing.

It is desirable to reduce the number of photomasks that are used in manufacturing and reduce the number of steps.

SUMMARY

According to an aspect of the disclosure, there is provided a display device including: a switching element having a pixel connection portion; a first insulating film, disposed at a higher layer than the pixel connection portion, that has a first pixel contact hole formed therein so as to be in a place overlapping at least a part of the pixel connection portion; a common line disposed at a higher layer than the first insulating film; an intermediate electrode composed of a conducting film which is identical to that of which the common line is composed, disposed to overlap the first pixel contact hole, and connected to the pixel connection portion; a common electrode disposed at a higher layer than the common line, not connected to the intermediate electrode, and connected to the common line; a second insulating film, disposed at a higher layer than the common electrode, that has a second pixel contact hole formed therein so as to be in a place overlapping at least a part of the intermediate electrode; and a pixel electrode disposed at a higher layer than the second insulating film and disposed so that at least a part of the pixel electrode overlaps the second pixel contact hole.

According to an aspect of the disclosure, there is provided a method for manufacturing a display device, the method including: forming a pixel connection portion of a switching element; forming a first insulating film at a higher layer than the pixel connection portion and forming a first pixel contact hole in a place in the first insulating film overlapping the pixel connection portion; forming a common line at a higher layer than the first insulating film and forming an intermediate electrode disposed to overlap the first pixel contact hole and composed of a conducting film which is identical to that of which the common line is composed; forming, at a higher layer than the common line, a common electrode that is not connected to the intermediate electrode but is connected to the common line; forming a second insulating film at a higher layer than the common electrode and forming a second pixel contact hole in a place in the second insulating film overlapping at least a part of the intermediate electrode; and forming a pixel electrode at a higher layer than the second insulating film so that at least a part of the pixel electrode overlaps the second pixel contact hole.

BRIEF DESCRIPTION OF THE DRAWINGS

FIG. 2 is a schematic cross-sectional view of the liquid crystal panel;

DESCRIPTION OF THE EMBODIMENTS

Embodiment 1

Figure 1:
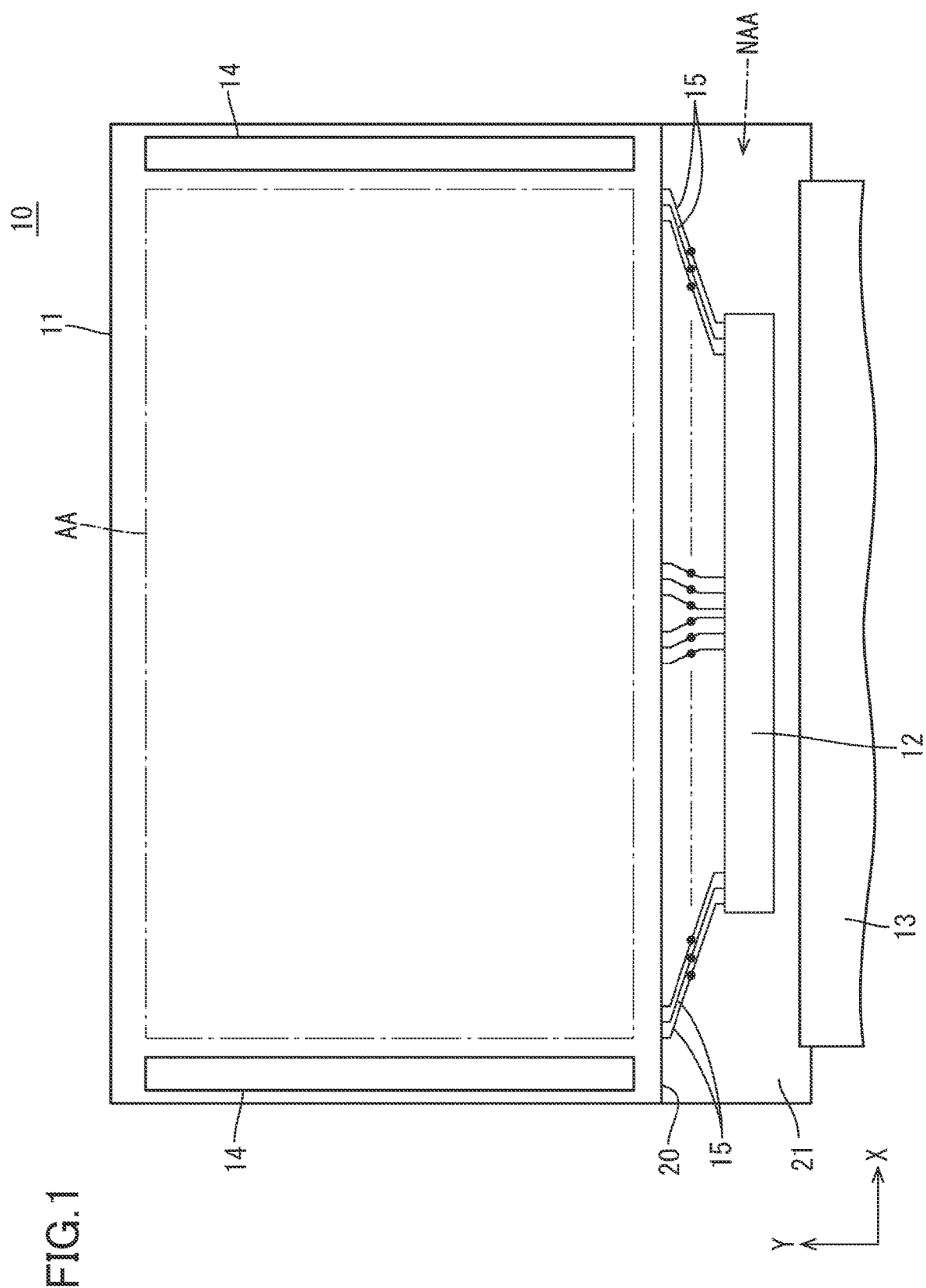
FIG. 1 is a plan view of a liquid crystal panel or other components of a liquid crystal display device according to Embodiment 1.

Embodiment 1 is described with reference to FIGS. 1 to 30B. A liquid crystal panel (display device, display panel) 11 of a liquid crystal display device 10 is illustrated. It should be noted that some of the drawings show an X axis, a Y axis, and a Z axis, and are drawn such that each of the axes extends in a corresponding one of the directions shown in the drawings. Further, FIGS. 2, 4, 5, 7, 8, 10, 12, 13A to 30B act as a benchmark for a vertical direction, show front side up, and show back side down.

FIG. 1 is a plan view of the liquid crystal panel 11 or other components of the liquid crystal display device 10. As shown in FIG. 1, the liquid crystal display device 10 includes at least the liquid crystal panel 11, which has a horizontally long square shape and is configured to display an image, and a backlight device (lighting device) serving as an external light source that illuminates the liquid crystal panel 11 with light for use in display. This liquid crystal panel 11 has its short side direction corresponding to a Y-axis direction, has its long side direction corresponding to an X-axis direction, and has its thickness direction corresponding to a Z-axis direction. The backlight device is disposed at the back of (i.e. at the rear of) the liquid crystal panel 11, and has a light source (such as an LED) that emits white light, an optical member that converts light from the light source into planar light by imparting an optical effect to the light, or other components.

As shown in FIG. 1, a central part of a display surface of the liquid crystal panel 11 serves as a display area (area surrounded by dot-and-dash lines in FIG. 1) AA in which an image is displayed. Meanwhile, a frame-shaped outer peripheral portion of the display surface of the liquid crystal panel 11 surrounding the display area AA serves as a non-display area NAA in which no image is displayed. The liquid crystal panel 11 includes a pair of substrates 20 and 21 bonded together. One of the two substrates 20 and 21 located at the front (i.e. facing forward) is a CF substrate (counter substrate) 20, and one of the two substrates 20 and 21 located at the back (i.e. at the rear) is an array substrate 21. The CF substrate 20 and the array substrate 21 each include a glass substrate and various types of films stacked over an inner surface of the glass substrate. It should be noted that a polarizing plate is attached to an outer surface of each of the two substrates 20 and 21.

As shown in FIG. 1, the array substrate 21 has its short side dimension longer than a short side dimension of the CF substrate 20, and is bonded to the CF substrate 20 in such a manner that one end of the array substrate 21 meets one end of the CF substrate 20 in the short side direction (Y-axis) direction. Accordingly, the other end of the array substrate 21 in the short side direction does not overlap the other end of the CF substrate 20, and at the other end of the array substrate 21, a driver (signal supply unit) 12 and a flexible substrate (signal transmission unit) 13 are mounted. The driver 12 includes an LSI chip having a drive circuit inside, is mounted on the array substrate 21 by COG (chip on glass), and processes various signals that are transmitted by the flexible substrate 13. The flexible substrate 13 includes a substrate made of an insulating and flexible synthetic resin material (such as polyimide resin) and a large number of wiring patterns (not illustrated) formed over the substrate, has one end connected to the array substrate 21, and has the other end connected to an external control substrate (signal supply source). Various signals that are supplied from the control substrate are transmitted to the liquid crystal panel 11 via the flexible substrate 13.

In the non-display area NAA of the array substrate 21, as shown in FIG. 1, a pair of gate circuit units 14 are provided in such a manner that the display area AA is interposed between the gate circuit units 14 on both sides of the display area AA in the X-axis direction. Each of the gate circuit units 14 supplies a scanning signal to the after-mentioned gate line 26, and is monolithically provided in the array substrate 21. In a part of the non-display area NAA of the array substrate 21 between the display area AA and the driver 12 in the Y-axis direction, a lead wire 15 extended from the aftermentioned source line 27 into the non-display area NAA is provided. The lead wire 15 is connected to an end of the source line 27 facing the driver 12 and a terminal portion 16 (see FIG. 9) disposed in an mounting area of the driver 12, and transmits, to the source line 27, a signal outputted from the driver 12.

FIG. 2 is a schematic cross-sectional view of the liquid crystal panel 11. As shown in FIG. 2, the liquid crystal panel 11 has a liquid crystal layer (medium layer) 22 filling an internal space between the two substrates 20 and 21 and containing liquid crystal molecules of a substance whose optical properties vary in the presence of the application of an electric field. The liquid crystal layer 22 is sealed with a seal 17 surrounding the internal space between the two substrates 20 and 21. The seal 17 is disposed in the non-display area NAA, and is formed in the shape of a square frame (endless ring) so as to be all around the internal space between the two substrates 20 and 21 on every side.

Figure 3:
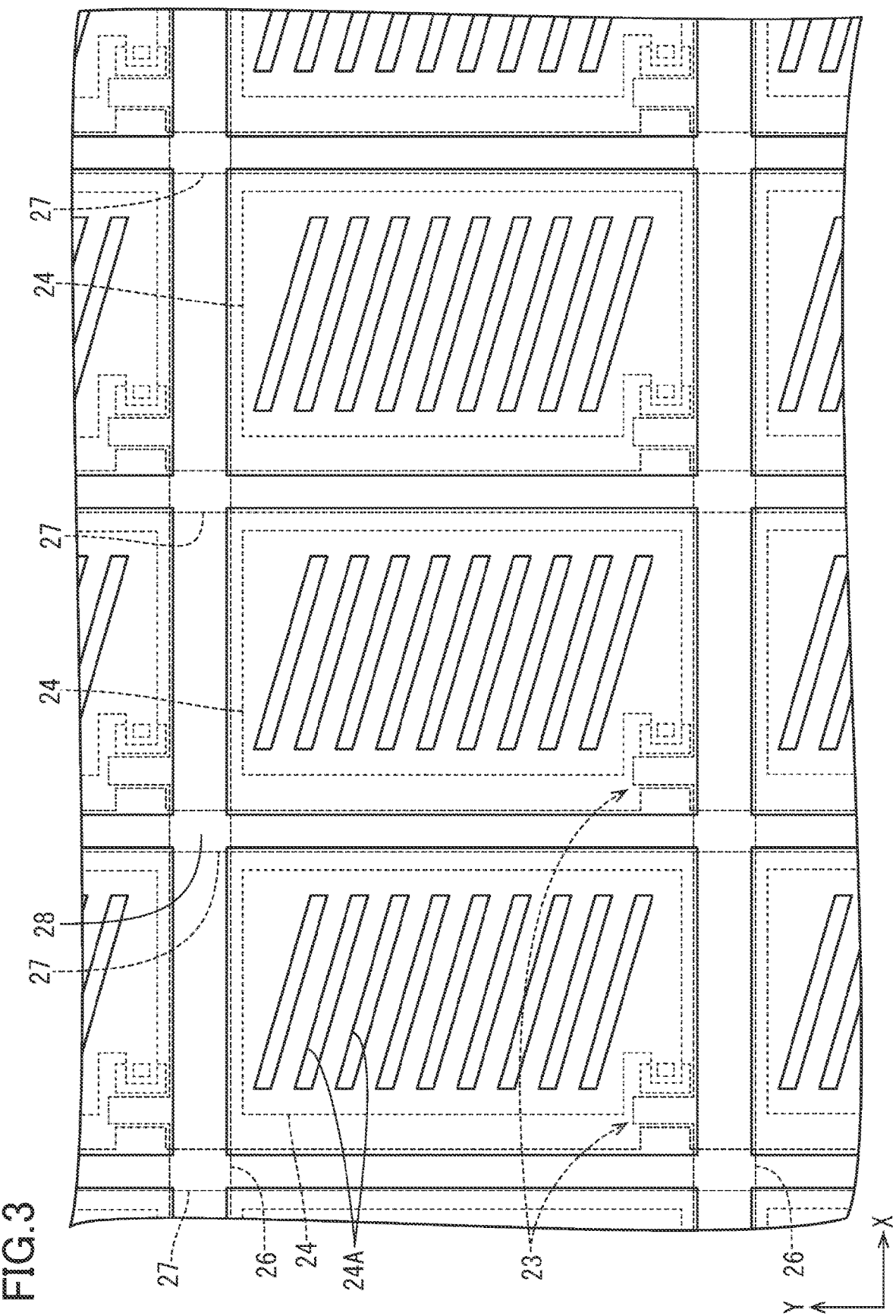
FIG. 3 is a plan view of an array substrate of the liquid crystal panel in a display area.

FIG. 3 is a plan view of the array substrate 21 of the liquid crystal panel 11 in the display area AA. As shown in FIG. 3, a TFT (switching element, thin-film transistor) 23 and a pixel electrode 24 are provided in a part of the display area AA over an inner surface of the array substrate 21 facing the CF substrate 20. A plurality of the TFTs 23 and a plurality of the pixel electrodes 24 are provided in a matrix (rows and columns) by being placed at spacings along the X-axis direction and the Y-axis direction. Around these TFTs 23 and these pixel electrodes 24, a plurality of the gate lines (scanning lines) 26 and a plurality of the source lines (image lines, data lines) 27, which are orthogonal to (i.e. intersect) each other, are disposed. While the gate line 26 extends along the X-axis direction, the source line 27 extends along the Y-axis direction. The gate line 26 and the source line 27 are connected to a gate electrode 23A and a source electrode 23B, respectively, of the TFT 23, and the pixel electrode 24 is connected to a drain electrode (pixel connection portion) 23C of the TFT 23. When driven in accordance with a scanning signal that is transmitted to the gate line 26, the TFT 23 is enabled to charge the pixel electrode 24 to an electric potential based on an image signal that is transmitted to the source line 27. The pixel electrode 24 has a vertically long rectangular shape as its planar shape. The pixel electrode 24 has a plurality of slits 24A bored therethrough. Further, in the display area AA of the CF substrate 20, a plurality of color filters are provided in places opposite each separate pixel electrode 24 of the array substrate 21. The color filters include color filters of three colors, namely R (red), G (green), and B (blue), repeatedly arranged in a predetermined order, that constitute pixels of each separate color (red pixels, green pixels, and blue pixels) together with the pixel electrodes 24. Three pixels, namely a red pixel, a green pixel, and a blue pixel, constitute a display pixel configured to display a predetermined tone of color. Further, for the avoidance of a mixture of colors, a light shield (black matrix) is formed between each color filter and the other.

Figure 4:
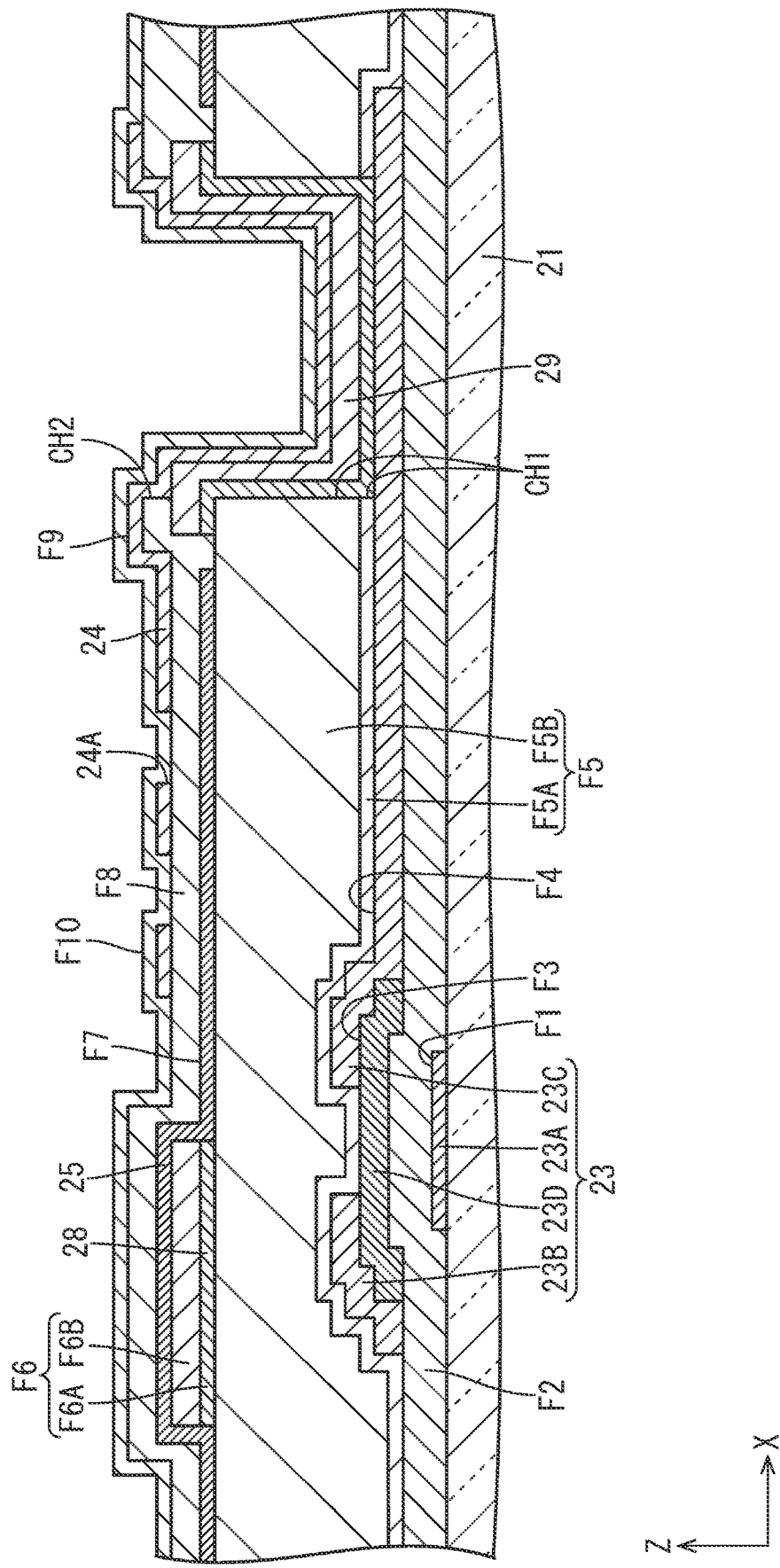
FIG. 4 is a cross-sectional view of a part of the array substrate near a TFT.

The various types of films stacked over the glass substrate of the array substrate 21 are described in detail here with reference to FIG. 4. FIG. 4 is a cross-sectional view of a part of the array substrate 21 near the TFT 23. Over the glass substrate of the array substrate 21, as shown in FIG. 4, at least a first conducting film (conducting film, lower layer conducting film) F1, a gate insulating film (lower layer insulating film) F2, a semiconductor film F3, a second conducting film (conducting film) F4, a first insulating film F5, a third conducting film (conducting film) F6, a fourth conducting film (conducting film) F7, a second insulating film F8, a fifth conducting film (conducting film) F9, and an alignment film F10 are stacked in this order from the bottom (i.e. from the glass substrate). The first conducting film F1 and the second conducting film F4 are each a single-layer film made of one type of metal material selected from among copper, titanium, aluminum, molybdenum, tungsten, and other metal materials or a laminated film or an alloy made of different types of metal material, and have electric conductivity. The first conducting film F1 constitutes the gate line 26, the gate electrode 23A of the TFT 23, or other components. The second conducting film F4 constitutes the source line 27, the source electrode 23B and the drain electrode 23C of the TFT 23, or other components. The semiconductor film F3 is a thin film made of a semiconductor material such as an oxide semiconductor or amorphous silicon, and constitutes the channel portion 23D of the TFT 23 or other components. The gate insulating film F2 is made of an inorganic material such as silicon nitride ($SiN_x$) or silicon oxide ($SiO_2$), and is sandwiched between the first conducting film F1 and the semiconductor film F3 and between the first conducting film F1 and the second conducting film F4 to insulate the first conducting film F1 from the semiconductor film F3 and the second conducting film F4. The first insulating film F5 has a laminated structure including an interlayer insulating film F5A at a lower layer and a planarizing film F5B at a higher layer. The interlayer insulating film F5A is made of an inorganic material which is similar to that of which the gate insulating film F2 is made. The planarizing film F5B is made of a photosensitive organic material such as PMMA (acrylic resin). The first insulating film F5 is sandwiched between the semiconductor film F3 and the third conducting film F6 and between the second conducting film F4 and the third conducting film F6 to insulate the semiconductor film F3 and the second conducting film F4 from the third conducting film F6. The first insulating film F5 has a first pixel contact hole CH1 bored therethrough so as to be in a place overlapping both the drain electrode 23C of the TFT 23 and the pixel electrode 24.

As shown in FIG. 4, the third conducting film F6 has a laminated structure including a transparent electrode film F6A at a lower layer and a metal film F6B at a higher layer. The transparent electrode film F6A is made of a transparent electrode material (such as ITO (indium tin oxide) or IZO (indium zinc oxide)). The metal film F6B is for example a single-layer film made of, for example, a metal material (such as copper). The third conducting film F6 constitutes a common line 28, an intermediate electrode 29, or other components. The common line 28 is connected to the after-mentioned common electrode 25, and supplies a common potential signal to the common electrode 25. The common line 28 is disposed to overlap the gate line 26 and the source line 27, and has a substantially grid shape when seen in plan view (see FIG. 3). The common line 28 can reduce a distribution of resistance of the common electrode 25 by being stretched substantially all over the display area AA. The intermediate electrode 29 is disposed to overlap the first pixel contact hole CH1 of the first insulating film F5, and is connected to the drain electrode 23C, which is at a lower layer than the intermediate electrode 29, through the first pixel contact hole CH1. As is the case with the transparent electrode film F6A of the third conducting film F6, the fourth conducting film F7 is made of a transparent electrode material and constitutes the common electrode 25 or other components. Accordingly, the fourth conducting film F7 can be said to be a common electrode transparent electrode film (first electrode transparent electrode film). The common electrode 25 is stacked directly at a higher layer than the common line 28 without an insulating film sandwiched therebetween, and is connected to substantially the whole area of the common line 28. The second insulating film F8 is made of an inorganic material which is similar to that of which the gate insulating film F2 and the interlayer insulating film F5A are made. The second insulating film F8 is sandwiched between the fourth conducting film F7 and the fifth conducting film F9 to insulate the fourth conducting film F7 from the fifth conducting film F9. The second insulating film F8 has a second pixel contact hole CH2 bored therethrough so as to be in a place overlapping the intermediate electrode 29. As is the case with the transparent electrode film F6A and the fourth conducting film F7, the fifth conducting film F9 is made of a transparent electrode material and constitutes the pixel electrode 24 or other components. Accordingly, the fifth conducting film F9 can be said to be a pixel electrode transparent electrode film (second electrode transparent electrode film). The pixel electrode 24 has a part disposed to overlap the second pixel contact hole CH2, and the part is connected to the intermediate electrode 29, which is at a lower layer than the part, through the second pixel contact hole CH2. In this way, the drain electrode 23C of the TFT 23 and the pixel electrode 24 are electrically connected to each other via the intermediate electrode 29, which is located in between the drain electrode 23C of the TFT 23 and the pixel electrode 24. The alignment film F10 is made of an alignment film material such as polyimide, and is solidly formed so as to extend all over at least the display area AA.

Note here that as shown in FIG. 4, the common electrode 25 is solidly formed so as to extend all over at least the display area AA, and is disposed at a lower layer than the pixel electrode 24 to wholly overlap the pixel electrode 24 via the second insulating film F8. The common electrode 25 is supplied with a common potential signal by the common line 28, and is thereby kept at a common potential (reference potential). When the TFT 23 is driven and the pixel electrode 24 is accordingly charged to an electric potential based on an image signal that is transmitted to the source line 27, a potential difference is generated between the pixel electrode 24 and the common electrode 25. Then, between the common electrode 25 and opening edges of the slits 24A in the pixel electrode 24, a fringe field (oblique field) containing a component acting parallel to a board surface of the array substrate 21 and a component acting in a direction normal to the board surface of the array substrate 21 is generated. Accordingly, this fringe field can be utilized to control an alignment state of the liquid crystal molecules contained in the liquid crystal layer 22, so that a predetermined display is done in accordance with this alignment state of the liquid crystal molecules. That is, the liquid crystal panel 11 according to the present embodiment is in an operation mode called "FFS (fringe field switching) mode".

Figure 5:
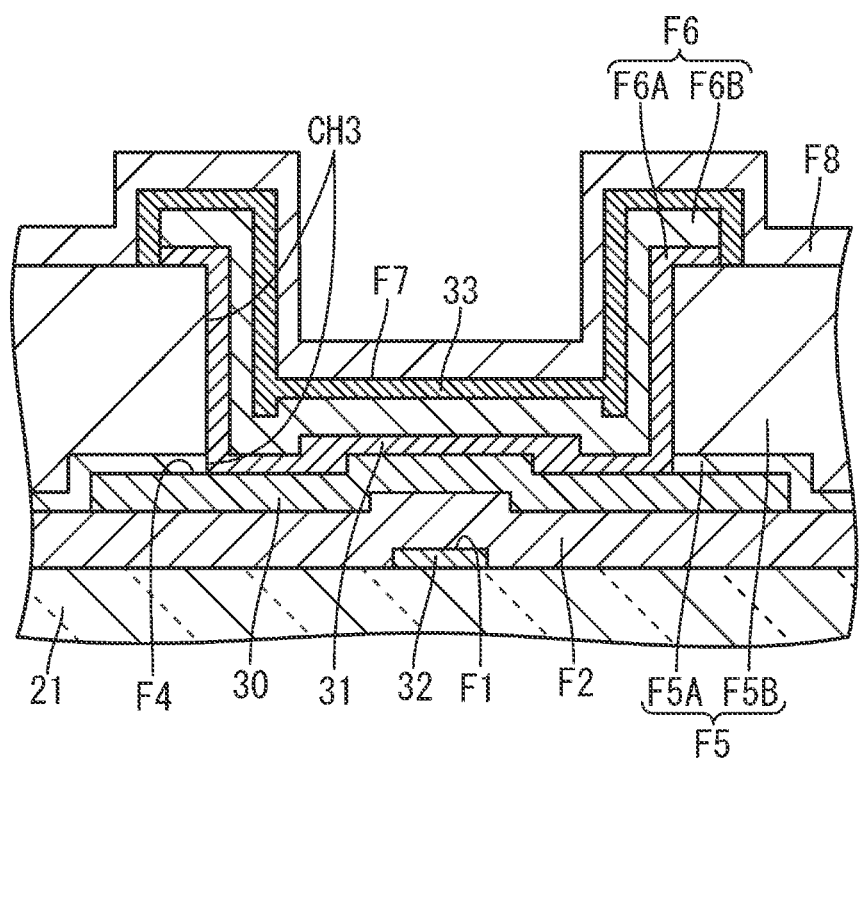
FIG. 5 is a cross-sectional view of a part of the array substrate near a gate circuit unit.

Each of the gate circuit units 14 is described with reference to FIG. 5. FIG. 5 is a cross-sectional view of a part of the array substrate 21 near the gate circuit unit 14. The gate circuit unit 14 is a so-called shift register circuit composed of a plurality of unit circuits connected separately to each of the plurality of gate lines 26 arranged along the Y-axis direction. The plurality of unit circuits are connected to one another, and can supply the gate lines 26, to which they are connected, with scanning signals in sequence from the upper stage. Each of the unit circuits has a plurality of circuit elements such as transistors and capacitors and has wires through which to connect these circuit elements. As shown in FIG. 5, these wires include at least a first wire 30 composed of the same second conducting film F4 as the source line 27, the drain electrode 23C, or other components, a second wire 31 composed of the same third conducting film F6 as the common line 28 or other components, and a third wire 32 composed of the same first conducting film F1 as the gate line 26 or other components. Among these, the first wire 30 and the second wire 31 are disposed so that a part of the first wire 30 and a part of the second wire 31 overlap each other, and the overlapping parts are connected through an inter-wire contact hole CH3 bored through the first insulating film F5. The inter-wire contact hole CH3 is disposed in a place in the first insulating film F5 overlapping the first wire 30 and the second wire 31. Of the first and second wires 30 and 31, which are connected to each other, the second wire 31, which is located at a higher layer, is covered with a wire protecting portion 33 located at a further higher layer and composed of the same fourth conducting film F7 as the common electrode 25 or other components. This wire protecting portion 33 provides protection for the second wire 31, thereby making it hard for the second wire 31 to suffer corrosion or other damage. Meanwhile, the third wire 32 is disposed so that a part of the third wire 32 overlaps the first wire 30 and the second wire 31, but the third wire 32 is kept insulated from the first wire 30 and the second wire 31, as the gate insulating film F2 is sandwiched between the third wire 32 and the first wire 30 and between the third wire 32 and the second wire 31.

Figure 6:
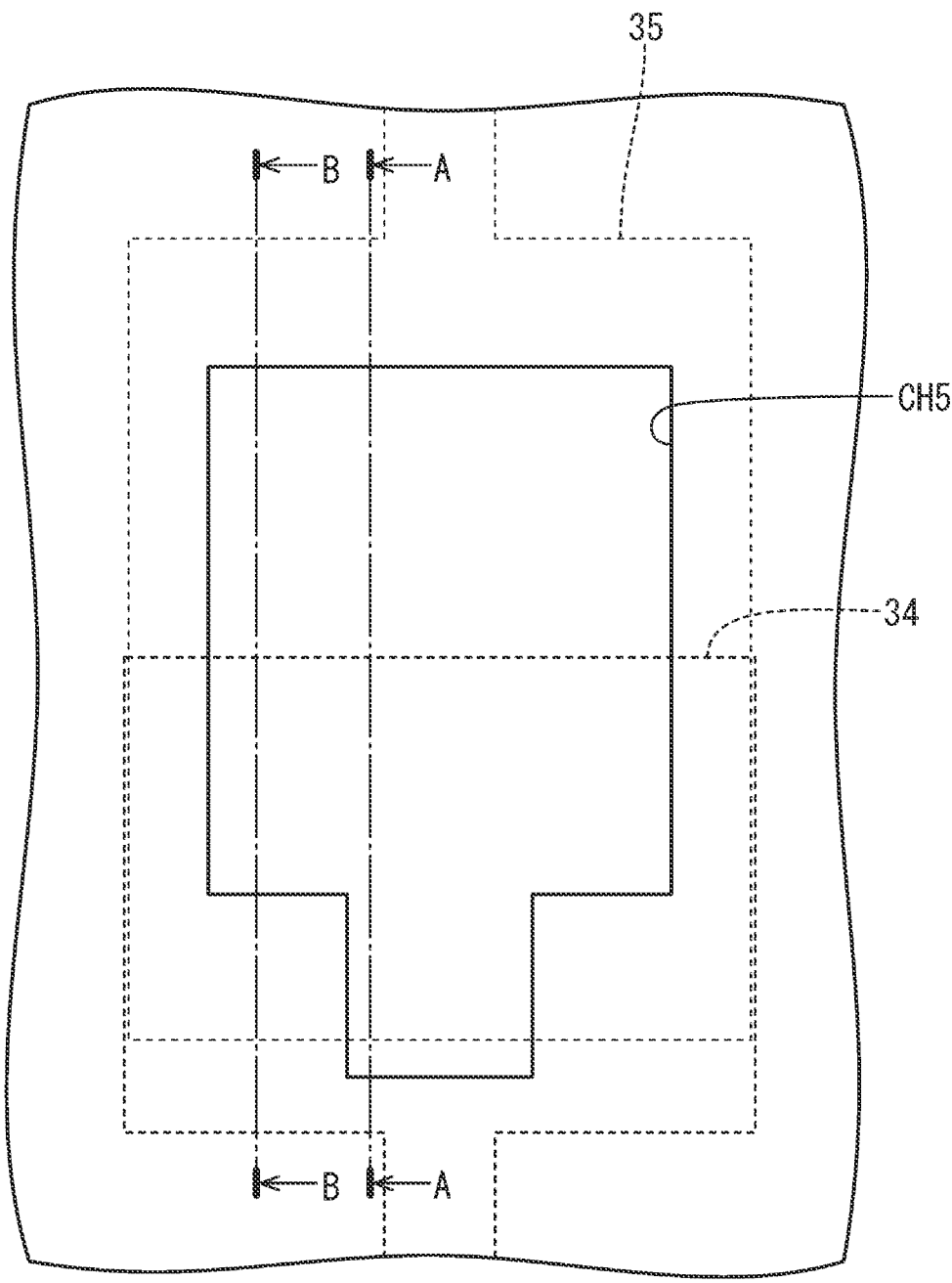
FIG. 6 is a plan view of a part of the array substrate near a lead wire.
Figure 7:
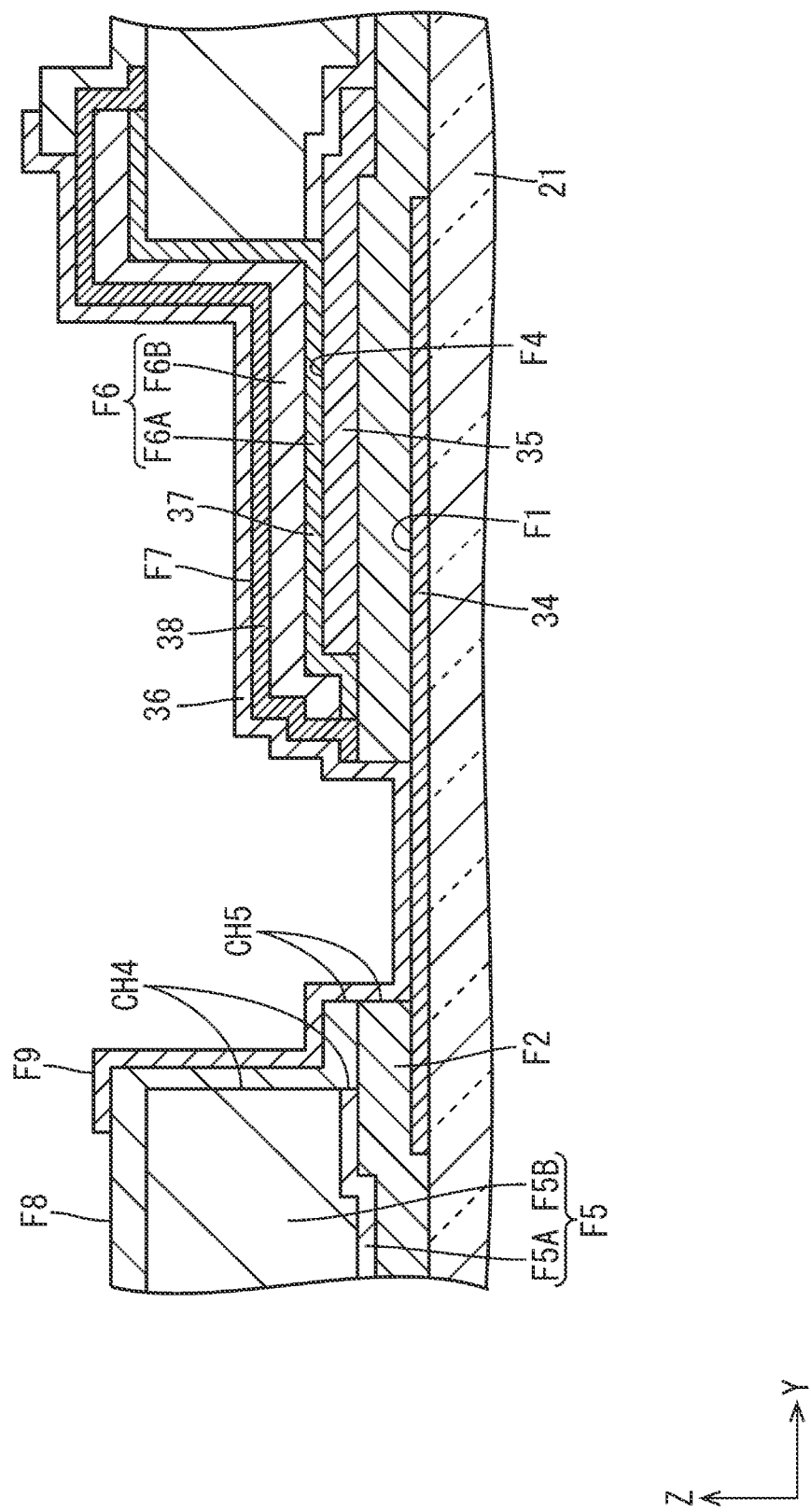
FIG. 7 is a cross-sectional view of a part of the array substrate near the center of the lead wire (i.e. a cross-sectional view taken along line A-A in FIG. 6)
Figure 8:
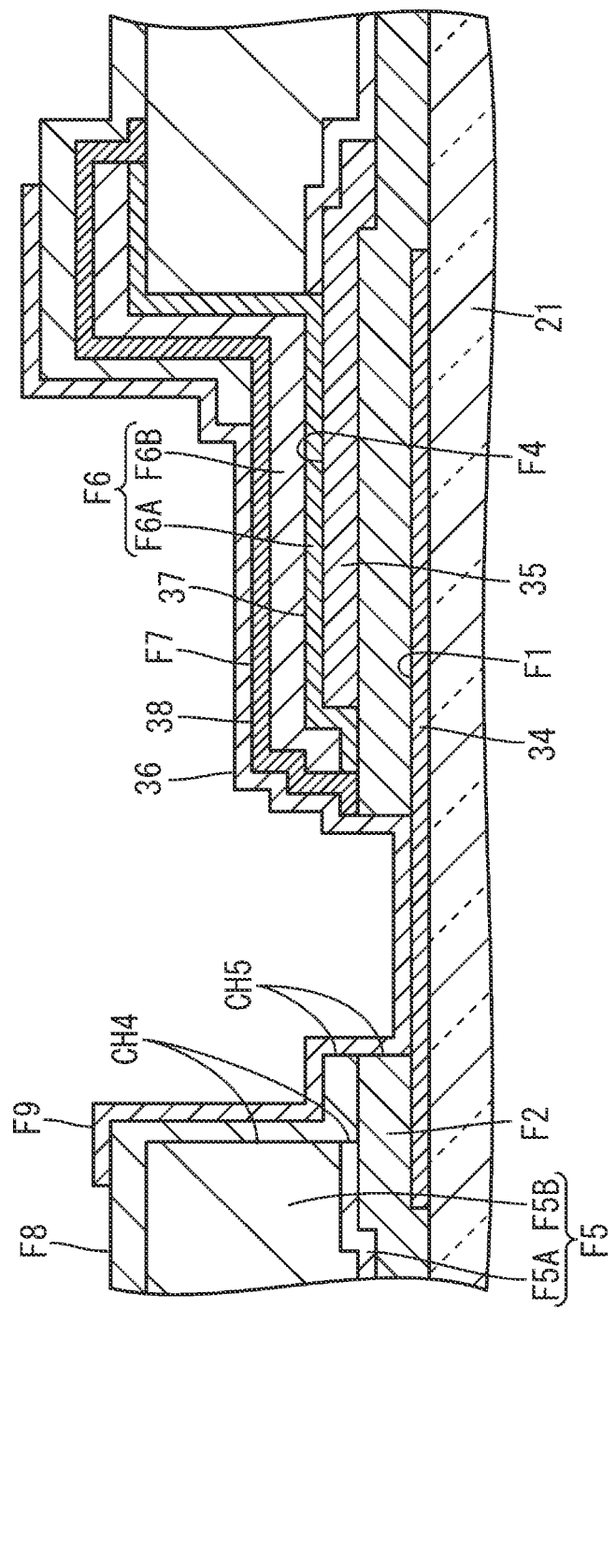
FIG. 8 is a cross-sectional view of a part of the array substrate near an end of the lead wire (i.e. a cross-sectional view taken along line B-B in FIG. 6)

The lead wire 15 is described with reference to FIGS. 6 to 8. FIG. 6 is a plan view of a part of the array substrate 21 near the lead wire 15. FIGS. 7 and 8 are each a cross-sectional view of a part of the array substrate 21 near the lead wire 15. FIG. 7 is a cross-sectional view of the array substrate 21 as taken along line A-A. FIG. 8 is a cross-sectional view of the array substrate 21 as taken along line B-B. As shown in FIG. 6, the lead wire 15 is formed by connecting a lower layer wire 34 and an upper layer wire 35 that are disposed at different layers from each other. As shown in FIGS. 7 and 8, the lead wire 15 has the lower layer wire 34, which is composed of the first conducting film F1, the upper layer wire 35, which is composed of the second conducting film F4, and a wire connection portion 36 composed of the fifth conducting film F9. Whereas one end of the lower layer wire 34 is connected to the terminal portion 16 disposed in the mounting area of the driver 12, the other end of the lower layer wire 34 is disposed at a lower layer than the upper layer wire 35 to overlap the upper layer wire 35 via the gate insulating film F2. The upper layer wire 35 is composed of the same second conducting film F4 as the source line 27, the drain electrode 23C, or other components, and whereas one end of the upper layer wire 35 is connected to the source line 27, the other end of the upper layer wire 35 is disposed at a higher layer than the other end of the lower layer wire 34 to overlap the other end of the lower layer wire 34 via the gate insulating film F2. The wire connection portion 36 is disposed to lie astride the other end of the lower layer wire 34 and the other end of the upper layer wire 35, and is connected to the other end of the lower layer wire 34 and the other end of the upper layer wire 35. Between the upper layer wire 35 and the wire connection portion 36, a first wire intermediate electrode (wire intermediate electrode) 37 composed of the third conducting film F6 and a second wire intermediate electrode (secondary wire intermediate electrode) 38 composed of the fourth conducting film F7 are provided in such a manner as to be sandwiched.

In order for the wire connection portion 36 to be connected to the lower layer wire 34 and the upper layer wire 35, as shown in FIGS. 7 and 8, the first insulating film F5 has a first wire connection contact hole CH4 bored therethrough, and the gate insulating film F2 and the second insulating film F8 have a second wire connection contact hole CH5 bored therethrough. The first wire connection contact hole CH4 is disposed in a place in the first insulating film F5 overlapping a large part of the wire connection portion 36. That is, the first wire connection contact hole CH4 is disposed to lie astride the other end of the lower layer wire 34 and the other end of the upper layer wire 35. The first wire intermediate electrode 37 and the second wire intermediate electrode 38 are connected to the upper layer wire 35 through the first wire connection contact hole CH4, and a part of the first wire intermediate electrode 37 and a part of the second wire intermediate electrode 38 override an opening edge of the first wire connection contact hole CH4 in the first insulating film F5. The second wire connection contact hole CH5 is disposed in a place in the gate insulating film F2 and the second insulating film F8 overlapping the lower layer wire 34 and at least a part of the first wire connection contact hole CH4 but not overlapping the upper layer wire 35.

Specifically, in the second insulating film 8, the second wire connection contact hole CH5 ranges over a large part of the first wire connection contact hole CH4, and in the gate insulating film F2, the second wire connection contact hole CH5 ranges over the lower layer wire 34 but does not range over the upper layer wire 35. The wire connection portion 36 is connected to the other end of the lower layer wire 34 and the second wire intermediate electrode 38 through the second wire connection contact hole CH5. The wire connection portion 36 is connected to the other end of the upper layer wire 35 via the first wire intermediate electrode 37 and the second wire intermediate electrode 38. As shown in FIG. 6, the second wire connection contact hole CH5 has a shape of the letter "T" when seen in plan view. Accordingly, a range of opening of the second wire connection contact hole CH5 in the Y-axis direction in the gate insulating film F2 and the second insulating film F8 becomes wider toward the center in the X-axis direction shown in FIG. 7 and becomes narrower toward an end in the X-axis direction shown in FIG. 8.

Figure 9:
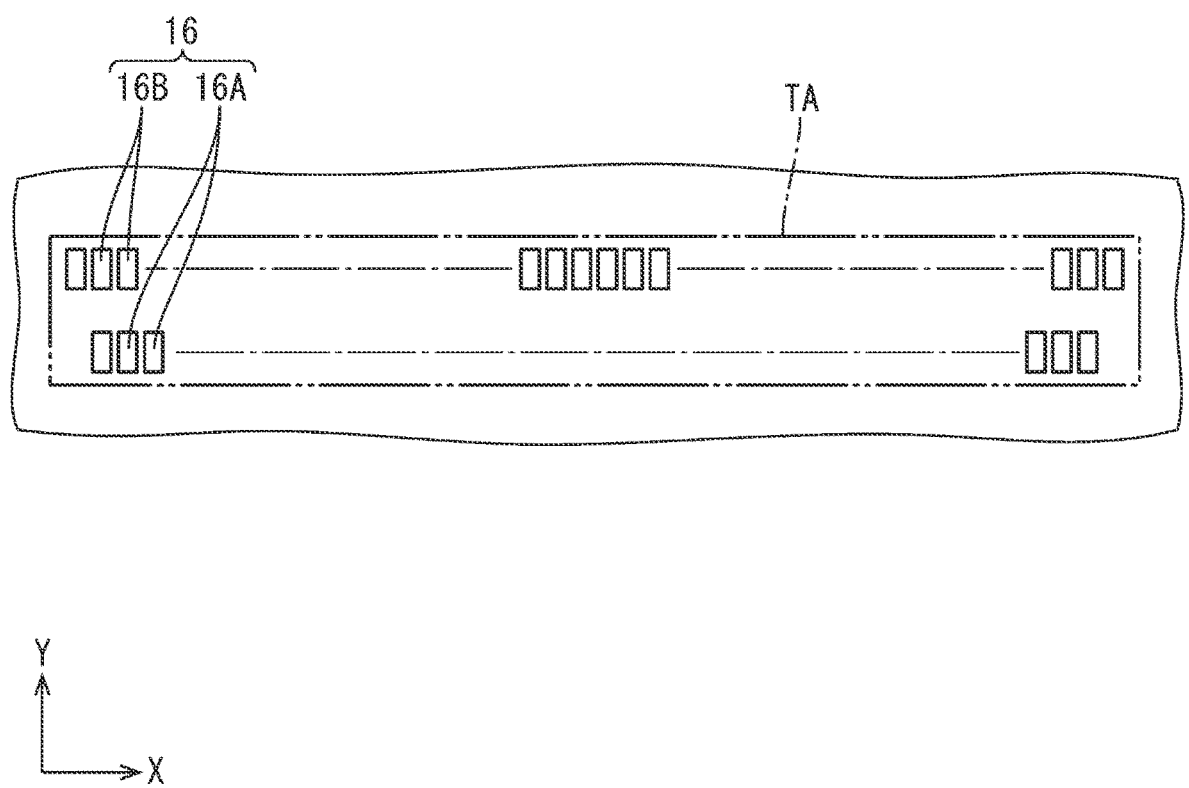
FIG. 9 is a plan view of a part of the array substrate near a terminal formation area.

The terminal portion 16 disposed in the mounting area of the driver 12 on the array substrate 21 is described with reference to FIGS. 9 and 10. FIG. 9 is a plan view of a part of the array substrate 21 near the mounting area of the driver 12. As shown in FIG. 9, the mounting area of the driver 12 on the array substrate 21 can be said to be a terminal formation area TA in which the terminal portion 16 is formed. The terminal formation area TA is located in the non-displayed area NAA, and is disposed not to overlap the pixel electrode 24 or the common electrode 25. The terminal portion 16 includes a lower layer terminal portion 16A and an upper layer terminal portion (terminal portion) 16B. In the present embodiment, the lower layer terminal portion 16A is a terminal portion (input terminal portion) through which to input a signal to the driver 12, and the upper layer terminal portion 16B is a terminal portion (output terminal portion) through which to receive a signal outputted from the driver 12. The lower layer terminal portion 16A and the upper layer terminal portion 16B are placed at a spacing in the Y-axis direction. A plurality of the lower layer terminal portions 16A and a plurality of the upper layer terminal portions 16B are both placed at spacings along the X-direction.

Figure 10:
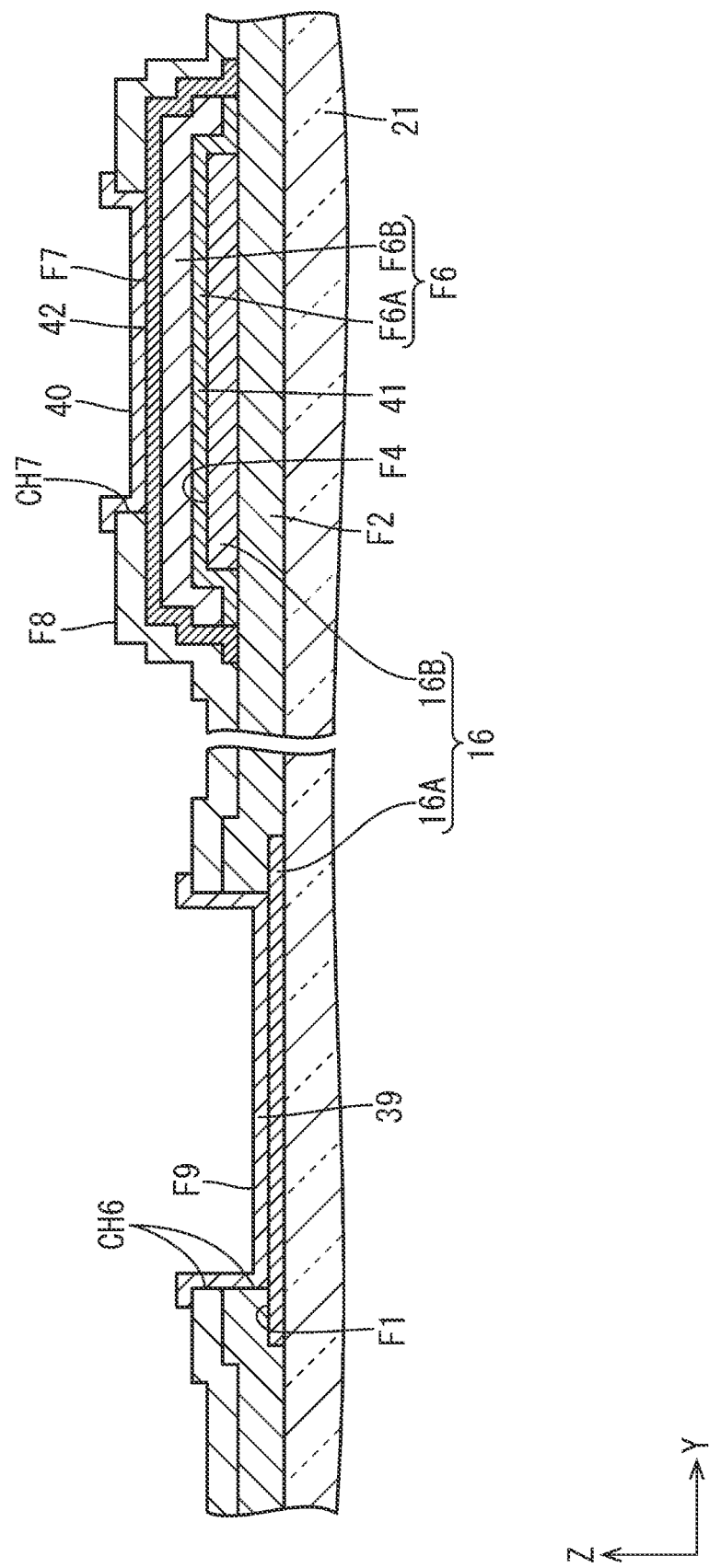
FIG. 10 is a cross-sectional view of a part of the array substrate near a terminal portion.

FIG. 10 is a cross-sectional view of a part of the array substrate 21 near the lower layer terminal portion 16A and the upper layer terminal portion 16B. First, as shown in FIG. 10, the terminal formation area TA is almost entirely free from the first insulating film F5. Accordingly, the gate insulating film F2 and the second insulating film F8 are the only insulating films present in the terminal formation area TA. The lower layer terminal portion 16A is composed of the same first conducting film F1 as the gate line 26 or other components. To this lower layer terminal portion 16A, a lower layer terminal protecting portion 39 composed of the same fifth conducting film F9 as the pixel electrode 24 or other components is connected. The lower layer terminal portion 16A, which is composed of the first conducting film F1, hardly suffers corrosion, as the lower layer terminal portion 16A avoids exposure to outside by being covered with the lower layer terminal protecting portion 39, which is composed of the fifth conducting film F9. The gate insulating film F2 and the second insulating film F8, which are sandwiched between the lower layer terminal portion 16A and the lower layer terminal protecting portion 39, have a lower layer terminal contact hole CH6 bored therethrough so as to be in a place overlapping both the lower layer terminal portion 16A and the lower layer terminal protecting portion 39. Through this lower layer terminal contact hole CH6, the lower layer terminal protecting portion 39 is connected to the lower layer terminal portion 16A.

As shown in FIG. 10, the upper layer terminal portion 16B is composed of the same second conducting film F4 as the source line 27, the drain electrode 23C, or other components. To this upper layer terminal portion 16B, an upper layer terminal protecting portion (terminal protecting portion) 40 composed of the same fifth conducting film F9 as the pixel electrode 24 or other components is connected. The upper layer terminal portion 16B, which is composed of the first metal film F1, is covered with the upper layer terminal protecting portion 40, which is composed of the fifth conducting film F9. In addition, a terminal intermediate electrode 41 composed of the same third conducting film F6 as the common line 28 or other components is disposed to overlap the upper layer terminal portion 16B, and is connected to the upper layer terminal portion 16B. Furthermore, a secondary terminal protecting portion 42 composed of the same fourth conducting film F7 as the common electrode 25 or other components is disposed to overlap the upper layer terminal portion 16B, and is connected to the upper layer terminal portion 16B. That is, between the upper layer terminal portion 16B and the upper layer terminal protecting portion 40, the terminal intermediate electrode 41 and the secondary terminal protecting portion 42 are provided in such a manner as to be sandwiched. The upper layer terminal portion 16B hardly suffers corrosion, as the upper layer terminal portion 16B avoids exposure to outside by being covered with the upper layer terminal protecting portion 40 and the secondary terminal protecting portion 42. The second insulating film F8, which is sandwiched between the secondary terminal protecting portion 42, which is located at the highest layer of the upper layer terminal portion 16B, the terminal intermediate electrode 41, and the secondary terminal protecting portion 42, which are stacked in succession, and the upper layer terminal protecting portion 40, has an upper layer terminal contact hole (terminal contact hole) CH7 bored therethrough so as to be in a place overlapping the upper layer terminal portion 16B, the terminal intermediate electrode 41, and both the secondary terminal protecting portion 42 and the upper layer terminal protecting portion 40. Through this upper layer terminal contact hole CH7, the upper layer terminal protecting portion 40 is connected to the secondary terminal protecting portion 42.

Figure 11:
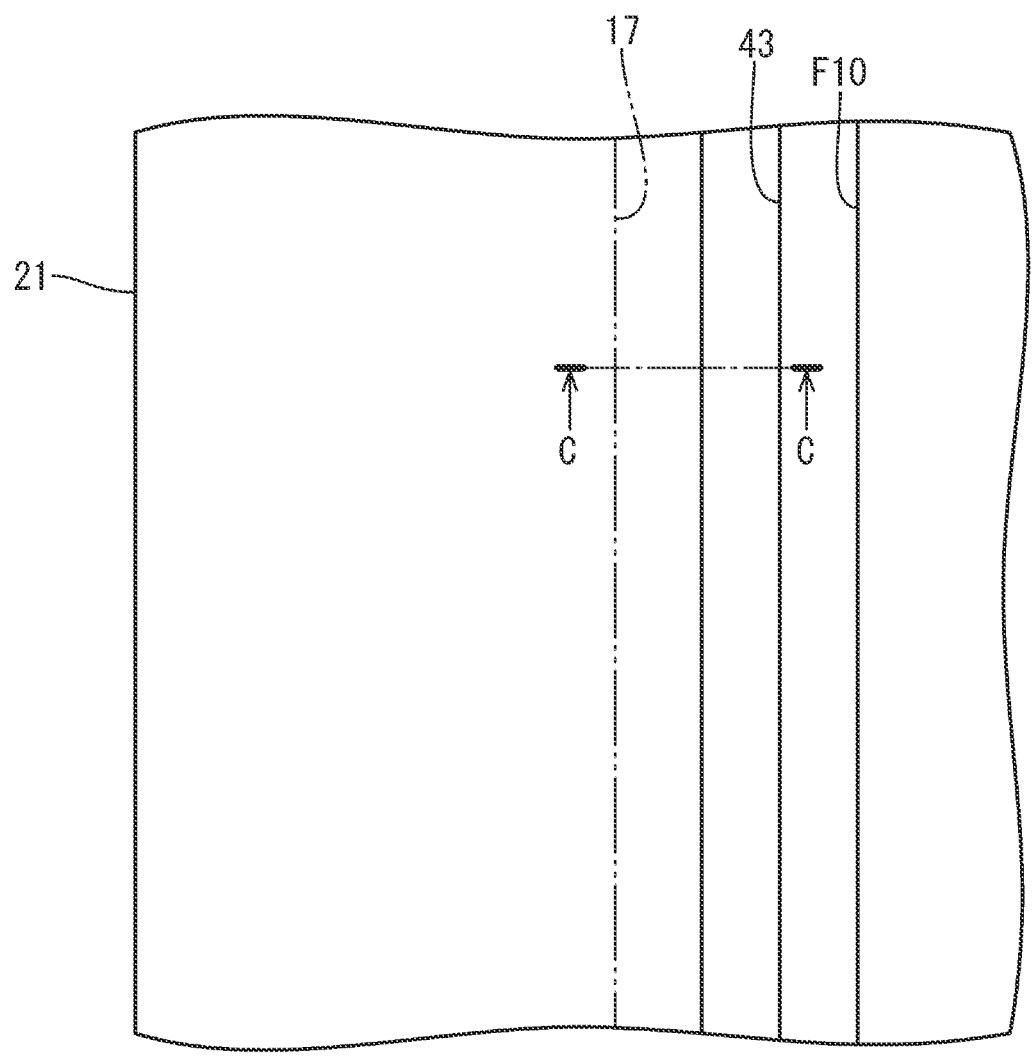
FIG. 11 is a plan view of a part of the array substrate near a film formation range limiting groove portion.
Figure 12:
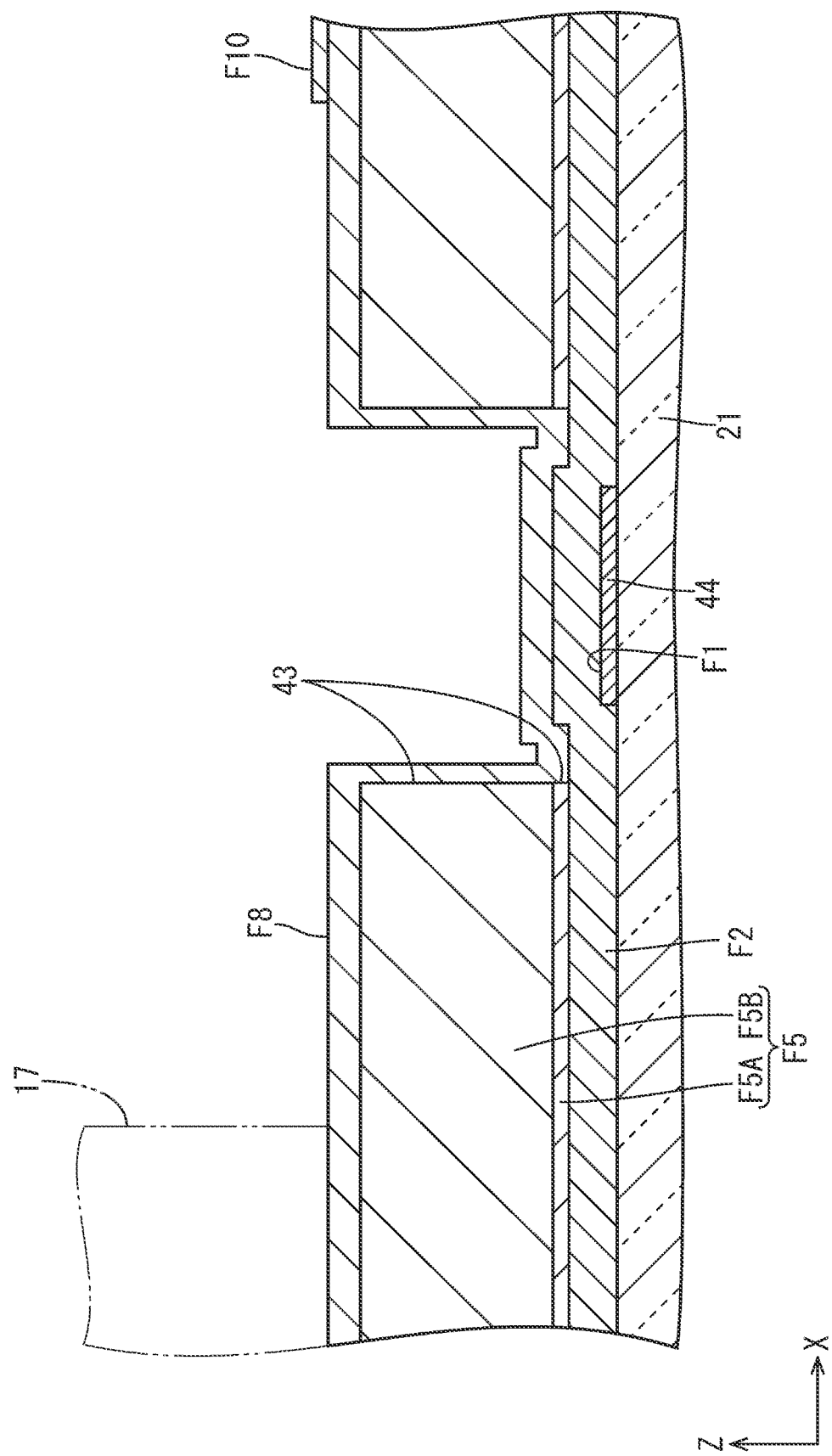
FIG. 12 is a cross-sectional view of a part of the array substrate near the film formation range limiting groove portion (i.e. a cross-sectional view taken along line C-C in FIG. 11)

A film formation range limiting groove portion 43 disposed in a part of the array substrate 21 near the seal 17 is described with reference to FIGS. 11 and 12. FIG. 11 is a plan view of a part of the array substrate 21 near the seal 17. FIG. 12 is a cross-sectional view of the array substrate 21 as taken along line C-C in FIG. 11. As shown in FIGS. 11 and 12, the film formation range limiting groove portion 43 is provided in a place in the first insulating film F5 located in an area (non-display area NAA) outside the display area AA and located in an area inside the seal 17. Accordingly, the film formation range limiting groove portion 43 is disposed in a place in the array substrate 21 located in an area outside a film formation range of the alignment film F10, which extends all over at least the display area AA. The film formation range limiting groove portion 43 is formed in an endless ring shape so as to extend parallel to the seal 17 and, when seen in plan view, be all around the display area AA on every side. The film formation range limiting groove portion 43 is formed as an opening bored through the first insulating film F5. This film formation range limiting groove portion 43 causes a depression that is as thick as the first insulating film F5 to be formed in a surface of the array substrate 21. Thus, even in a case where a material of the alignment film F10 that flows in forming the alignment film F10 spreads as far as the area outside the display area AA (i.e. the film formation range of the alignment film F10) in the process of manufacturing the array substrate 21, the material of the alignment film F10 hardly flows beyond the depression formed in the surface of the array substrate 21 by the film formation range limiting groove portion 43. This limits the expansion of the film formation range of the alignment film F10 to a place in which the seal 17 is to be formed, making it hard for the seal 17 to decrease in adhesion to the array substrate 21. In FIG. 12, a wire 44 composed of the first conducting film F1 is provided in a place overlapping the film formation range limiting groove portion 43.

The liquid crystal panel 11 according to the present embodiment is structured as noted above, and the following describes a method for manufacturing such a liquid crystal panel 11. The method for manufacturing a liquid crystal panel 11 according to the present embodiment includes: a CF substrate manufacturing step (counter substrate manufacturing step) of manufacturing a CF substrate 20; an array substrate manufacturing step of manufacturing an array substrate 21; and a bonding step of bonding together the CF substrate 20 thus manufactured and the array substrate 21 thus manufactured. The CF substrate manufacturing step and the array substrate manufacturing step each involve the use of a mother glass substrate including a plurality of glass substrates arranged in a board surface. Among these, the array substrate manufacturing step includes: a gate line forming step (scanning line forming step) of forming a gate line 26 or other components; a gate insulating film forming step (lower layer insulating film forming step) of forming a gate insulating film F2; a channel portion forming step of forming a channel portion 23D of a TFT 23; a source line forming step (image line forming step) of forming a source line 27 or other components; a first insulating film forming step of forming a first insulating film F5; a common line forming step of forming a common line 28 or other components; a common electrode forming step of forming a common electrode 25 or other components; a second insulating film forming step of forming a second insulating film F8; and a pixel electrode forming step of forming a pixel electrode 24 or other components.

Figure 13A:
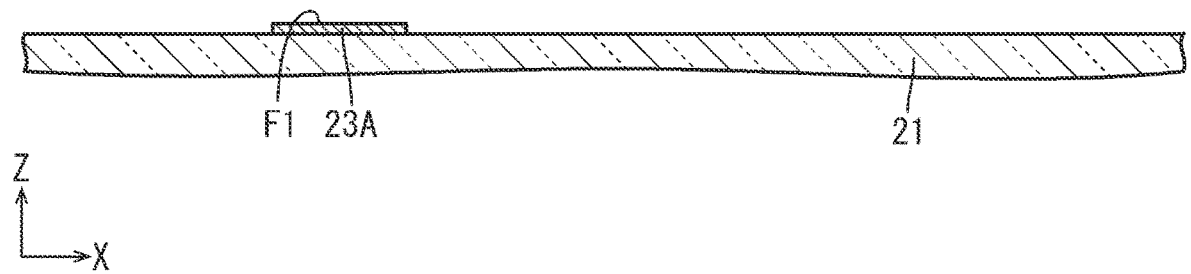
FIG. 13A is a cross-sectional view of a part of an array substrate near a TFT after execution of a gate line forming step.
Figure 13B:
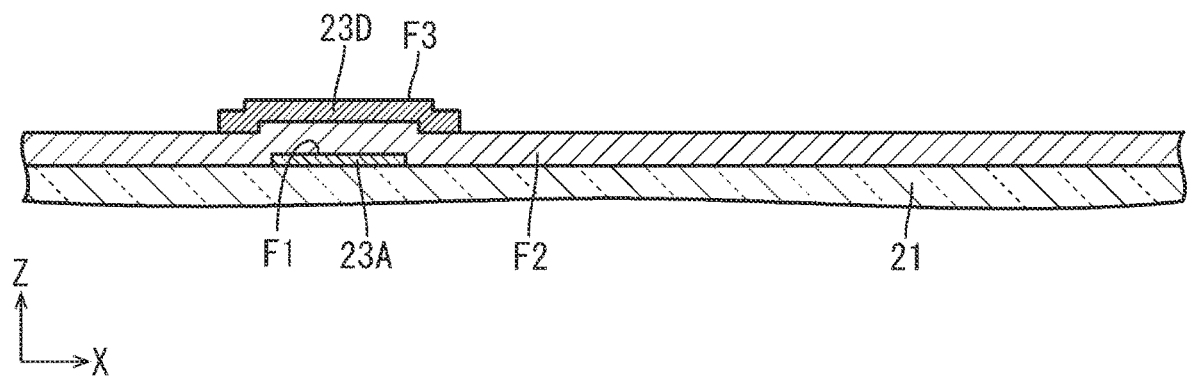
FIG. 13B is a cross-sectional view of the part of the array substrate near the TFT after execution of a gate insulating film forming step and a channel portion forming step.
Figure 13C:
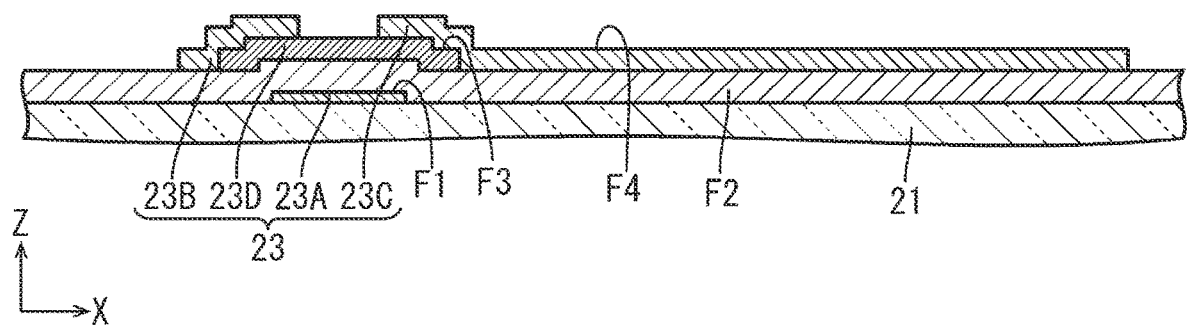
FIG. 13C is a cross-sectional view of the part of the array substrate near the TFT after execution of a source line forming step.
Figure 14A:
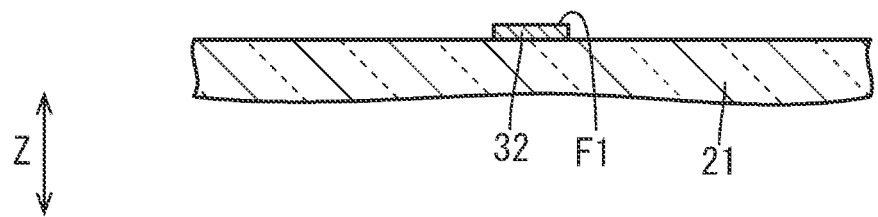
FIG. 14A is a cross-sectional view of a part of the array substrate near a gate circuit unit after the execution of the gate line forming step.
Figure 14B:
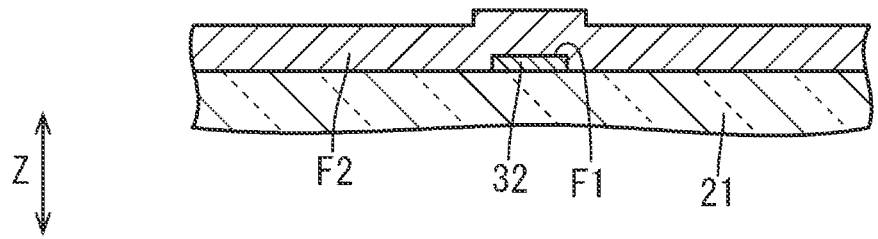
FIG. 14B is a cross-sectional view of the part of the array substrate near the gate circuit unit after the execution of the gate insulating film forming step and the channel portion forming step.
Figure 14C:
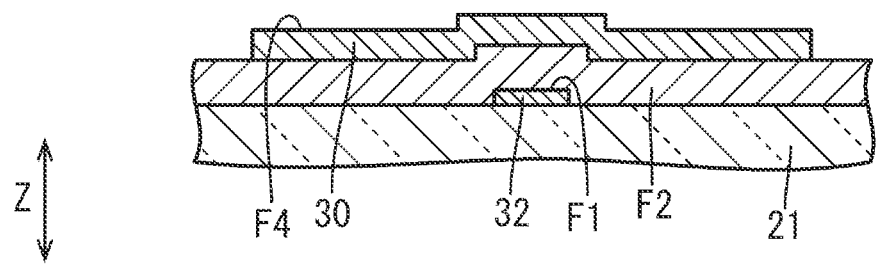
FIG. 14C is a cross-sectional view of the part of the array substrate near the gate circuit unit after the execution of the source line forming step.
Figure 15A:
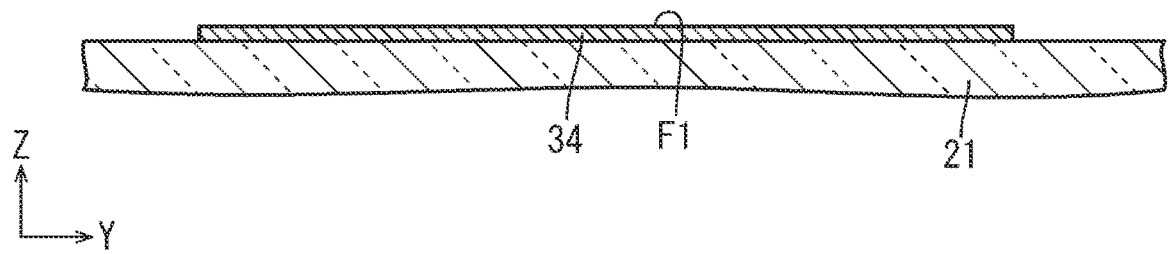
FIG. 15A is a cross-sectional view of a part of the array substrate near the center of a lead wire after the execution of the gate line forming step (i.e. a cross-sectional view taken along line A-A in FIG. 6)
Figure 15B:
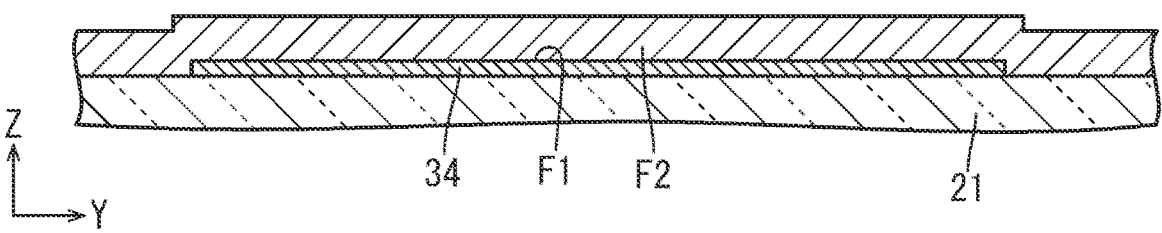
FIG. 15B is a cross-sectional view of the part of the array substrate near the center of the lead wire after the execution of the gate insulating film forming step and the channel portion forming step (i.e. a cross-sectional view taken along line A-A in FIG. 6)
Figure 15C:
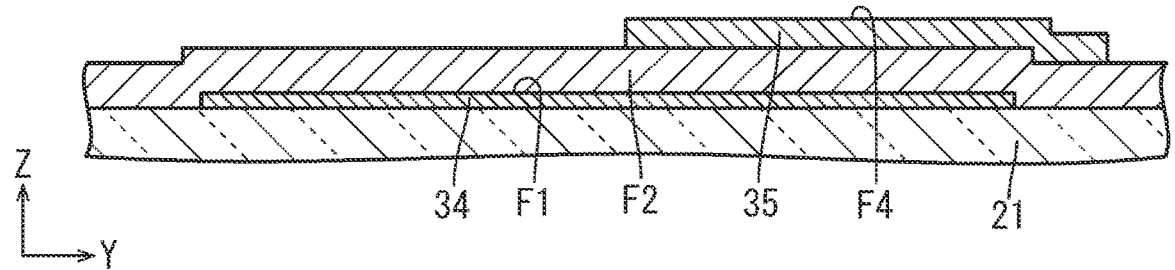
FIG. 15C is a cross-sectional view of the part of the array substrate near the center of the lead wire after the execution of the source line forming step (i.e. a cross-sectional view taken along line A-A in FIG. 6)
Figure 16A:
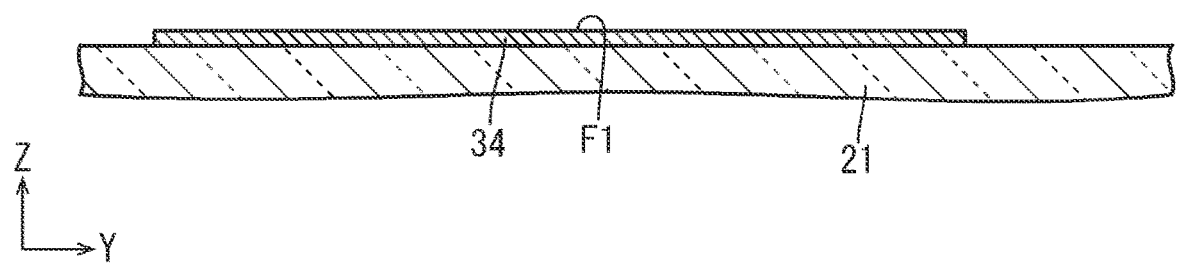
FIG. 16A is a cross-sectional view of a part of the array substrate near an end of the lead wire after the execution of the gate line forming step (i.e. a cross-sectional view taken along line B-B in FIG. 6)
Figure 16B:
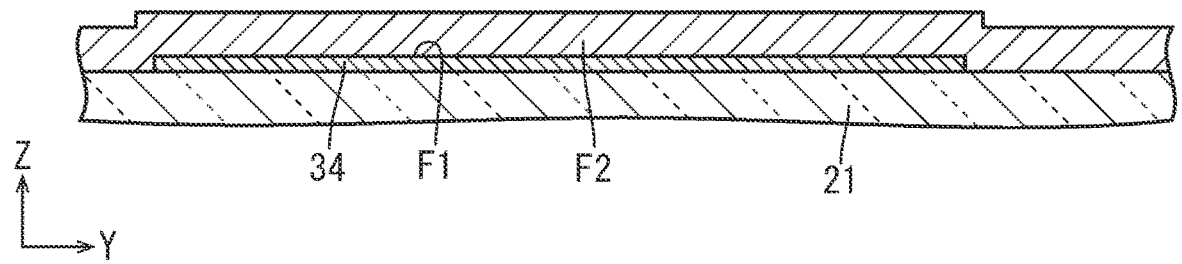
FIG. 16B is a cross-sectional view of the part of the array substrate near the end of the lead wire after the execution of the gate insulating film forming step and the channel portion forming step (i.e. a cross-sectional view taken along line B-B in FIG. 6)
Figure 16C:
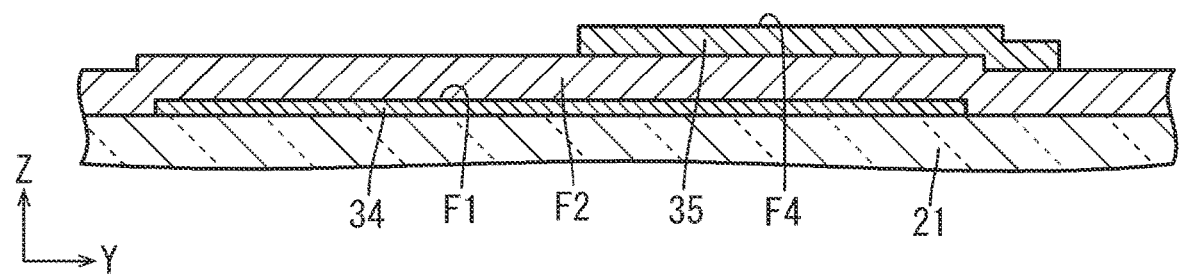
FIG. 16C is a cross-sectional view of the part of the array substrate near the end of the lead wire after the execution of the source line forming step (i.e. a cross-sectional view taken along line B-B in FIG. 6)
Figure 17A:
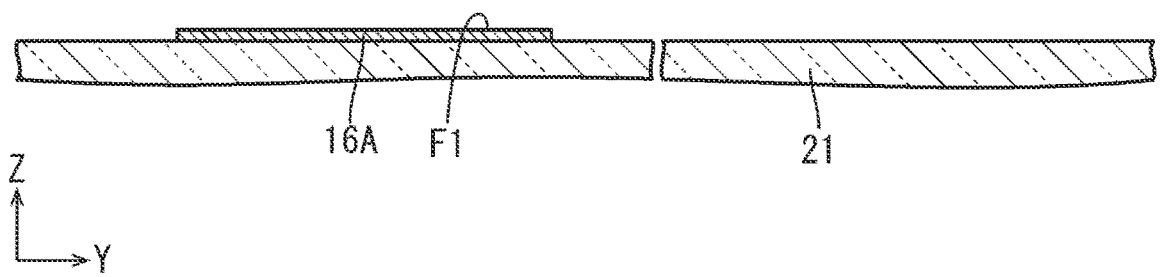
FIG. 17A is a cross-sectional view of a part of the array substrate near a terminal portion after the execution of the gate line forming step.
Figure 17B:
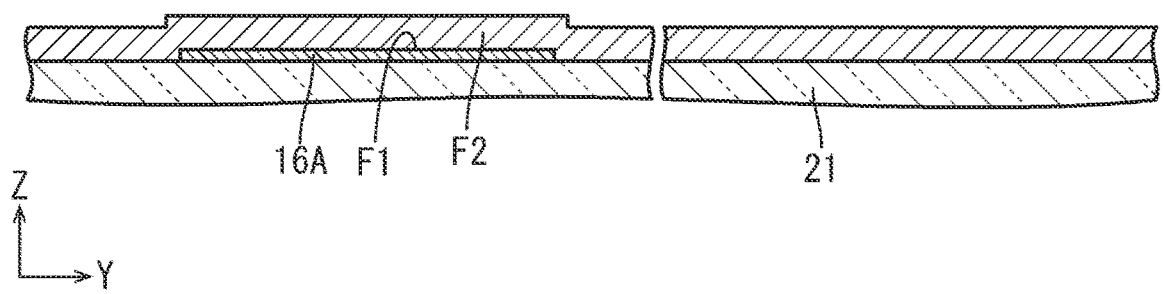
FIG. 17B is a cross-sectional view of the part of the array substrate near the terminal portion after the execution of the gate insulating film forming step and the channel portion forming step.
Figure 17C:
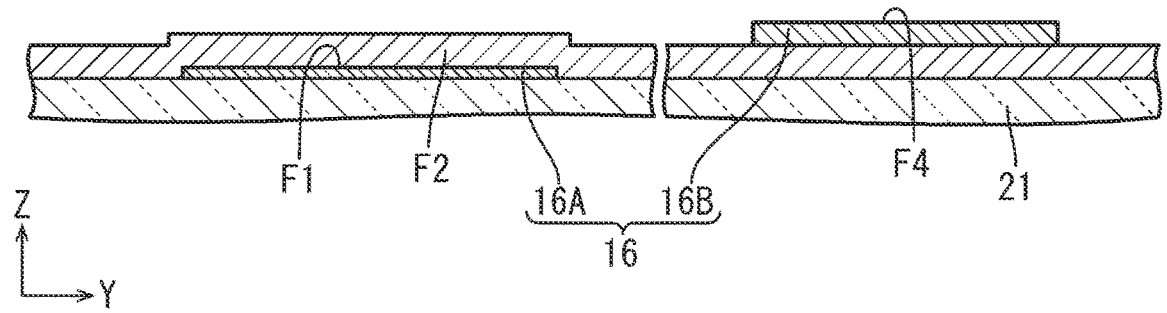
FIG. 17C is a cross-sectional view of the part of the array substrate near the terminal portion after the execution of the source line forming step.
Figure 18A:
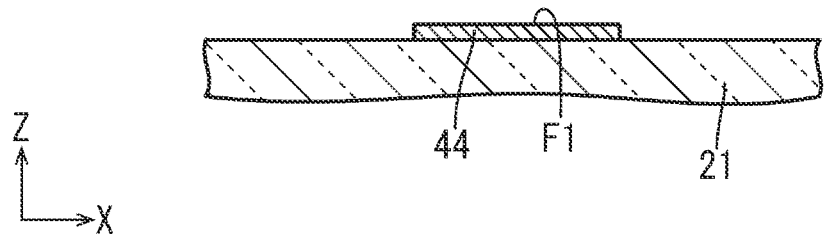
FIG. 18A is a cross-sectional view of a part of the array substrate near a film formation range limiting groove portion after the execution of the gate line forming step (i.e. a cross-sectional view taken along line C-C in FIG. 11)
Figure 18B:
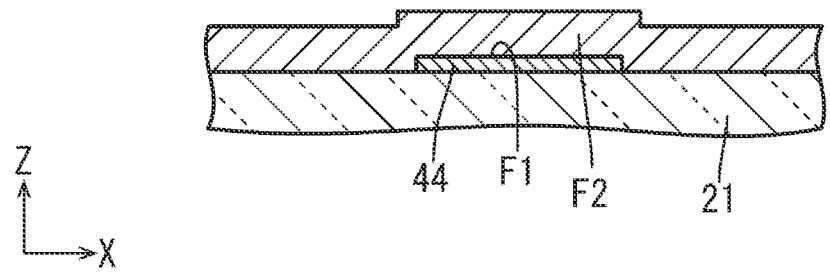
FIG. 18B is a cross-sectional view of the part of the array substrate near the film formation range limiting groove portion after the execution of the gate insulating film forming step and the channel portion forming step (i.e. a cross-sectional view taken along line C-C in FIG. 11)
Figure 18C:
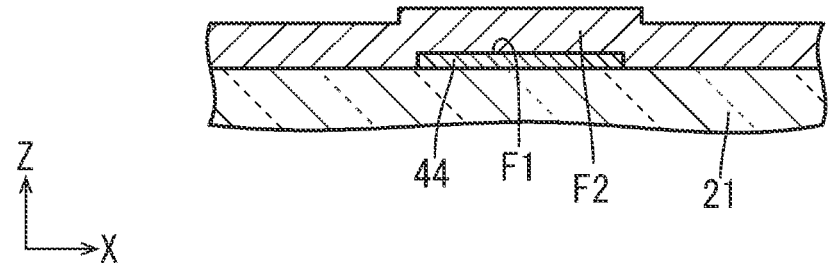
FIG. 18C is a cross-sectional view of the part of the array substrate near the film formation range limiting groove portion after the execution of the source line forming step (i.e. a cross-sectional view taken along line C-C in FIG. 11)

The array substrate manufacturing step of the method for manufacturing a liquid crystal panel 11 is described with reference to FIGS. 13A to 30B. FIG. 13A is a cross-sectional view of a part of an array substrate 21 near a TFT 23 after the execution of the gate line forming step. FIG. 13B is a cross-sectional view of the part of the array substrate 21 near the TFT 23 after the execution of the gate insulating film forming step and the channel portion forming step. FIG. 13C is a cross-sectional view of the part of the array substrate 21 near the TFT 23 after the execution of the source line forming step. FIG. 14A is a cross-sectional view of a part of the array substrate 21 near a gate circuit unit 14 after the execution of the gate line forming step. FIG. 14B is a cross-sectional view of the part of the array substrate 21 near the gate circuit unit 14 after the execution of the gate insulating film forming step and the channel portion forming step. FIG. 14C is a cross-sectional view of the part of the array substrate 21 near the gate circuit unit 14 after the execution of the source line forming step. FIG. 15A is a cross-sectional view of a part of the array substrate 21 near the center of a lead wire 15 after the execution of the gate line forming step (i.e. a cross-sectional view taken along line A-A in FIG. 6). FIG. 15B is a cross-sectional view of the part of the array substrate 21 near the center of the lead wire 15 after the execution of the gate insulating film forming step and the channel portion forming step (i.e. a cross-sectional view taken along line A-A in FIG. 6). FIG. 15C is a cross-sectional view of the part of the array substrate 21 near the center of the lead wire 15 after the execution of the source line forming step (i.e. a cross-sectional view taken along line A-A in FIG. 6). FIG. 16A is a cross-sectional view of a part of the array substrate 21 near an end of the lead wire 15 after the execution of the gate line forming step (i.e. a cross-sectional view taken along line B-B in FIG. 6). FIG. 16B is a cross-sectional view of the part of the array substrate 21 near the end of the lead wire 15 after the execution of the gate insulating film forming step and the channel portion forming step (i.e. a cross-sectional view taken along line B-B in FIG. 6). FIG. 16C is a cross-sectional view of the part of the array substrate 21 near the end of the lead wire 15 after the execution of the source line forming step (i.e. a cross-sectional view taken along line B-B in FIG. 6). FIG. 17A is a cross-sectional view of a part of the array substrate 21 near a terminal portion 16 after the execution of the gate line forming step. FIG. 17B is a cross-sectional view of the part of the array substrate 21 near the terminal portion 16 after the execution of the gate insulating film forming step and the channel portion forming step. FIG. 17C is a cross-sectional view of the part of the array substrate 21 near the terminal portion 16 after the execution of the source line forming step. FIG. 18A is a cross-sectional view of a part of the array substrate 21 near a film formation range limiting groove portion 43 after the execution of the gate line forming step (i.e. a cross-sectional view taken along line C-C in FIG. 11). FIG. 18B is a cross-sectional view of the part of the array substrate 21 near the film formation range limiting groove portion 43 after the execution of the gate insulating film forming step and the channel portion forming step (i.e. a cross-sectional view taken along line C-C in FIG. 11). FIG. 18C is a cross-sectional view of the part of the array substrate 21 near the film formation range limiting groove portion 43 after the execution of the source line forming step (i.e. a cross-sectional view taken along line C-C in FIG. 11).

Figure 19A:
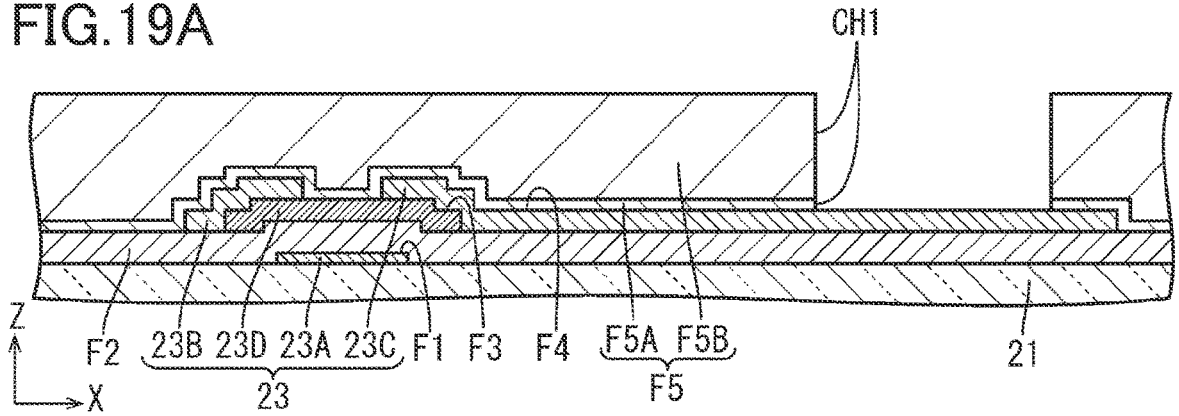
FIG. 19A is a cross-sectional view of the part of the array substrate near the TFT after execution of a first insulating film forming step.
Figure 19B:
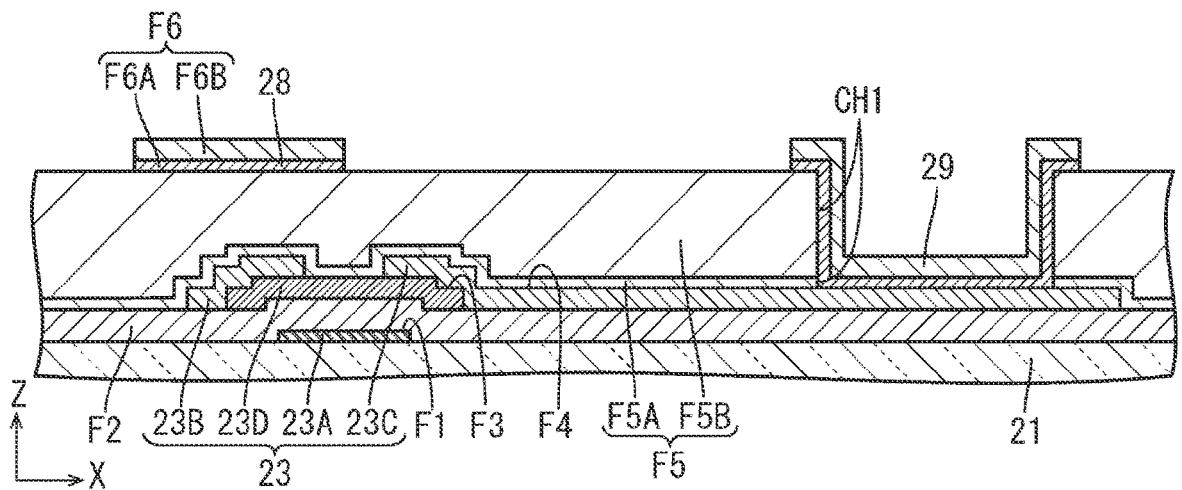
FIG. 19B is a cross-sectional view of the part of the array substrate near the TFT after execution of a common line forming step.
Figure 19C:
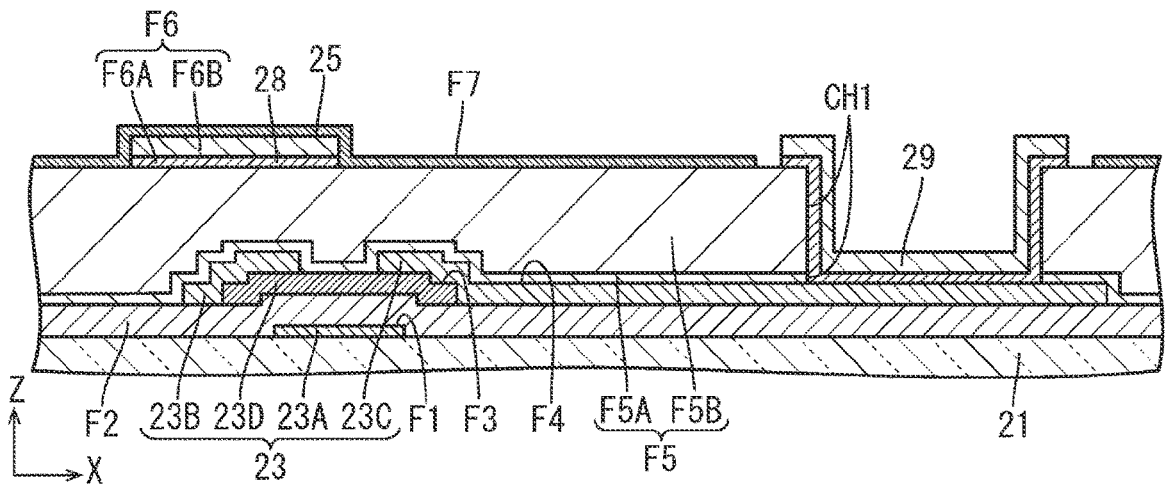
FIG. 19C is a cross-sectional view of the part of the array substrate near the TFT after execution of a common electrode forming step.
Figure 20A:
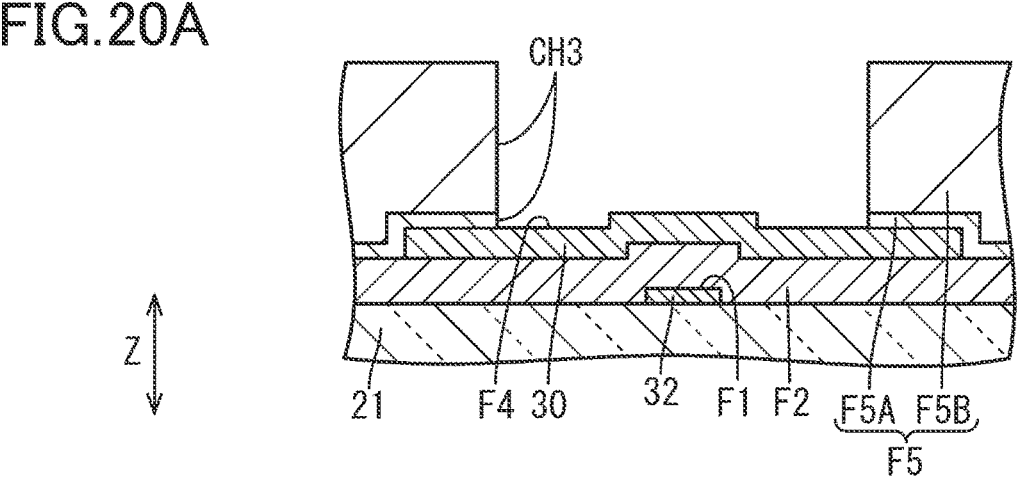
FIG. 20A is a cross-sectional view of the part of the array substrate near the gate circuit unit after the execution of the first insulating film forming step.
Figure 20B:
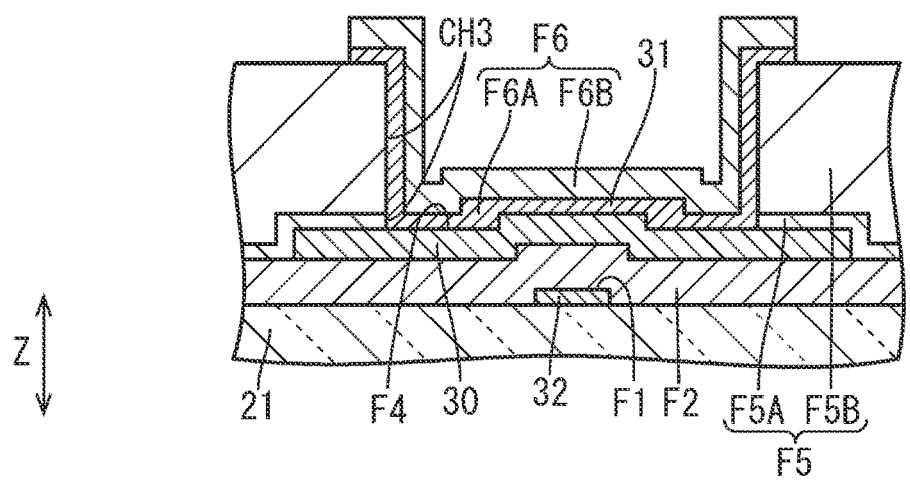
FIG. 20B is a cross-sectional view of the part of the array substrate near the gate circuit unit after the execution of the common line forming step.
Figure 20C:
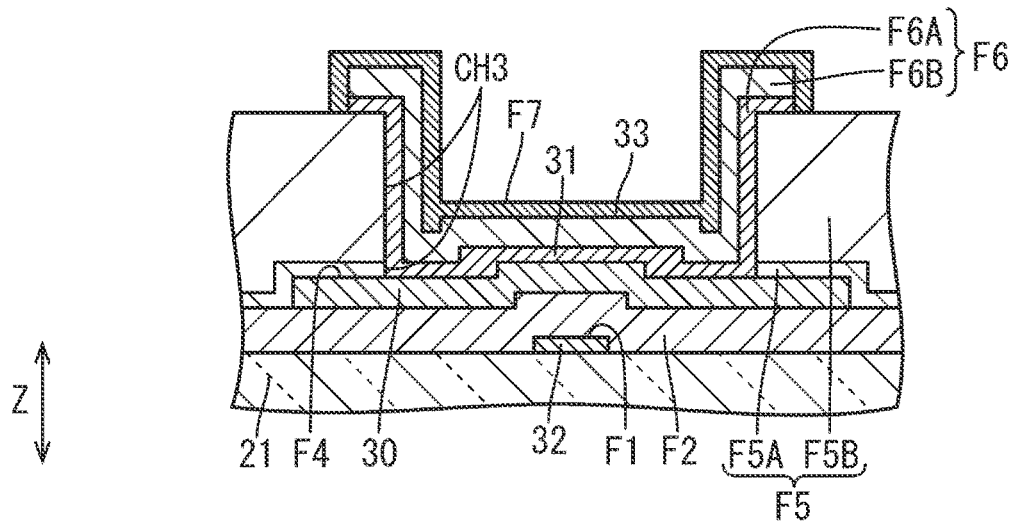
FIG. 20C is a cross-sectional view of the part of the array substrate near the gate circuit unit after the execution of the common electrode forming step.
Figure 21A:
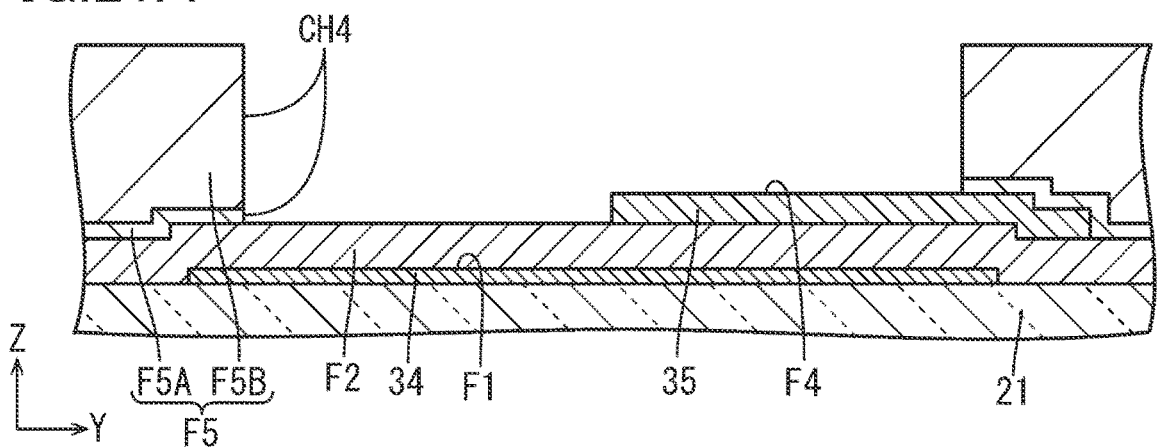
FIG. 21A is a cross-sectional view of the part of the array substrate near the center of the lead wire after the execution of the first insulating film forming step (i.e. a cross-sectional view taken along line A-A in FIG. 6)
Figure 21B:
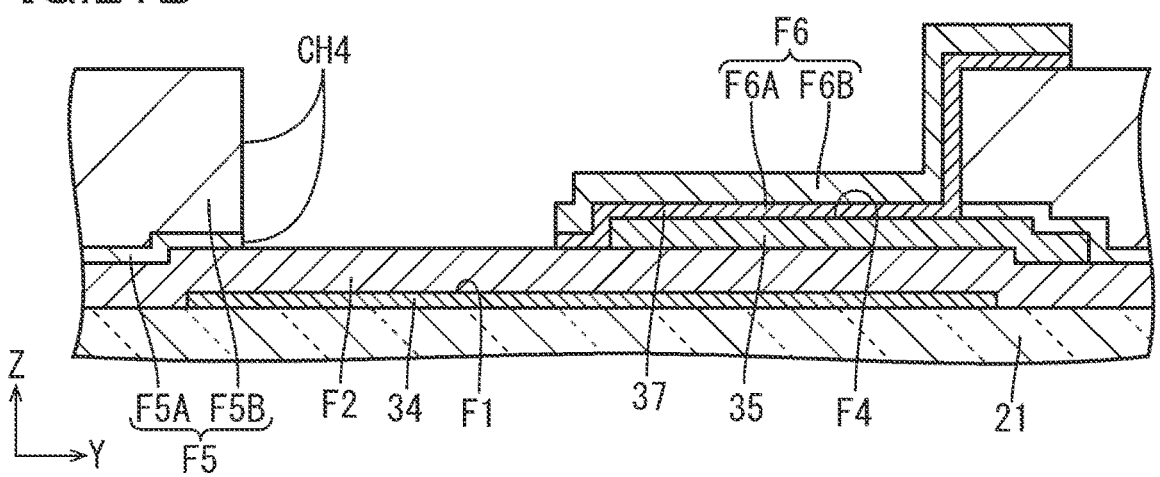
FIG. 21B is a cross-sectional view of the part of the array substrate near the center of the lead wire after the execution of the common line forming step (i.e. a cross-sectional view taken along line A-A in FIG. 6)
Figure 21C:
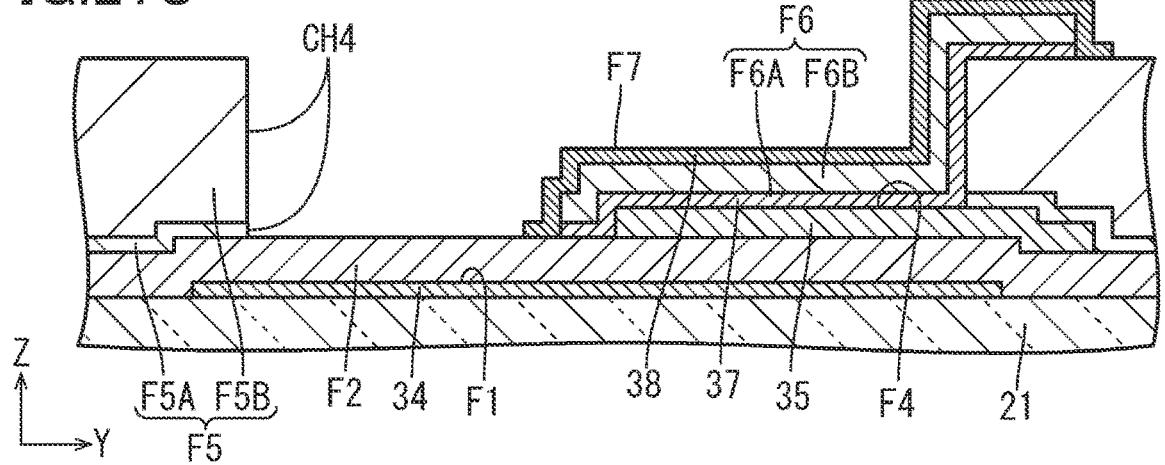
FIG. 21C is a cross-sectional view of the part of the array substrate near the center of the lead wire after the execution of the common electrode forming step (i.e. a cross-sectional view taken along line A-A in FIG. 6)
Figure 22A:
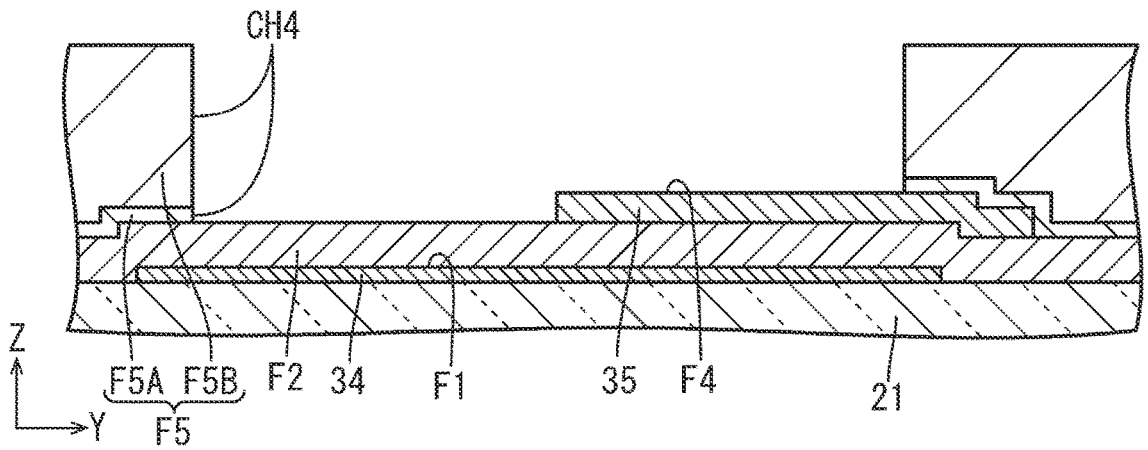
FIG. 22A is a cross-sectional view of the part of the array substrate near the end of the lead wire after the execution of the first insulating film forming step (i.e. a cross-sectional view taken along line B-B in FIG. 6)
Figure 22B:
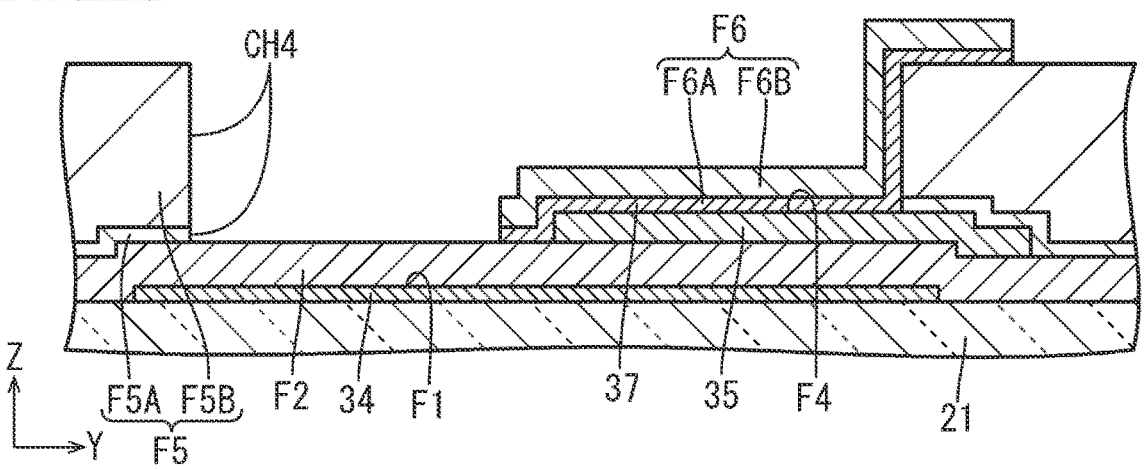
FIG. 22B is a cross-sectional view of the part of the array substrate near the end of the lead wire after the execution of the common line forming step (i.e. a cross-sectional view taken along line B-B in FIG. 6)
Figure 22C:
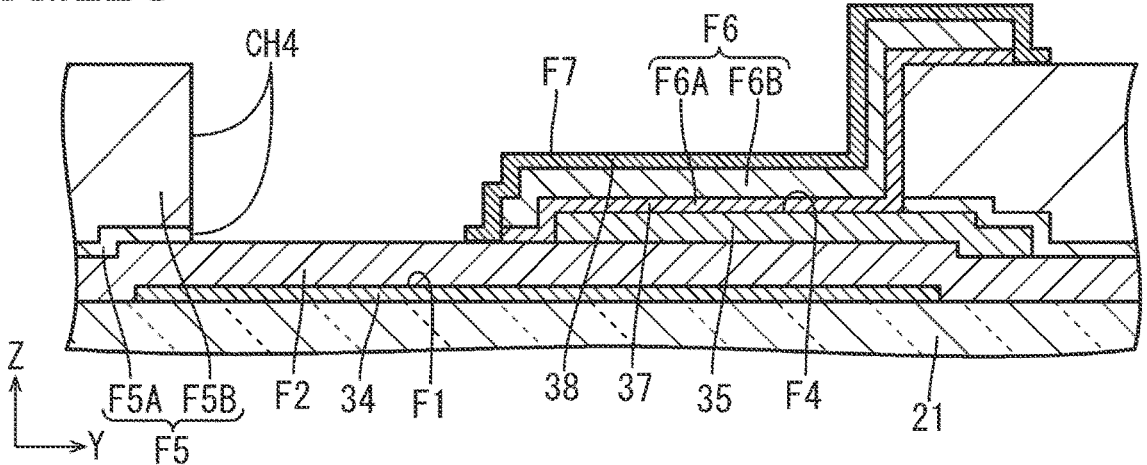
FIG. 22C is a cross-sectional view of the part of the array substrate near the end of the lead wire after the execution of the common electrode forming step (i.e. a cross-sectional view taken along line B-B in FIG. 6)
Figure 23A:
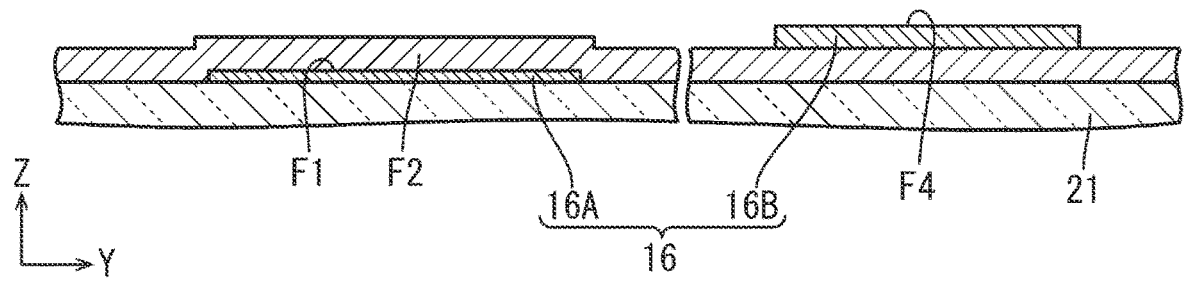
FIG. 23A is a cross-sectional view of the part of the array substrate near the terminal portion after the execution of the first insulating film forming step.
Figure 23B:
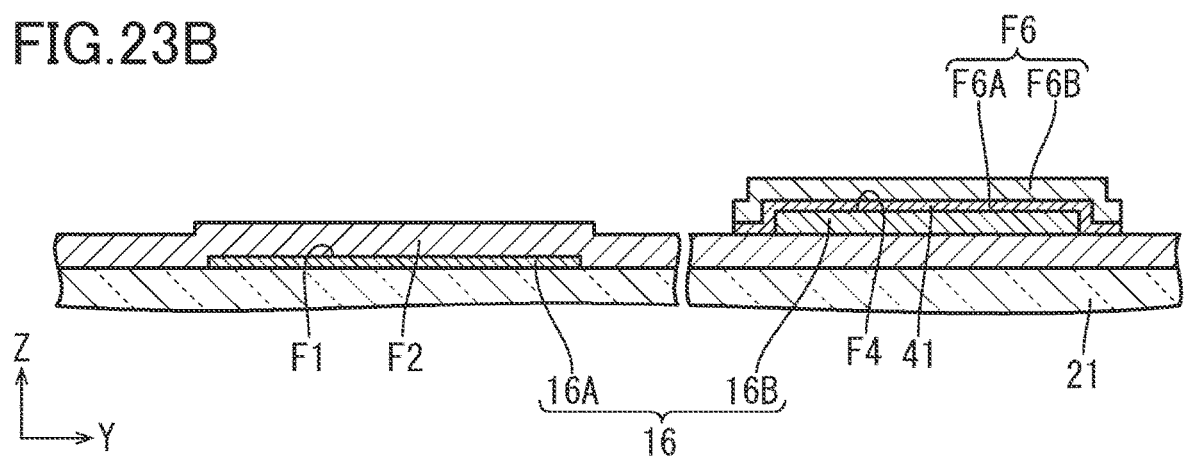
FIG. 23B is a cross-sectional view of the part of the array substrate near the terminal portion after the execution of the common line forming step.
Figure 23C:
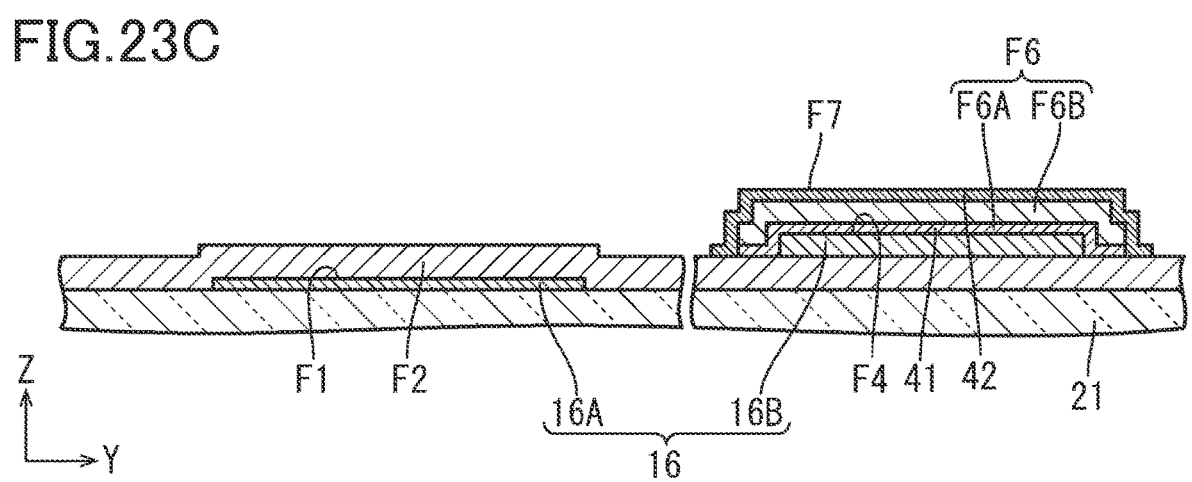
FIG. 23C is a cross-sectional view of the part of the array substrate near the terminal portion after the execution of the common electrode forming step.
Figure 24A:
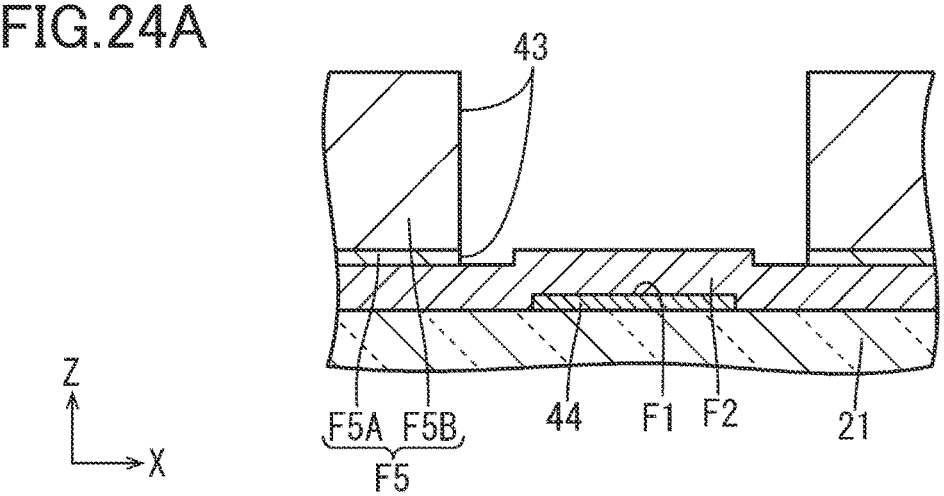
FIG. 24A is a cross-sectional view of the part of the array substrate near the film formation range limiting groove portion after the execution of the first insulating film forming step (i.e. a cross-sectional view taken along line C-C in FIG. 11)
Figure 24B:
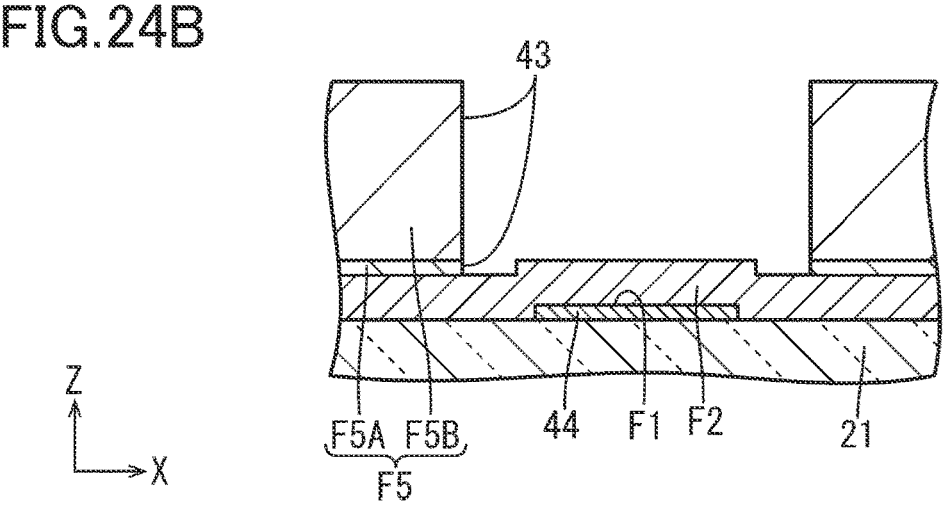
FIG. 24B is a cross-sectional view of the part of the array substrate near the film formation range limiting groove portion after the execution of the common line forming step (i.e. a cross-sectional view taken along line C-C in FIG. 11)
Figure 24C:
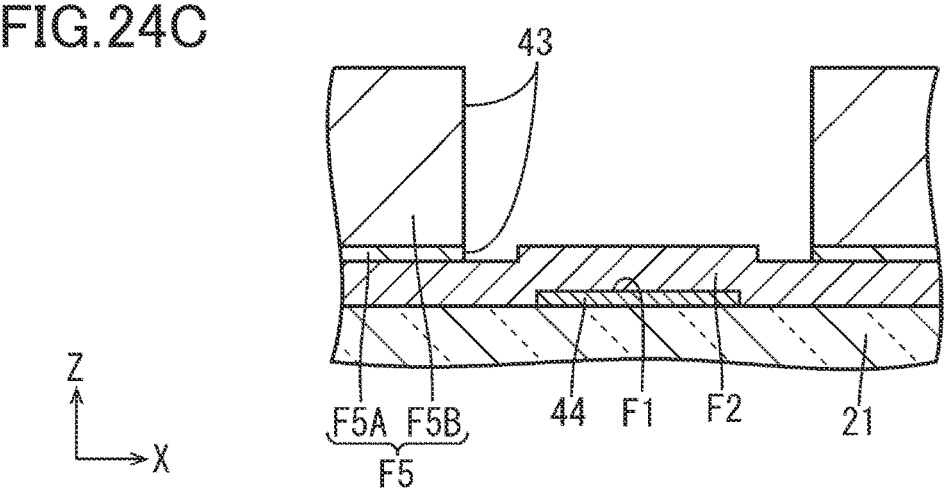
FIG. 24C is a cross-sectional view of the part of the array substrate near the film formation range limiting groove portion after the execution of the common electrode forming step (i.e. a cross-sectional view taken along line C-C in FIG. 11)

FIG. 19A is a cross-sectional view of the part of the array substrate 21 near the TFT 23 after the execution of the first insulating film forming step. FIG. 19B is a cross-sectional view of the part of the array substrate 21 near the TFT 23 after the execution of the common line forming step. FIG. 19C is a cross-sectional view of the part of the array substrate 21 near the TFT 23 after the execution of the common electrode forming step. FIG. 20A is a cross-sectional view of the part of the array substrate 21 near the gate circuit unit 14 after the execution of the first insulating film forming step. FIG. 20B is a cross-sectional view of the part of the array substrate 21 near the gate circuit unit 14 after the execution of the common line forming step. FIG. 20C is a cross-sectional view of the part of the array substrate 21 near the gate circuit unit 14 after the execution of the common electrode forming step. FIG. 21A is a cross-sectional view of the part of the array substrate 21 near the center of the lead wire 15 after the execution of the first insulating film forming step (i.e. a cross-sectional view taken along line A-A in FIG. 6). FIG. 21B is a cross-sectional view of the part of the array substrate 21 near the center of the lead wire 15 after the execution of the common line forming step (i.e. a cross-sectional view taken along line A-A in FIG. 6). FIG. 21C is a cross-sectional view of the part of the array substrate 21 near the center of the lead wire 15 after the execution of the common electrode forming step (i.e. a cross-sectional view taken along line A-A in FIG. 6). FIG. 22A is a cross-sectional view of the part of the array substrate 21 near the end of the lead wire 15 after the execution of the first insulating film forming step (i.e. a cross-sectional view taken along line B-B in FIG. 6). FIG. 22B is a cross-sectional view of the part of the array substrate 21 near the end of the lead wire 15 after the execution of the common line forming step (i.e. a cross-sectional view taken along line B-B in FIG. 6). FIG. 22C is a cross-sectional view of the part of the array substrate 21 near the end of the lead wire 15 after the execution of the common electrode forming step (i.e. a cross-sectional view taken along line B-B in FIG. 6). FIG. 23A is a cross-sectional view of the part of the array substrate 21 near the terminal portion 16 after the execution of the first insulating film forming step. FIG. 23B is a cross-sectional view of the part of the array substrate 21 near the terminal portion 16 after the execution of the common line forming step. FIG. 23C is a cross-sectional view of the part of the array substrate 21 near the terminal portion 16 after the execution of the common electrode forming step. FIG. 24A is a cross-sectional view of the part of the array substrate 21 near the film formation range limiting groove portion 43 after the execution of the first insulating film forming step (i.e. a cross-sectional view taken along line C-C in FIG. 11). FIG. 24B is a cross-sectional view of the part of the array substrate 21 near the film formation range limiting groove portion 43 after the execution of the common line forming step (i.e. a cross-sectional view taken along line C-C in FIG. 11). FIG. 24C is a cross-sectional view of the part of the array substrate 21 near the film formation range limiting groove portion 43 after the execution of the common electrode forming step (i.e. a cross-sectional view taken along line C-C in FIG. 11).

Figure 25A:
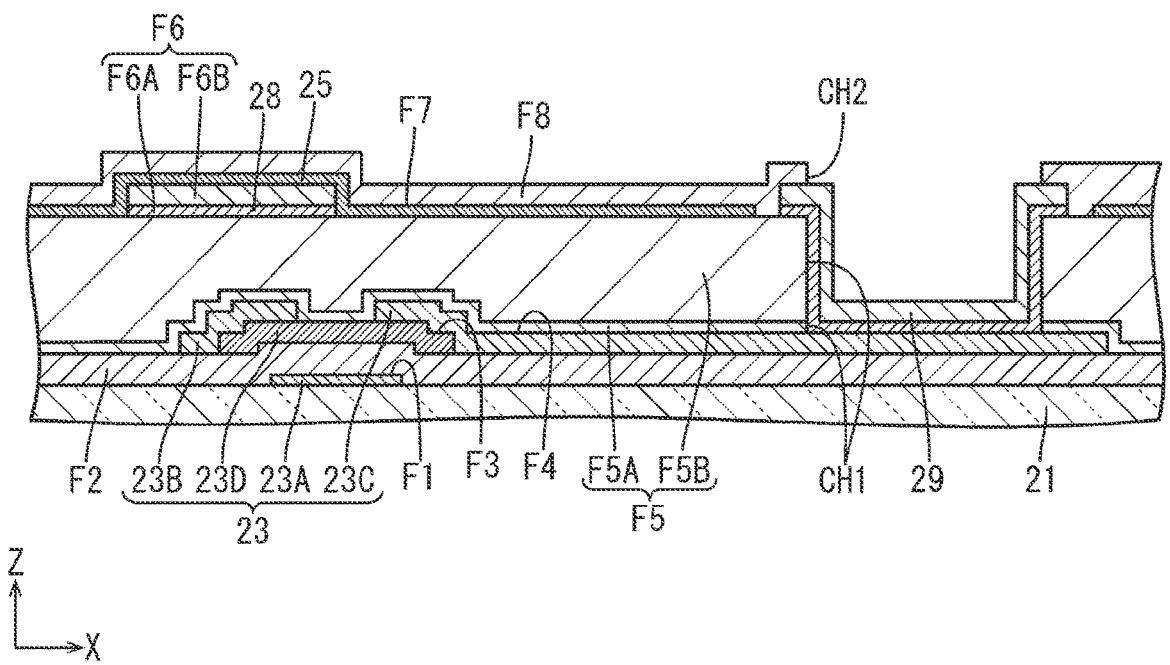
FIG. 25A is a cross-sectional view of the part of the array substrate near the TFT after execution of a second insulating film forming step.
Figure 25B:
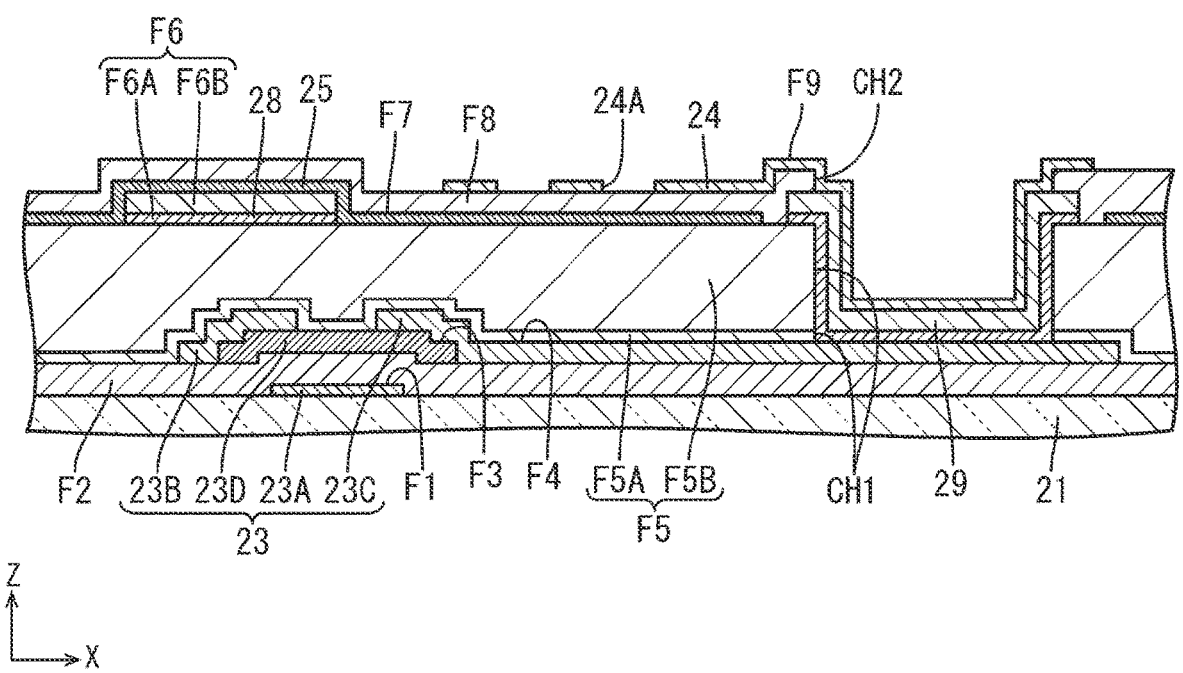
FIG. 25B is a cross-sectional view of the part of the array substrate near the TFT after execution of a pixel electrode forming step.
Figure 26A:
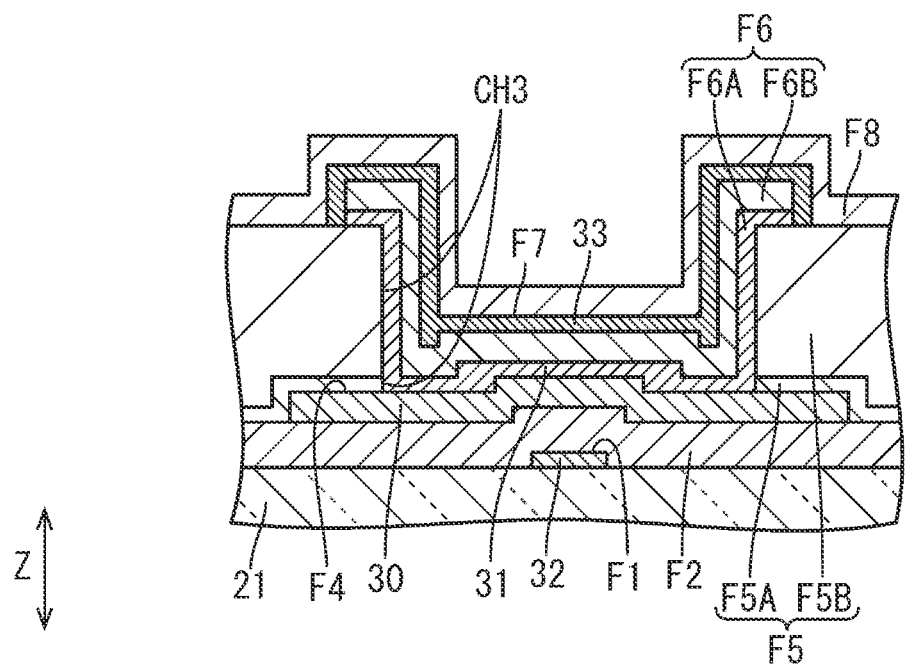
FIG. 26A is a cross-sectional view of the part of the array substrate near the gate circuit unit after the execution of the second insulating film forming step.
Figure 26B:
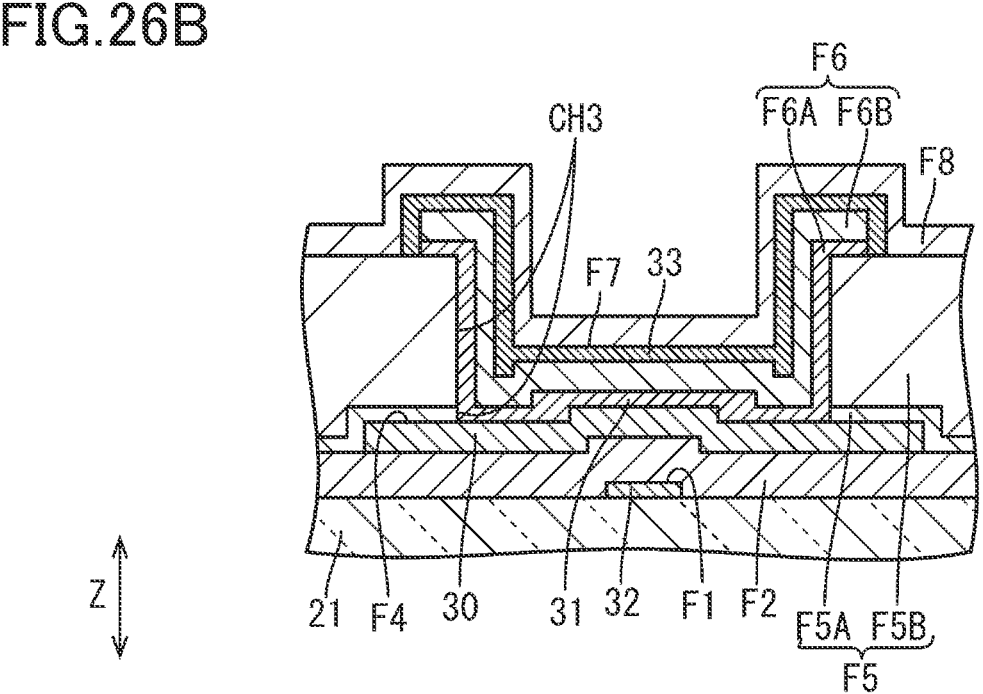
FIG. 26B is a cross-sectional view of the part of the array substrate near the gate circuit unit after the execution of the pixel electrode forming step.
Figure 27A:
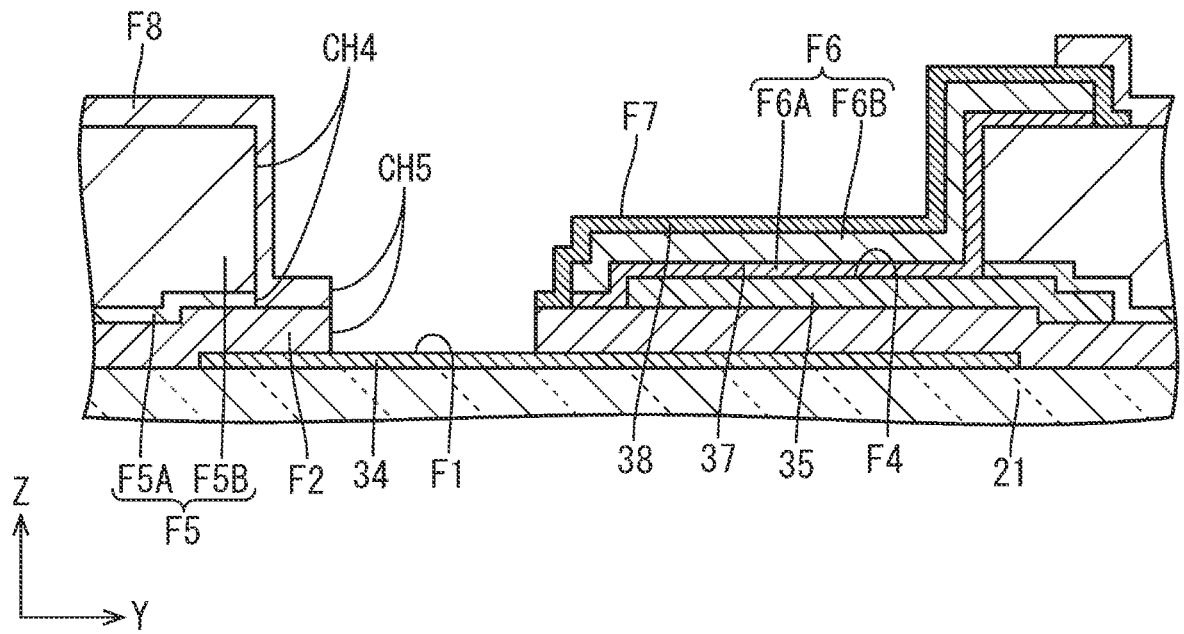
FIG. 27A is a cross-sectional view of the part of the array substrate near the center of the lead wire after the execution of the second insulating film forming step (i.e. a cross-sectional view taken along line A-A in FIG. 6)
Figure 27B:
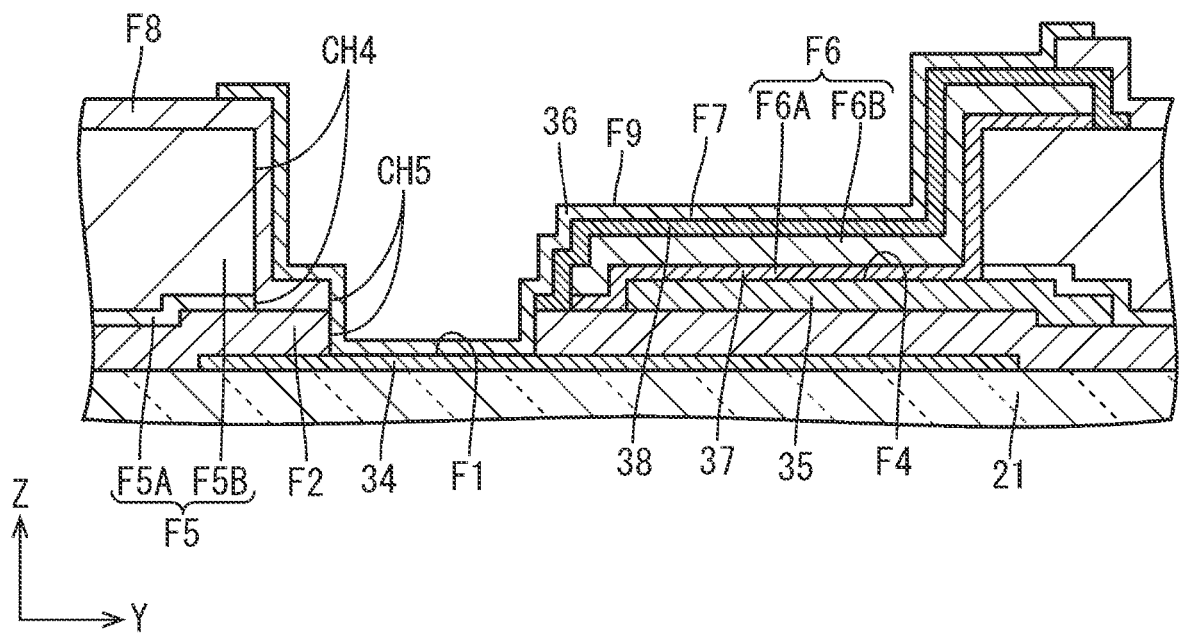
FIG. 27B is a cross-sectional view of the part of the array substrate near the center of the lead wire after the execution of the pixel electrode forming step (i.e. a cross-sectional view taken along line A-A in FIG. 6)
Figure 28A:
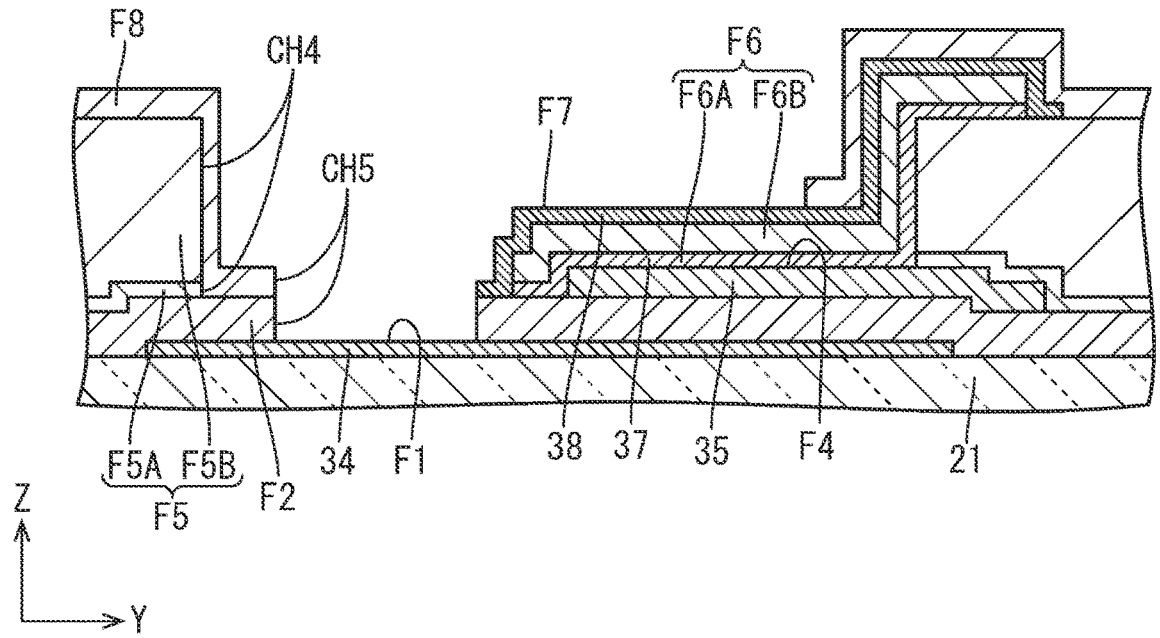
FIG. 28A is a cross-sectional view of the part of the array substrate near the end of the lead wire after the execution of the second insulating film forming step (i.e. a cross-sectional view taken along line B-B in FIG. 6)
Figure 28B:
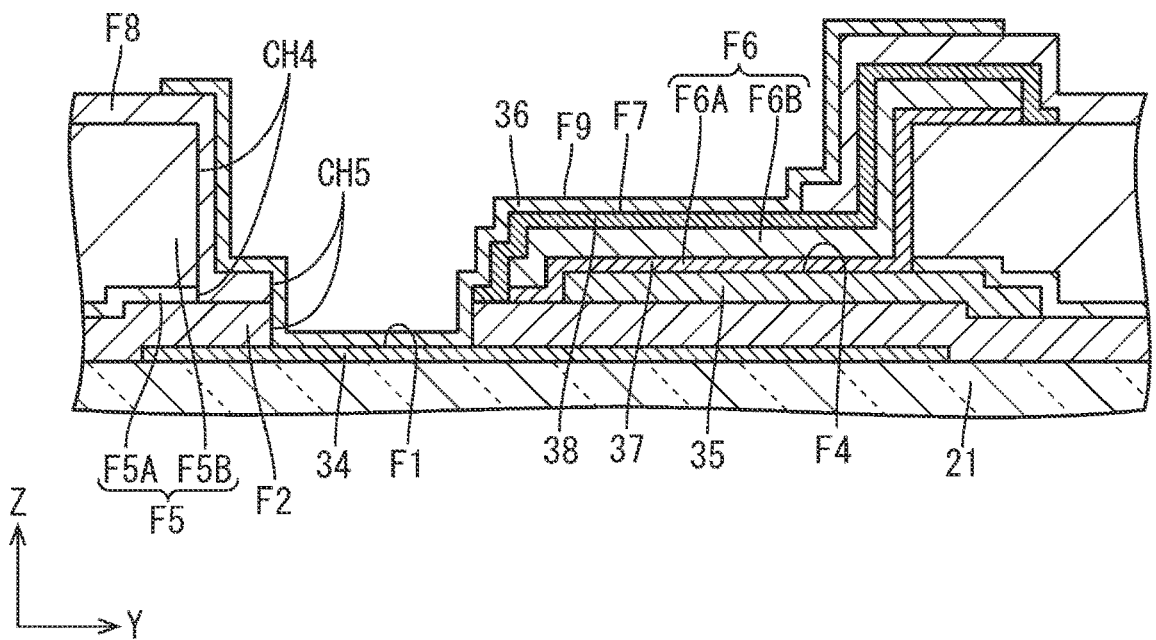
FIG. 28B is a cross-sectional view of the part of the array substrate near the end of the lead wire after the execution of the pixel electrode forming step (i.e. a cross-sectional view taken along line B-B in FIG. 6)
Figure 29A:
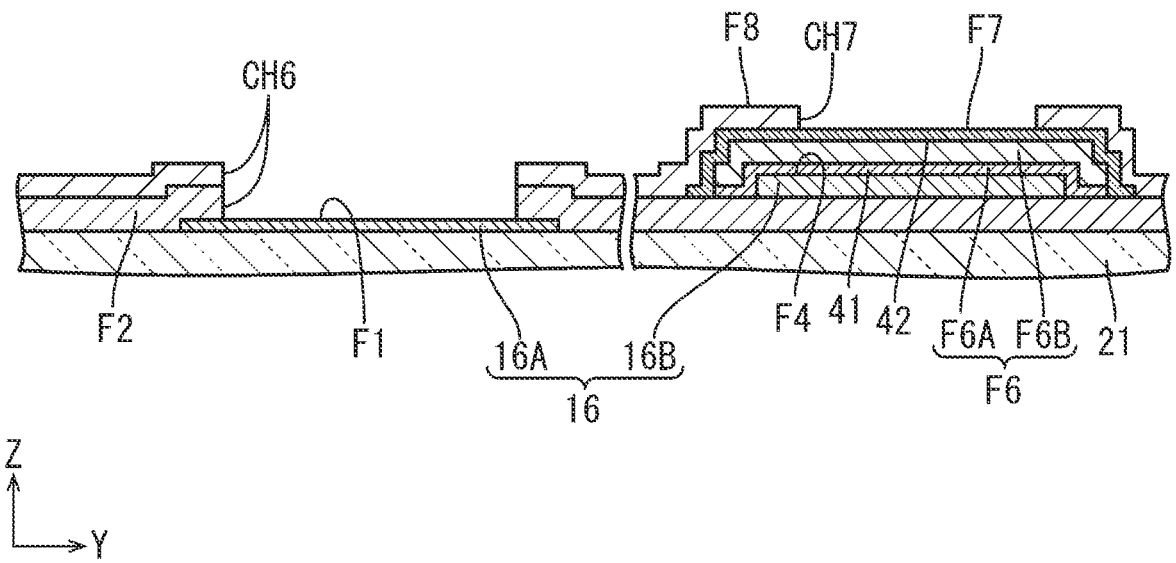
FIG. 29A is a cross-sectional view of the part of the array substrate near the terminal portion after the execution of the second insulating film forming step.
Figure 29B:
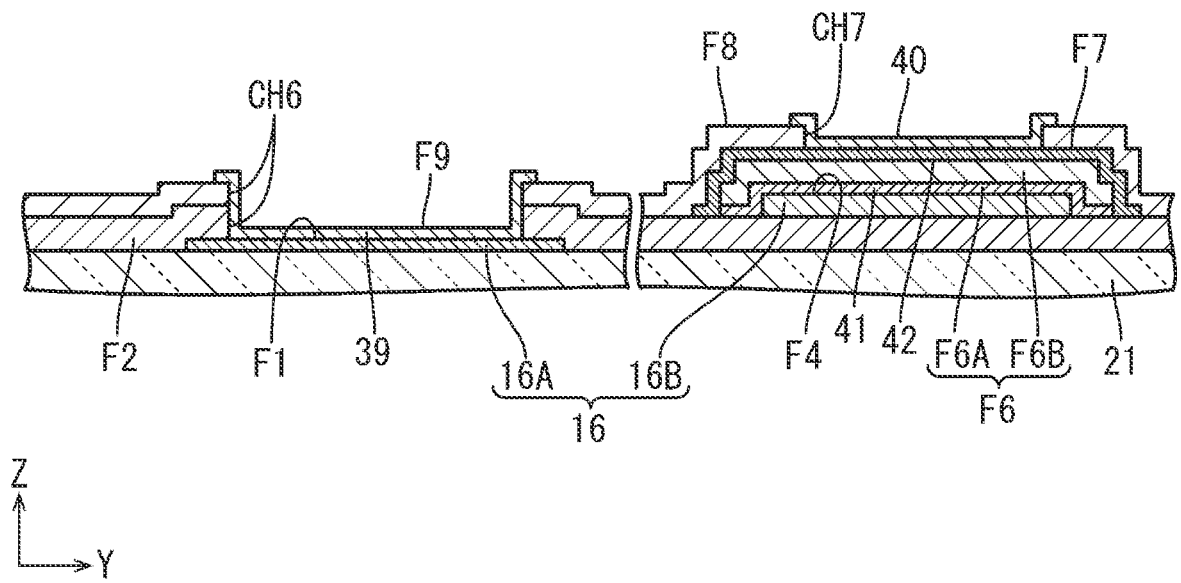
FIG. 29B is a cross-sectional view of the part of the array substrate near the terminal portion after the execution of the pixel electrode forming step.
Figure 30A:
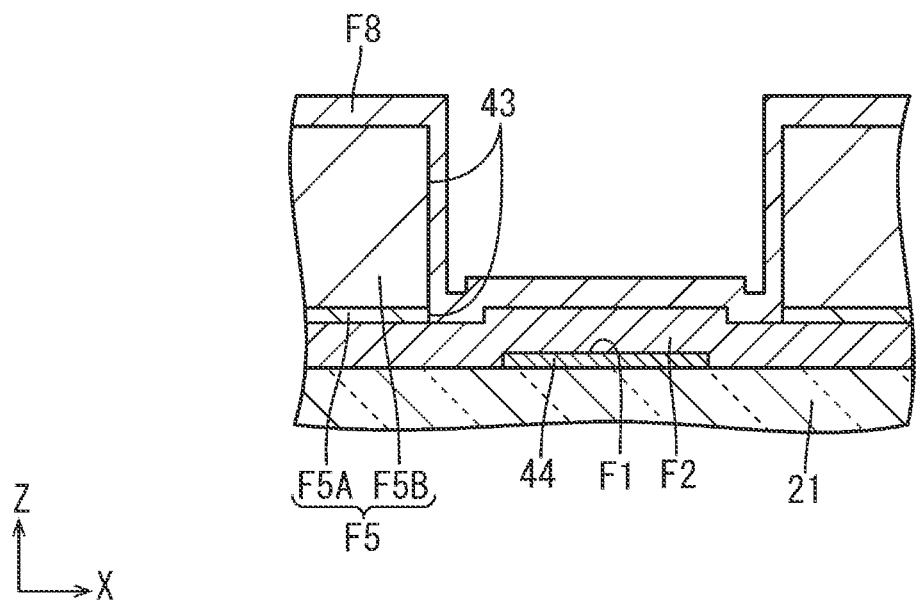
FIG. 30A is a cross-sectional view of the part of the array substrate near the film formation range limiting groove portion after the execution of the second insulating film forming step (i.e. a cross-sectional view taken along line C-C in FIG. 11)
Figure 30B:
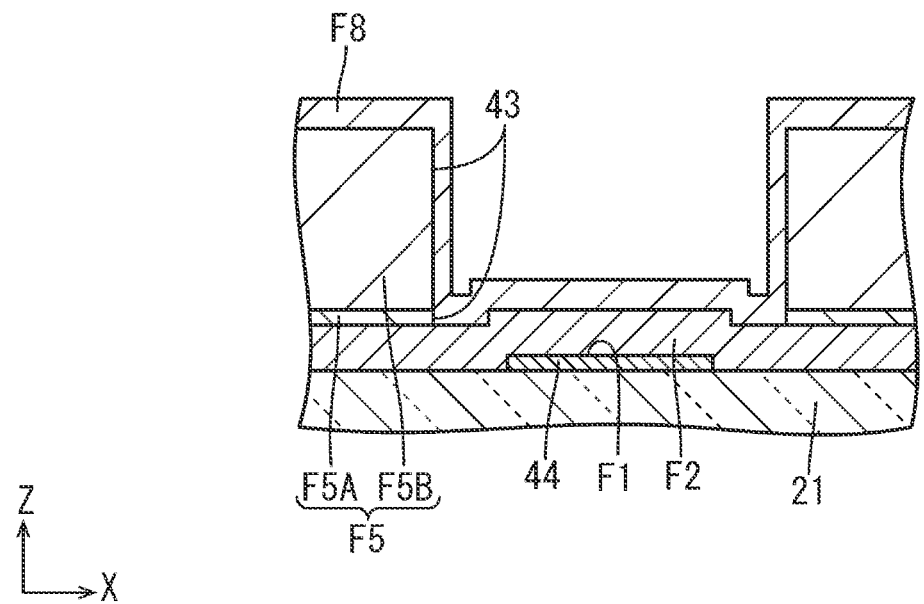
FIG. 30B is a cross-sectional view of the part of the array substrate near the film formation range limiting groove portion after the execution of the pixel electrode forming step (i.e. a cross-sectional view taken along line C-C in FIG. 11)

FIG. 25A is a cross-sectional view of the part of the array substrate 21 near the TFT 23 after the execution of the second insulating film forming step. FIG. 25B is a cross-sectional view of the part of the array substrate 21 near the TFT 23 after the execution of the pixel electrode forming step. FIG. 26A is a cross-sectional view of the part of the array substrate 21 near the gate circuit unit 14 after the execution of the second insulating film forming step. FIG. 26B is a cross-sectional view of the part of the array substrate 21 near the gate circuit unit 14 after the execution of the pixel electrode forming step. FIG. 27A is a cross-sectional view of the part of the array substrate 14 near the center of the lead wire 15 after the execution of the second insulating film forming step (i.e. a cross-sectional view taken along line A-A in FIG. 6). FIG. 27B is a cross-sectional view of the part of the array substrate 21 near the center of the lead wire 15 after the execution of the pixel electrode forming step (i.e. a cross-sectional view taken along line A-A in FIG. 6). FIG. 28A is a cross-sectional view of the part of the array substrate 21 near the end of the lead wire 15 after the execution of the second insulating film forming step (i.e. a cross-sectional view taken along line B-B in FIG. 6). FIG. 28B is a cross-sectional view of the part of the array substrate 21 near the end of the lead wire 15 after the execution of the pixel electrode forming step (i.e. a cross-sectional view taken along line B-B in FIG. 6). FIG. 29A is a cross-sectional view of the part of the array substrate 21 near the terminal portion 16 after the execution of the second insulating film forming step. FIG. 29B is a cross-sectional view of the part of the array substrate 21 near the terminal portion 16 after the execution of the pixel electrode forming step. FIG. 30A is a cross-sectional view of the part of the array substrate 21 near the film formation range limiting groove portion 43 after the execution of the second insulating film forming step (i.e. a cross-sectional view taken along line C-C in FIG. 11). FIG. 30B is a cross-sectional view of the part of the array substrate 21 near the film formation range limiting groove portion 43 after the execution of the pixel electrode forming step (i.e. a cross-sectional view taken along line C-C in FIG. 11).

In the gate line forming step, a resist film is applied after a first conducting film F1 has been formed at a higher layer than the glass substrate of the array substrate 21, and the resist film is patterned by exposing the resist film via a photomask first and then developing the resist film. Then, by etching the first conducting film F1 via the resist film thus patterned, the first conducting film F1 is patterned, so that a gate line 26 is formed and, as shown in FIG. 13A, a gate electrode 23A of the TFT 23 is formed. At this point in time, as shown in FIG. 14A, a third wire 32 is formed near the gate circuit unit 14. Further, as shown in FIGS. 15A and 16A, a lower layer wire 34 is formed near the lead wire 15. Further, as shown in FIG. 17A, a lower layer terminal portion 16A is formed near a terminal formation area TA. Further, as shown in FIG. 18A, a wire 44 is formed near the area outside the display area AA. After completion of the etching of the first conducting film F1, the resist film is removed.

As a result of execution of the gate insulating film forming step, a gate insulating film F2 is formed at a higher layer than the glass substrate and the first conducting film F1 as shown in FIGS. 13B, 14B, 15B, 16B, 17B, and 18B. After that, in the channel portion forming step, a resist film is applied after a semiconductor film F3 has been formed at a higher layer than the gate insulating film F2, and the resist film is patterned by exposing the resist film via a photomask first and then developing the resist film. Then, by etching the semiconductor film F3 via the resist film thus patterned, the semiconductor film F3 is patterned, so that as shown in FIG. 13B, a channel portion 23D of the TFT 23 is formed.

In the source line forming step, a resist film is applied after a second conducting film F4 has been formed at a higher layer than the gate insulating film F2 and the semiconductor film F3, and the resist film is patterned by exposing the resist film via a photomask first and then developing the resist film. Then, by etching the second conducting film F2 via the resist film thus patterned, the second conducting film F4 is patterned, so that a source line 27 is formed and, as shown in FIG. 13C, a source electrode 23B and a drain electrode 23C of the TFT 23 are formed. That is, the source line forming step includes a source electrode forming step of forming a source electrode 23B and a drain electrode forming step of forming a drain electrode 23C. At this point in time, as shown in FIG. 14C, a first wire 30 is formed near the gate circuit unit 14. Further, as shown in FIGS. 15C and 16C, an upper layer wire 35 is formed near the lead wire 15. Further, as shown in FIG. 17C, an upper layer terminal portion 16B is formed near the terminal formation area TA. Further, as shown in FIG. 18C, no structure composed of the second conducting film F4 is formed near the area outside the display area AA. After completion of the etching of the second conducting film F4, the resist film is removed.

In the first insulating film forming step, an interlayer insulating film F5A and a planarizing film F5B are sequentially and successively formed at a higher layer than the second conducting film F4 or other components to constitute a first insulating film F5. Since the planarizing film F5B, which is located at a higher layer, is made of a photosensitive organic material, the planarizing film F5B is patterned by exposing the planarizing film F5B via a photomask first and then developing the planarizing film F5B. Further, the planarizing film F5B thus patterned is utilized as a mask to etch the interlayer insulating film F5A, which is located at a lower layer. Then, as shown in FIG. 19A, a first pixel contact hole CH1 is bored through the first insulating film F5 near the TFT 23 so as to be in a place overlapping a part of the drain electrode 23C. At this point in time, as shown in FIG. 20, an inter-wire contact hole CH3 is bored through the first insulating film F5 near the gate circuit unit 14 so as to be in a place overlapping a part of the first wire 30. Further, as shown in FIGS. 21A and 22A, a first wire connection contact hole CH4 is bored through the first insulating film F5 near the lead wire 15 so as to be in a place overlapping the upper layer wire 35. Further, as shown in FIG. 23A, the first insulating film F5 is not formed near the terminal formation area TA. Further, as shown in FIG. 24A, a film formation range limiting groove portion 43 is bored through the first insulating film F5 near the area outside the display area AA so as to be in a place in the area outside the display area AA.

In the common line forming step, a transparent electrode film F6A and a metal film F6B are sequentially and successively formed at a higher layer than the first insulating film F5 to constitute a third conducting film F6. After that, a resist film is applied, and the resist film is patterned by exposing the resist film via a photomask first and then developing the resist film. Then, by etching both the transparent electrode film F6A and the metal film F6B, which constitute the third conducting film F6, via the resist film thus patterned, the third conducting film F6 is patterned, so that as shown in FIG. 19B, a common line 28 is formed. At this point in time, an intermediate electrode 29 is formed in a place overlapping the first pixel contact hole CH1. That is, the common line forming step includes an intermediate electrode forming step of forming an intermediate electrode 29. Further, as shown in FIG. 20B, a second wire 31 is formed near the gate circuit unit 14. A part of the second wire 31 is disposed in a place overlapping the inter-wire contact hole CH3, and is therefore connected to the first wire 30 through the inter-wire contact hole CH3. Further, as shown in FIGS. 21B and 22B, a first wire intermediate electrode 37 is formed near the lead wire 15 so as to be in a place overlapping the upper layer wire 35 exposed via the first wire connection contact hole CH4. The first wire intermediate electrode 37 is connected to the upper layer wire 35 through the first wire connection contact hole CH4. Further, as shown in FIG. 23B, a terminal intermediate electrode 41 is formed near the terminal formation area TA so as to be in a place overlapping the upper layer terminal portion 16B. The terminal intermediate electrode 41 is connected to the upper layer terminal portion 16B. Further, as shown in FIG. 24B, no structure composed of the third conducting film F6 is formed near the area outside the display area AA. After completion of the etching of the third conducting film F6, the resist film is removed.

In the common electrode forming step, a resist film is applied after a fourth conducting film F7 has been formed at a higher layer than the third conducting film F6 or other components, and the resist film is patterned by exposing the resist film via a photomask first and then developing the resist film. Then, by etching the fourth conducting film F7 via the resist film thus patterned, the fourth conducting film F7 is patterned, so that as shown in FIG. 19C, a common electrode 25 is formed. The common electrode 25 thus formed has an opening surrounding the intermediate electrode 29, thereby avoiding a short circuit with the intermediate electrode 29. At this point in time, as shown in FIG. 20C, a wire protecting portion 33 is formed near the gate circuit unit 14. The wire protecting portion 33 is disposed in such a manner as to cover the second wire 31, and can therefore provide protection for the second wire 31. Further, as shown in FIGS. 21C and 22C, a second wire intermediate electrode 38 is formed near the lead wire 15 so as to be in a place overlapping the first wire intermediate electrode 37. The second wire intermediate electrode 38 is connected to the first wire intermediate electrode 37. Further, as shown in FIG. 23C, a secondary terminal protecting portion 42 is formed near the terminal formation area TA so as to be in a place overlapping the terminal intermediate electrode 41. The secondary terminal protecting portion 42 protects the terminal intermediate electrode 41 by covering it, and is connected to the terminal intermediate electrode 41. Further, as shown in FIG. 24C, no structure composed of the fourth conducting film F7 is formed near the area outside the display area AA. After completion of the etching of the fourth conducting film F7, the resist film is removed.

In the second insulating film forming step, a resist film is applied after a second insulating film F8 has been formed at a higher layer than the fourth conducting film F7 or other components, and the resist film is patterned by exposing the resist film via a photomask first and then developing the resist film. Then, etching is performed via the resist film thus patterned. At this point in time, the gate insulating film F2 and the second insulating film F8 are patterned by etching the gate insulating film F2 in addition to the second insulating film F8. Then, as shown in FIG. 25A, a second pixel contact hole CH2 is bored through the second insulating film F8 near the TFT 23 so as to be in a place overlapping the intermediate electrode 29. At this point in time, as shown in FIG. 26A, the second insulating film F8 is solidly present and covers the wire protecting portion 33 near the gate circuit unit 14. On the other hand, as shown in FIGS. 27A and 28A, a second wire connection contact hole CH5 communicating with the gate insulating film F2 and the second insulating film F8 is bored near the lead wire 15 by etching the gate insulating film F2 together with the second insulating film F8. In the second insulating film F8, the second wire connection contact hole CH5 ranges over a large part of the first wire connection contact hole CH4, and in the gate insulating film F5, the second wire connection contact hole CH5 ranges over the lower layer wire 34 but does not range over the upper layer wire 35. Accordingly, a part of the lower layer wire 34 and the second wire intermediate electrode 38 are exposed through the second wire connection contact hole CH5. Further, as shown in FIG. 29A, a lower layer terminal contact hole CH6 and an upper layer terminal contact hole CH7 are bored through the second insulating film F8 near the terminal formation area TA so as to be in places overlapping the lower layer terminal portion 16A and the terminal intermediate electrode 41, respectively. The lower layer terminal portion 16A is exposed through the lower layer terminal contact hole CH6, and the secondary terminal protecting portion 42 is exposed through the upper layer terminal contact hole CH7. Further, as shown in FIG. 30A, the second insulating film F8 is solidly present and covers the film formation range limiting groove portion 43 near the area outside the display area AA. A depression that is as thick as the first insulating film F5 is formed in a surface of the second insulating film F8 by the film formation range limiting groove portion 43. After completion of the etching of the gate insulating film F2 and the second insulating film F8, the resist film is removed.

In the pixel electrode forming step, a resist film is applied after a fifth conducting film F9 has been formed at a higher layer than the second insulting film F8 or other components, and the resist film is patterned by exposing the resist film via a photomask first and then developing the resist film. Then, by etching the fifth conducting film F9 via the resist film thus patterned, the fifth conducting film F9 is patterned, so that as shown in FIG. 25B, a pixel electrode 24 is formed. The pixel electrode 24 thus formed is connected to the intermediate electrode 29 through the second pixel contact hole CH2. At this point in time, as shown in FIG. 26B, no structure composed of the fifth conducting film F9 is formed near the gate circuit unit 14. Further, as shown in FIGS. 27B and 28B, a wire connection portion 36 is formed near the lead wire 15. The wire connection portion 36 is connected to a part of the lower layer wire 34 and the second wire intermediate electrode 38 through the second wire connection contact hole CH5. This wire connection portion 36 makes a connection between the lower layer wire 34 and the upper layer wire 35. Further, as shown in FIG. 29B, a lower layer terminal protecting portion 39 and an upper layer terminal protecting portion 40 are formed near the terminal formation area TA. The lower layer terminal protecting portion 39 is connected to the lower layer terminal portion 16A through the lower layer terminal contact hole CH6. The lower layer terminal portion 16A is protected by being covered with the lower layer terminal protecting portion 39. The upper layer terminal protecting portion 40 is connected to the secondary terminal protecting portion 42 through the upper layer terminal contact hole CH7. The upper layer terminal portion 16B is protected by being covered with the upper layer terminal protecting portion 40, the terminal intermediate electrode 41, and the secondary terminal protecting portion 42. Further, as shown in FIG. 30B, no structure composed of the fifth conducting film F9 is formed near the area outside the display area AA. After completion of the etching of the fifth conducting film F9, the resist film is removed.

As noted above, although the array substrate 21 has a complex structure, the present embodiment reduces the number of steps involved in manufacturing by using only eight photomasks in the array substrate manufacturing step.

As described above, a liquid crystal panel (display device) 11 of the present embodiment includes: a TFT (switching element) 23 having a drain electrode (pixel connection portion) 23C; a first insulating film F5, disposed at a higher layer than the drain electrode 23C, that has a first pixel contact hole CH1 formed therein so as to be in a place overlapping at least a part of the drain electrode 23C; a common line 28 disposed at a higher layer than the first insulating film F5; an intermediate electrode 29 composed of the same third conducting film (conducting film) F6 as the common line 28, disposed to overlap the first pixel contact hole CH1, and connected to the drain electrode 23C; a common electrode 25 disposed at a higher layer than the common line 28, not connected to the intermediate electrode 29, and connected to the common line 28; a second insulating film F8, disposed at a higher layer than the common electrode 25, that has a second pixel contact hole CH2 formed therein so as to be in a place overlapping at least a part of the intermediate electrode 29; and a pixel electrode 24 disposed at a higher layer than the second insulating film F8 and disposed so that at least a part of the pixel electrode 24 overlaps the second pixel contact hole CH2.

In this way, when the TFT 23 is driven, a signal is supplied to the pixel electrode 24 via the intermediate electrode 29 from the drain electrode 23C, and the pixel electrode 24 is charged to an electric potential based on the signal. The common electrode 25 is kept at a common potential supplied by the common line 28. Accordingly, an image is displayed on the basis of a potential difference between the pixel electrode 24 thus charged and the common electrode 25 kept at the common potential. The pixel electrode 24 is connected to the intermediate electrode 29 through the second pixel contact hole CH2 formed in the second insulating film F8, and the intermediate electrode 29 is connected to the drain electrode 23C through the first pixel contact hole CH1 formed in the first insulating film F5. Such a configuration makes it possible to form another contact hole in the first insulating film F5 in forming the first pixel contact hole CH1, thus making it possible to connect a structure composed of the same fourth conducting film (conducting film) F7 as the common electrode 25 or the same third conducting film (conducting film) F6 as the common line 28 to a structure composed of the same second conducting film (conducting film) F4 as the drain electrode 23C. Similarly, such a configuration makes it possible to form another contact hole in the second insulating film F8 in forming the second pixel contact hole CH2, thus making it possible to connect a structure composed of the same fifth conducting film (conducting film) F9 as the pixel electrode 24 to the structure composed of the same fourth conducting film F7 as the common electrode 25 or the same third conducting film F6 as the common line 28. As a result, even in the case of a complex structure, the number of photomasks that are used in manufacturing is reduced, and the number of steps involved in manufacturing is reduced.

Incidentally, the common electrode 25 disposed at a higher layer than the common electrode 28 is formed not to be connected to the intermediate electrode 29 but to be connected to the common line 28. When a common electrode 25 of such a pattern is formed, the drain electrode 23C may be overetched if the drain electrode 23C is exposed through the first pixel contact hole CH1. In that respect, since the drain electrode 23C is covered with the intermediate electrode 29 composed of the same third conducting film F6 as the common line 28, the intermediate electrode 29 functions as an etching stopper when the common electrode 25 is patterned, so that the drain electrode 23C is hardly overetched. The common electrode 25 thus formed has a reduced distribution of resistance, as it is connected to the common line 28.

Further, the liquid crystal panel 11 may further include a first wire 30 composed of the same second conducting film F4 as the drain electrode 23; and a second wire 31 composed of the same third conducting film F6 as the common line 28 and disposed so that at least a part of the second wire 31 overlaps the first wire 30. The first insulating film may have an inter-wire contact hole CH3 formed therein so as to be in a place overlapping the first wire 30 and the second wire 31. In this way, the inter-wire contact hole CH3 is formed in the first insulating film F5 when the first pixel contact hole CH1 is formed. This makes it possible to connect the second wire 31, which is a structure composed of the same third conducting film F6 as the common line 28, to the first wire 30, which is a structure composed of the same second conducting film F4 as the drain electrode 23C.

Further, the liquid crystal panel 11 may further include a wire protecting portion 33 composed of the same fourth conducting film F7 as the common electrode 25 and disposed to overlap at least a part of the second wire 31. In this way, the second wire 31 is connected to the wire protecting portion 33 composed of the same fourth conducting film F7 as the common electrode 25, and at least a part of the second wire 31 is protected by the wire protecting portion 33. This makes it hard for the second wire 31 to suffer corrosion or other damage.

Further, the liquid crystal panel 11 may further include: a gate insulating film (lower layer insulating film) F2 disposed at a lower layer than the drain electrode 23C; a lower layer wire 34 disposed at a lower layer than the gate insulating film F2; an upper layer wire 35 composed of the same second conducting film F4 as the drain electrode 23C; and a wire connection portion 36 composed of the same fifth conducting film F9 as the pixel electrode 24 and disposed so that at least a part of the wire connection portion 36 overlaps the lower layer wire 34 and the upper layer wire 35. The first insulating film F5 may have a first wire connection contact hole CH4 formed therein so as to be in a place overlapping at least a part of the wire connection portion 36, and the gate insulating film F2 and the second insulating film F8 may have a second wire connection contact hole CH5 formed therein so as to be in a place overlapping the lower layer wire 34 and at least a part of the first wire connection contact hole CH4 but not overlapping the upper layer wire 35. In this way, the second wire connection contact hole CH5 is formed in the gate insulating film F2 and the second insulating film F8 when the second pixel contact hole CH2 is formed in the second insulating film F8. The gate insulating film F2 can be patterned by using a photomask that is used for patterning the second insulating film F8. This is suitable to reducing the number of photomasks and reducing the number of steps. It should be noted that the second wire connection contact hole CH5 is not formed in a part of the gate insulating film F2 overlapping the upper layer wire 35. Meanwhile, the first wire connection contact hole CH4 is formed in the first insulating film F5 when the first pixel contact hole CH1 is formed. This makes it possible to connect the wire connection portion 36, which is a structure composed of the same fifth conducting film F9 as the pixel electrode 24, to the upper layer wire 35, which is a structure composed of the same second conducting film F4 as the drain electrode 23C, and the lower layer wire 34 disposed at a lower layer than the upper layer wire 35 via the gate insulating film F2. The upper layer wire 35 and the lower layer wire 34 are connected to each other via the drain electrode 23C.

Further, the liquid crystal panel 11 may further include a first wire intermediate electrode (wire intermediate electrode) 37 composed of the same third conducting film F6 as the common line 28 and disposed to overlap the first wire connection contact hole CH4 but not to overlap the second wire connection contact hole CH5 in the gate insulating film F2. In this way, the first wire intermediate electrode 37 composed of the same third conducting film F6 as the common line 28 is connected through the first wire connection contact hole CH4 to the upper layer wire 35 composed of the same second conducting film F4 as the drain electrode 23C. Since a part of the upper layer wire 35 overlapping the first wire connection contact hole CH4 is covered with the first wire intermediate electrode 37, the first wire intermediate electrode 37 functions as an etching stopper when the second insulating film F8 is patterned, so that the upper layer wire 35 is hardly overetched.

Further, the liquid crystal panel 11 may further include a second wire intermediate electrode (secondary wire intermediate electrode) 38 composed of the same fourth conducting film F4 as the common electrode 25 and disposed to overlap the first wire intermediate electrode 37. In this way, the first wire intermediate electrode 37 composed of the same third conducting film F6 as the common line 28 and the wire connection portion 36 composed of the same fifth conducting film F9 as the pixel electrode 24 are connected to each other via the second wire intermediate electrode 38 composed of the same fourth conducting film F7 as the common electrode 25.

Further, the liquid crystal panel 11 may further include: a display area AA in which at least the common electrode 25 and the pixel electrode 24 are disposed and in which an image is displayed; and an alignment film F10 disposed in at least the display area AA at a higher layer than the pixel electrode 24. The first insulating film F5 may have a film formation range limiting groove portion 43, formed in a place located in an area outside the display area AA, that limits a film formation range of the alignment film F10. In this way, the film formation range limiting groove portion 43 is formed in the first insulating film F5 when the first pixel contact hole CH1 is formed. In the formation of the alignment film F10, the spread of the alignment film F10 as far as the area outside the display area AA can be limited by the film formation range limiting groove portion 43.

Further, the liquid crystal panel 11 may further include: an upper layer terminal portion (terminal portion) 16B disposed in a terminal formation area TA not overlapping the common electrode 25 or the pixel electrode 24 and composed of the second conducting film F4 as the drain electrode 23; and an upper layer terminal protecting portion (terminal protecting portion) 40 composed of the same fifth conducting film F9 as the pixel electrode 24 and disposed to overlap the upper layer terminal portion 16B. The first insulating film F5 may not be formed in the terminal formation area TA, and the second insulating film F8 may have an upper layer terminal contact hole (terminal contact hole) CH7 formed therein so as to be in a place overlapping the upper layer terminal portion 16B and the upper layer terminal protecting portion 40. In this way, when the first pixel contact hole CH1 is formed, the first insulating film F5 is not formed in the terminal formation area TA, which does not overlap the common electrode 25 or the pixel electrode 24. In addition, when the second pixel contact hole CH2 is formed, the upper layer terminal contact hole CH7 is formed in the place in the second insulating film F8 overlapping the upper layer terminal portion 16B and the upper layer terminal protecting portion 40. This causes the upper layer terminal portion 16B, which is a structure disposed in the terminal formation area TA and composed of the same second conducting film F4 as the drain electrode 23C, and the upper layer terminal protecting portion 40, which is a structure composed of the same fifth conducting film F9 as the pixel electrode 24 and disposed to overlap the upper layer terminal portion 16B, to be connected to each other. By being covered with the upper layer terminal protecting portion 40, the upper layer terminal portion 16B hardly suffers corrosion or other damage.

Further, the liquid crystal panel 11 may further include a terminal intermediate electrode 41 composed of the same third conducting film F6 as the common line 28 and disposed to overlap the upper layer terminal portion 16B. In this way, the upper layer terminal portion 16B composed of the same second conducting film F4 as the drain electrode 23C and the upper layer terminal protecting portion 40 composed of the same fifth conducting film F9 as the pixel electrode 24 are connected to each other via the terminal intermediate electrode 41 composed of the same third conducting film F6 as the common line 28. Since the upper layer terminal portion 16B is covered with the terminal intermediate electrode 41, the terminal intermediate electrode 41 functions as an etching stopper when the second insulating film F8 is patterned, so that the upper layer terminal portion 16B is hardly overetched.

Further, the liquid crystal panel 11 may further include a secondary terminal protecting portion 42 composed of the same fourth conducting film F7 as the common electrode 25 and disposed to overlap the upper layer terminal portion 16B and the upper layer terminal protecting portion 40. In this way, by being covered with the upper layer terminal protecting portion 40 and the secondary terminal protecting portion 42, the upper layer terminal portion 16B hardly suffers corrosion or other damage.

Further, the liquid crystal panel 11 may further include: a gate insulating film F2 disposed at a lower layer than the drain electrode 23C; a lower layer terminal portion 16A disposed in a terminal formation area TA not overlapping the common electrode 25 or the pixel electrode 24 and disposed at a lower layer than the gate insulating film F2; and a lower layer terminal protecting portion 39 composed of the same fifth conducting film F9 as the pixel electrode 24 and disposed to overlap the lower layer terminal portion 16A. The first insulating film F5 may not be formed in the terminal formation area TA, and the gate insulating film F2 and the second insulating film F8 may have a lower layer terminal contact hole CH6 formed therein so as to be in a place overlapping the lower layer terminal portion 16A and the lower layer terminal protecting portion 39. In this way, when the first pixel contact hole CH1 is formed, the first insulating film F5 is not formed in the terminal formation area TA, which does not overlap the common electrode 25 or the pixel electrode 24. In addition, when the second pixel contact hole CH2 is formed in the second insulating film F8, the lower layer terminal contact hole CH6 is formed in the place in the gate insulating film F2 and the second insulating film F8 overlapping the lower layer terminal portion 16A and the lower layer terminal protecting portion 39. The gate insulating film F2 can be patterned by using a photomask that is used for patterning the second insulating film F8. This is suitable to reducing the number of photomasks and the reducing the number of steps. This causes the lower layer terminal portion 16A disposed in the terminal formation area TA and disposed at a lower layer than the gate insulating film F2 and the lower layer terminal protecting portion 39 composed of the same fifth conducting film F9 as the pixel electrode 24 and disposed to overlap the lower layer terminal portion 16A to be connected to each other. By being covered with the lower layer terminal protecting portion 39, the lower layer terminal portion 16A hardly suffers corrosion or other damage.

Further, the common line 28 may be constituted by a third conducting film (conducting film) F6 having a laminated structure including a transparent electrode film F6A at a lower layer and a metal film F6B at a higher layer. In this way, the third conducting film F6, which constitutes the common line 28 and has a laminated structure, includes the transparent electrode film F6A at a lower layer, the common line 28 is kept well adhesive to the first insulating film F5. Moreover, the metal film F6 at a higher layer reduces the interconnection resistance of the common line 28. This is suitable to reducing the distribution of resistance of the common electrode 25.

Further, a method for manufacturing a liquid crystal panel 11 according to the present embodiment includes: a drain electrode forming step (pixel connection portion forming step) of forming a drain electrode 23C of a TFT 23; a first insulating film forming step of forming a first insulating film F5 at a higher layer than the drain electrode 23C and forming a first pixel contact hole CH1 in a place in the first insulating film F5 overlapping the drain electrode 23C; a common line forming step of forming a common line 28 at a higher layer than the first insulating film F5 and forming an intermediate electrode 29 disposed to overlap the first pixel contact hole CH1 and composed of the same third conducting film F6 as the common line 28; a common electrode forming step of forming, at a higher layer than the common line 28, a common electrode 25 that is not connected to the intermediate electrode 29 but is connected to the common line 28; a second insulating film forming step of forming a second insulating film F8 at a higher layer than the common electrode 25 and forming a second pixel contact hole CH2 in a place in the second insulating film F8 overlapping at least a part of the intermediate electrode 29; and a pixel electrode forming step of forming a pixel electrode 24 at a higher layer than the second insulating film F8 so that at least a part of the pixel electrode 24 overlaps the second pixel contact hole CH2.

In this way, as a result of execution of the drain electrode forming step, a drain electrode 23C of a TFT 23 is formed. After that, as a result of execution of the first insulating film forming step, a first insulating film F5 is formed at a higher layer than the drain electrode 23C, and the first insulating film F5 thus formed is patterned, so that a first pixel contact hole CH1 is formed in a place overlapping the drain electrode 23C. After that, as a result of execution of the common line forming step, a common line 28 is formed at a higher layer than the first insulating film F5, and an intermediate electrode 29 disposed to overlap the first pixel contact hole CH1 is formed. After that, as a result of execution of the common electrode forming step, a common electrode 25 that is not connected to the intermediate electrode 29 but is connected to the common line 28 is formed at a higher layer than the common line 28. After that, as a result of execution of the second insulating film forming step, a second insulating film F8 is formed at a higher layer than the common electrode 25, and the second insulating film F8 thus formed is patterned, so that a second pixel contact hole CH2 is formed in a place overlapping at least a part of the intermediate electrode 29. After that, as a result of execution of the pixel electrode forming step, a pixel electrode 24 is formed at a higher layer than the second insulating film F8 so that at least a part of the pixel electrode 24 overlaps the second pixel contact hole CH2.

The first insulating film forming step makes it possible to form another contact hole in forming the first pixel contact hole CH1 in the first insulating film F5, thus making it possible to connect the common electrode 25 or a structure composed of the same third conducting film F6 as the common line 28 to a structure composed of the same second conducting film F4 as the drain electrode 23C. Similarly, the second insulating film forming step makes it possible to form another contact hole in forming the second pixel contact hole CH2 in the second insulating film F8, thus making it possible to connect a structure composed of the same fifth conducting film F9 as the pixel electrode 24 to the common electrode 25 or the structure composed of the same third conducting film F6 as the common line 28. As a result, even in the case of a complex structure, the number of photomasks that are used in manufacturing is reduced, and the number of steps involved in manufacturing is reduced.

Incidentally, in the common electrode forming step, the common electrode 25 disposed at a higher layer than the common electrode 28 is formed not to be connected to the intermediate electrode 29 but to be connected to the common line 28. When a common electrode 25 of such a pattern is formed in the common electrode forming step, the drain electrode 23C may be overetched if the drain electrode 23C is exposed through the first pixel contact hole CH1. In that respect, since the drain electrode 23C is covered with the intermediate electrode 29 composed of the same third conducting film F6 as the common line 28 in the common line forming step and the drain electrode 23C is covered with the intermediate electrode 29, the intermediate electrode 29 functions as an etching stopper when the common electrode 25 is patterned in the common electrode forming step, so that the drain electrode 23C is hardly overetched. The common electrode 25 thus formed has a reduced distribution of resistance, as it is connected to the common line 28.

Embodiment 2

Embodiment 2 is described with reference to FIGS. 31A to 42B. Embodiment 2 illustrates an alteration made to the common line forming step of the array substrate manufacturing step. It should be noted that a repeated description of structures, actions, and effects which are similar to those of Embodiment 1 is omitted.

Figure 31A:
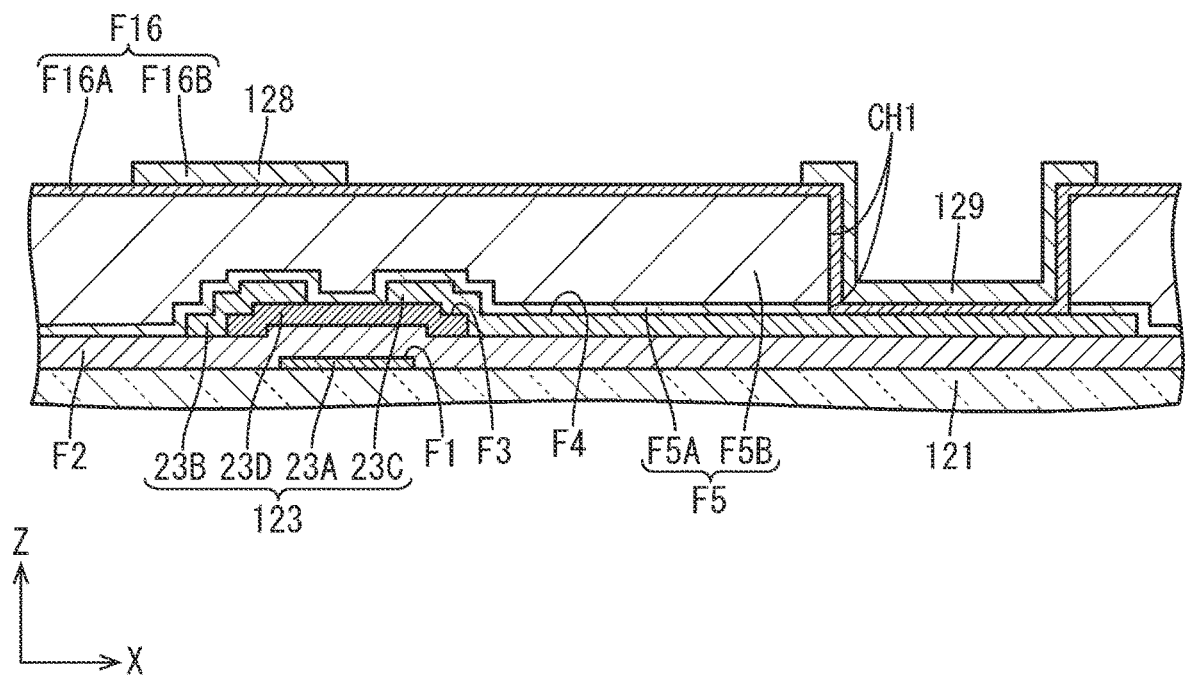
FIG. 31A is a cross-sectional view of a part of an array substrate according to Embodiment 2 near a TFT after execution of a common line forming step.
Figure 31B:
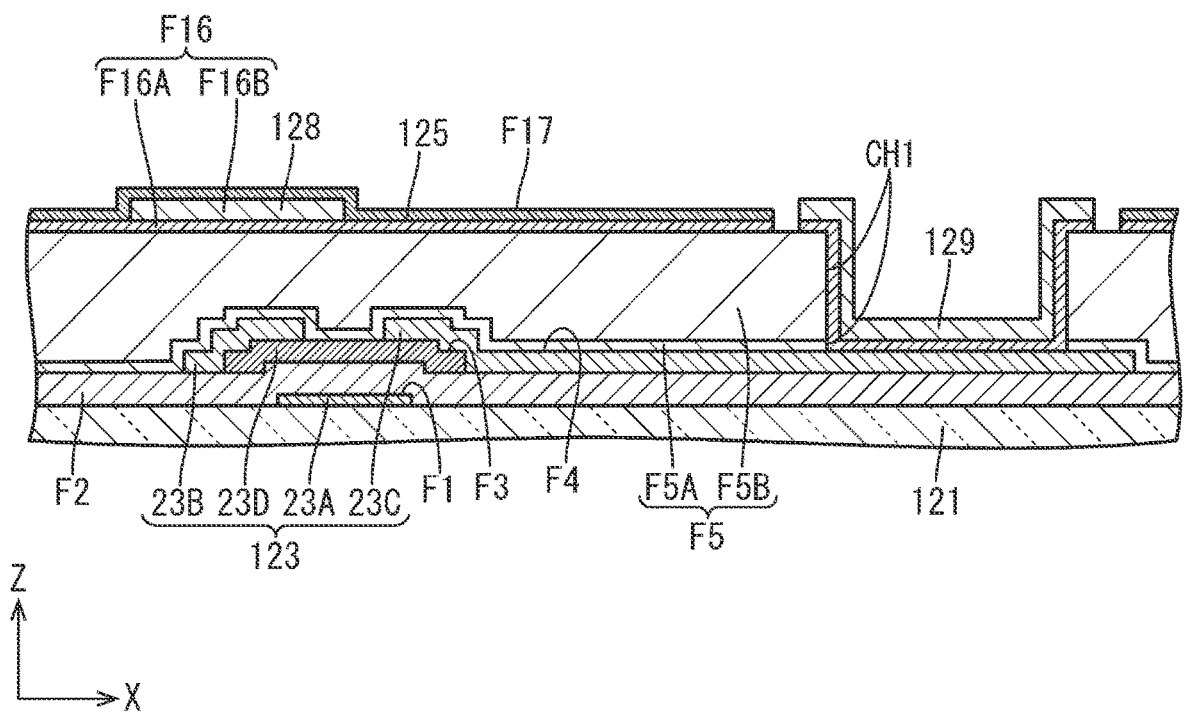
FIG. 31B is a cross-sectional view of the part of the array substrate near the TFT after execution of a common electrode forming step.
Figure 32A:
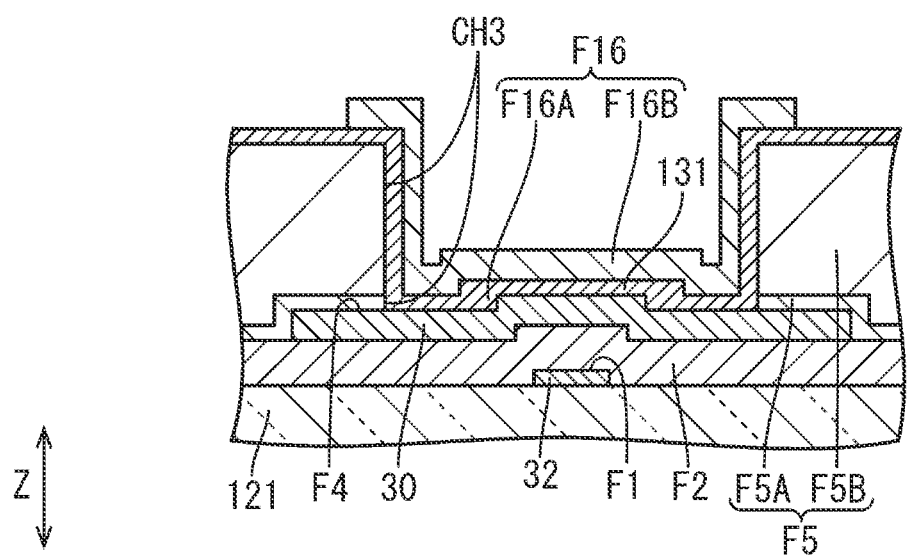
FIG. 32A is a cross-sectional view of the part of the array substrate near a gate circuit unit after the execution of the common line forming step.
Figure 32B:
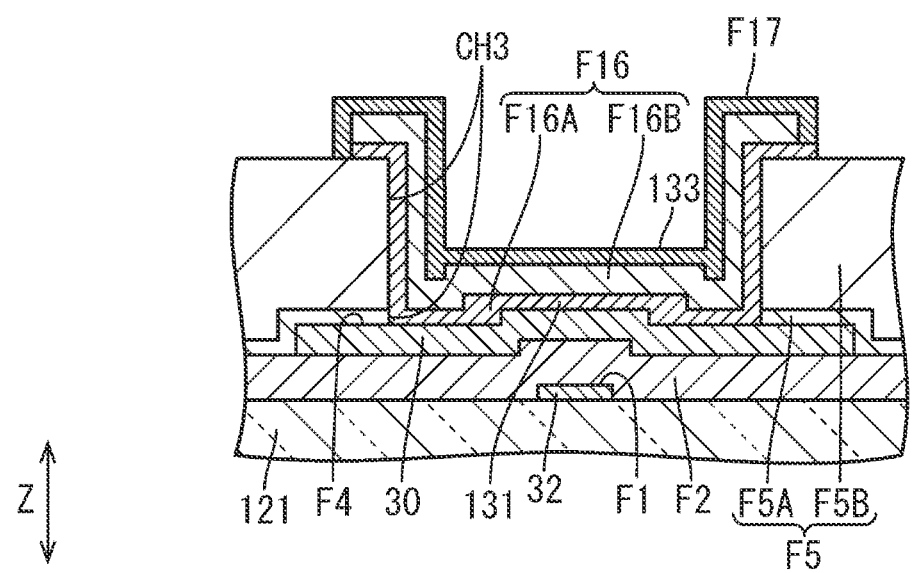
FIG. 32B is a cross-sectional view of the part of the array substrate near the gate circuit unit after the execution of the common electrode forming step.
Figure 33A:
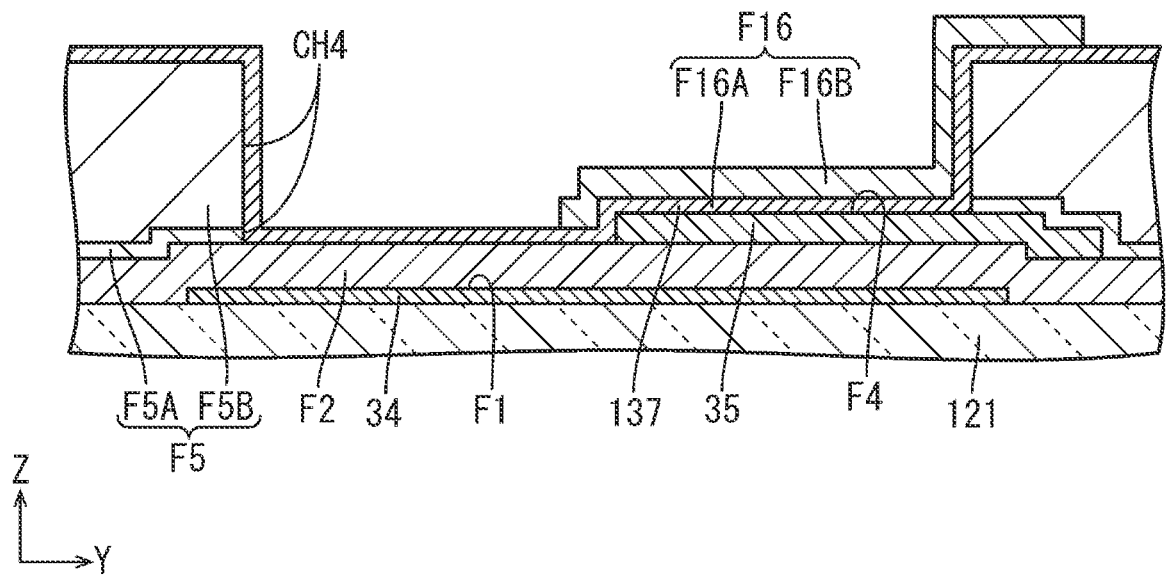
FIG. 33A is a cross-sectional view of a part of the array substrate near the center of a lead wire after the execution of the common line forming step (i.e. a cross-sectional view taken along a line equivalent to line A-A in FIG. 6)
Figure 33B:
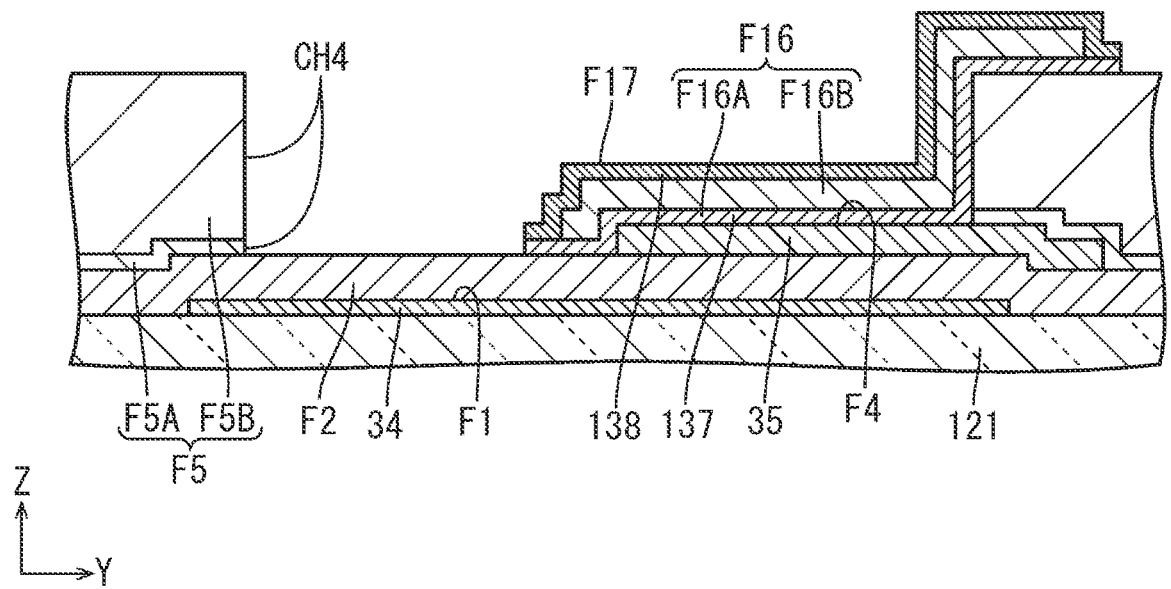
FIG. 33B is a cross-sectional view of the part of the array substrate near the center of the lead wire after the execution of the common electrode forming step (i.e. a cross-sectional view taken along the line equivalent to line A-A in FIG. 6)
Figure 34A:
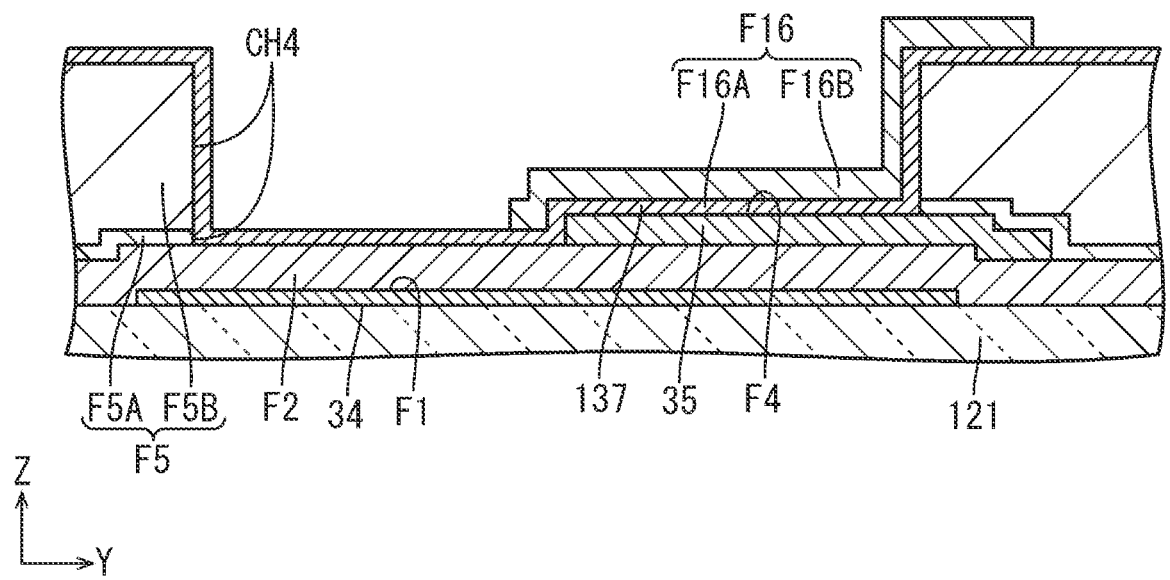
FIG. 34A is a cross-sectional view of a part of the array substrate near an end of the lead wire after the execution of the common line forming step (i.e. a cross-sectional view taken along a line equivalent to line B-B in FIG. 6)
Figure 34B:
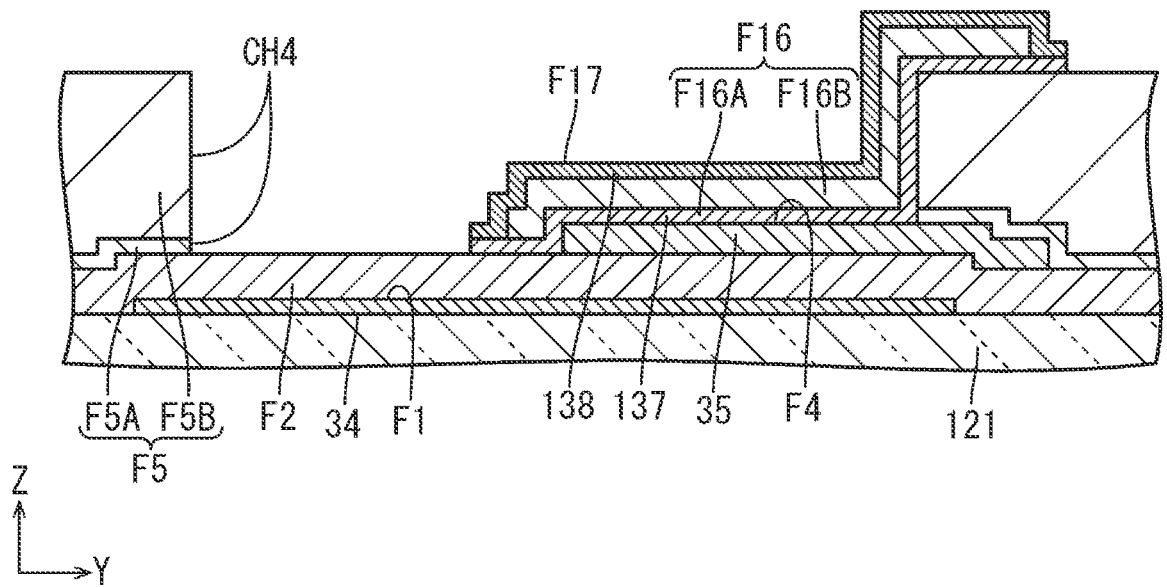
FIG. 34B is a cross-sectional view of the part of the array substrate near the end of the lead wire after the execution of the common electrode forming step (i.e. a cross-sectional view taken along the line equivalent to line B-B in FIG. 6)
Figure 35A:
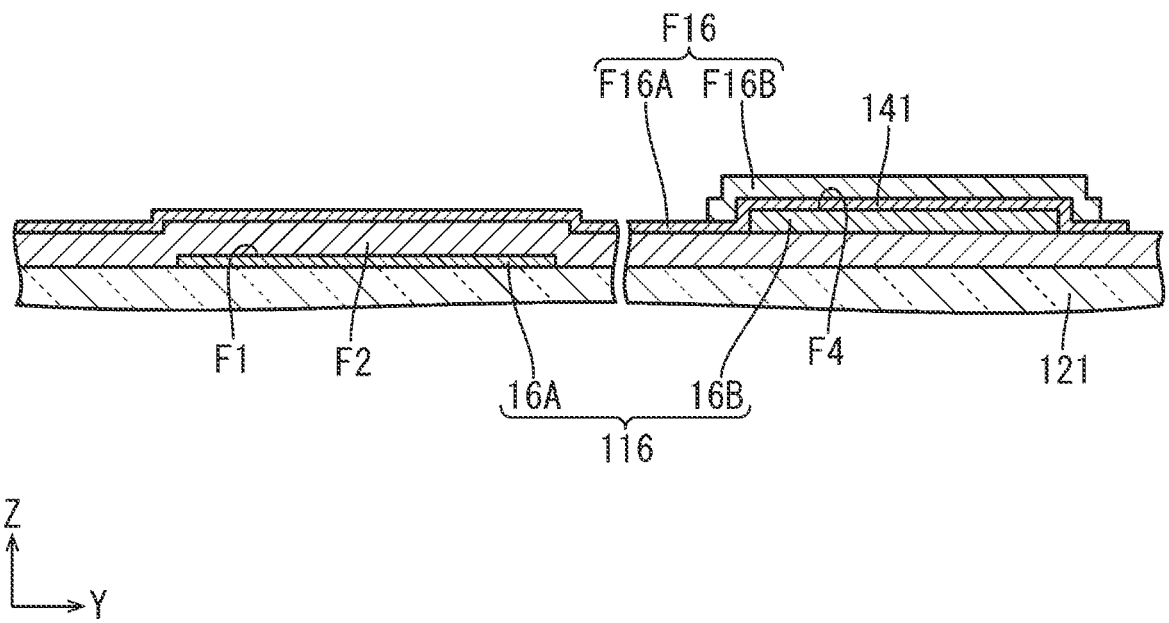
FIG. 35A is a cross-sectional view of a part of the array substrate near a terminal portion after the execution of the common line forming step.
Figure 35B:
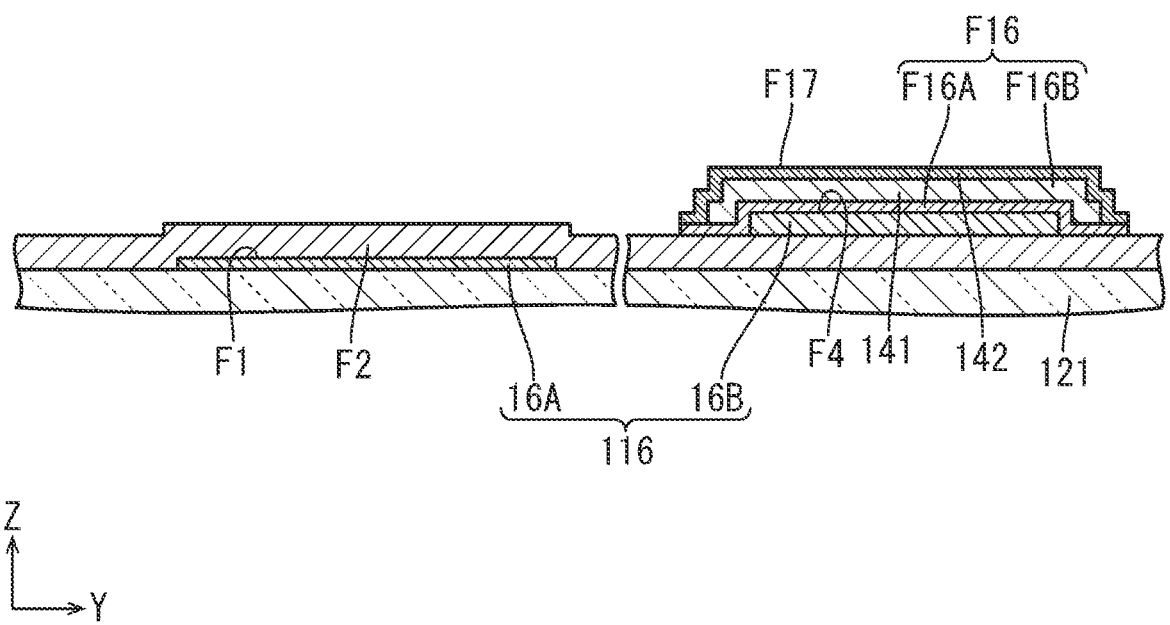
FIG. 35B is a cross-sectional view of the part of the array substrate near the terminal portion after the execution of the common electrode forming step.
Figure 36A:
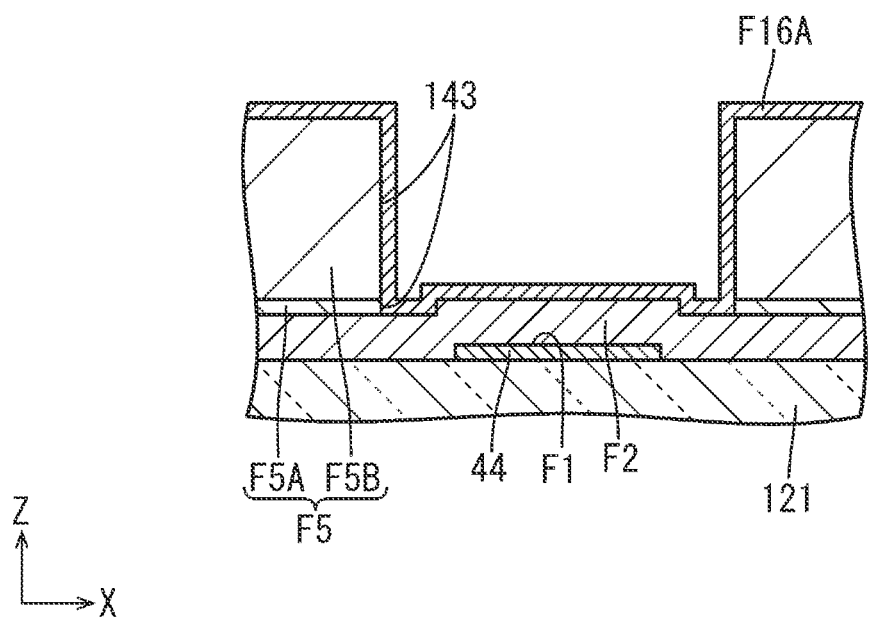
FIG. 36A is a cross-sectional view of a part of the array substrate near a film formation range limiting portion after the execution of the common line forming step (i.e. a cross-sectional view taken along a line equivalent to line C-C in FIG. 11)
Figure 36B:
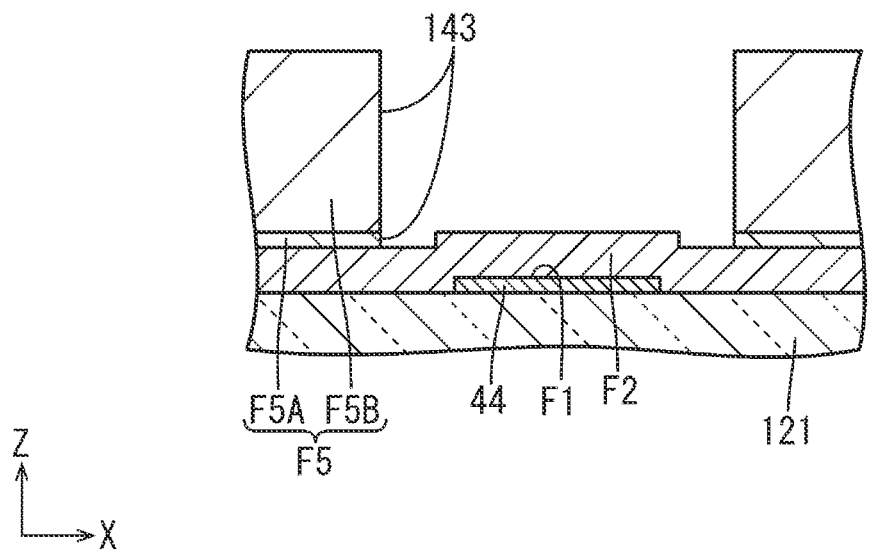
FIG. 36B is a cross-sectional view of the part of the array substrate near the film formation range limiting portion after the execution of the common electrode forming step (i.e. a cross-sectional view taken along the line equivalent to line C-C in FIG. 11)

In the following, the common line forming step of the array substrate manufacturing step and the steps subsequent to the common line forming step are described with reference to FIGS. 31A to 42B. FIG. 31A is a cross-sectional view of a part of an array substrate 121 near a TFT 123 after the execution of the common line forming step. FIG. 31B is a cross-sectional view of the part of the array substrate 121 near the TFT 123 after the execution of the common electrode forming step. FIG. 32A is a cross-sectional view of a part of the array substrate 121 near a gate circuit unit 14 after the execution of the common line forming step. FIG. 32B is a cross-sectional view of the part of the array substrate 121 near the gate circuit unit 14 after the execution of the common electrode forming step. FIG. 33A is a cross-sectional view of a part of the array substrate 121 near the center of a lead wire 15 after the execution of the common line forming step (i.e. a cross-sectional view taken along a line equivalent to line A-A in FIG. 6). FIG. 33B is a cross-sectional view of the part of the array substrate 121 near the center of the lead wire 15 after the execution of the common electrode forming step (i.e. a cross-sectional view taken along the line equivalent to line A-A in FIG. 6). FIG. 34A is a cross-sectional view of a part of the array substrate 121 near an end of the lead wire 15 after the execution of the common line forming step (i.e. a cross-sectional view taken along a line equivalent to line B-B in FIG. 6). FIG. 34B is a cross-sectional view of the part of the array substrate 121 near the end of the lead wire 15 after the execution of the common electrode forming step (i.e. a cross-sectional view taken along the line equivalent to line B-B in FIG. 6). FIG. 35A is a cross-sectional view of a part of the array substrate 121 near a terminal portion 116 after the execution of the common line forming step. FIG. 35B is a cross-sectional view of the part of the array substrate 121 near the terminal portion 116 after the execution of the common electrode forming step. FIG. 36A is a cross-sectional view of a part of the array substrate 121 near a film formation range limiting portion 143 after the execution of the common line forming step (i.e. a cross-sectional view taken along a line equivalent to line C-C in FIG. 11). FIG. 36B is a cross-sectional view of the part of the array substrate 121 near the film formation range limiting portion 143 after the execution of the common electrode forming step (i.e. a cross-sectional view taken along the line equivalent to line C-C in FIG. 11).

Figure 37A:
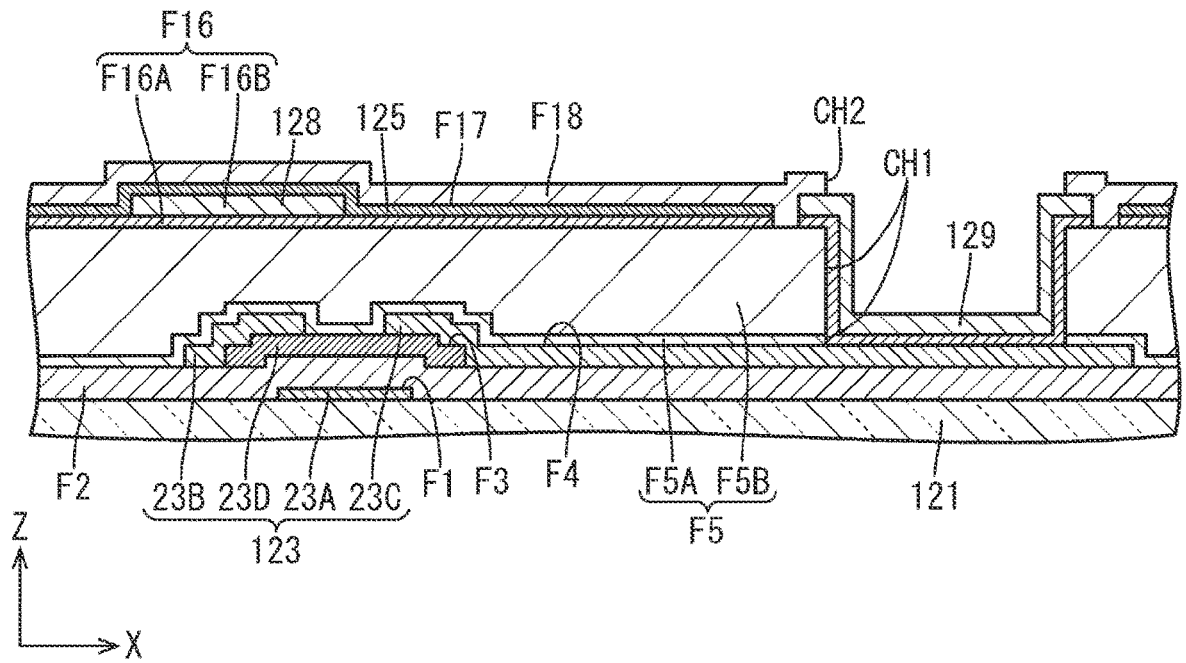
FIG. 37A is a cross-sectional view of the part of the array substrate near the TFT after execution of a second insulating film forming step.
Figure 37B:
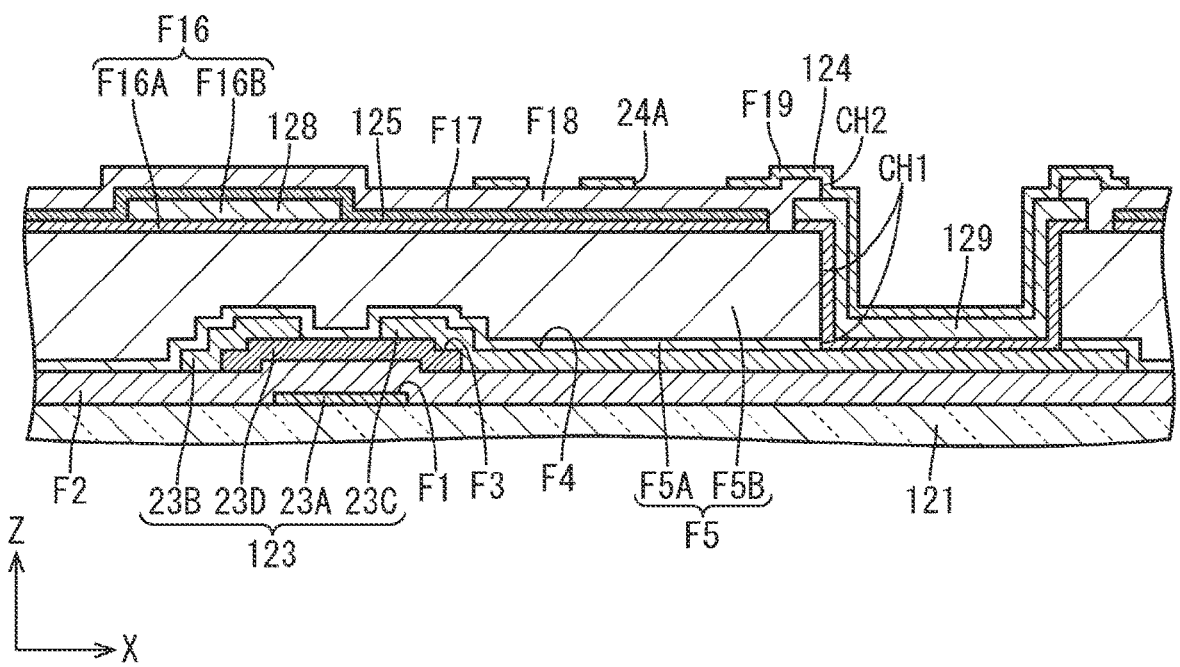
FIG. 37B is a cross-sectional view of the part of the array substrate near the TFT after execution of a pixel electrode forming step.
Figure 38A:
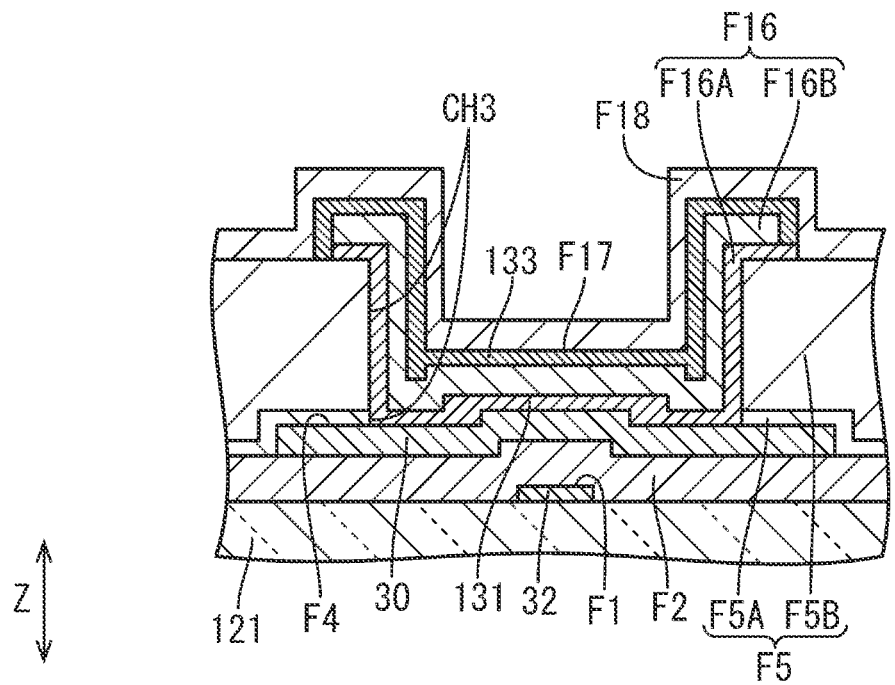
FIG. 38A is a cross-sectional view of the part of the array substrate near the gate circuit unit after the execution of the second insulating film forming step.
Figure 38B:
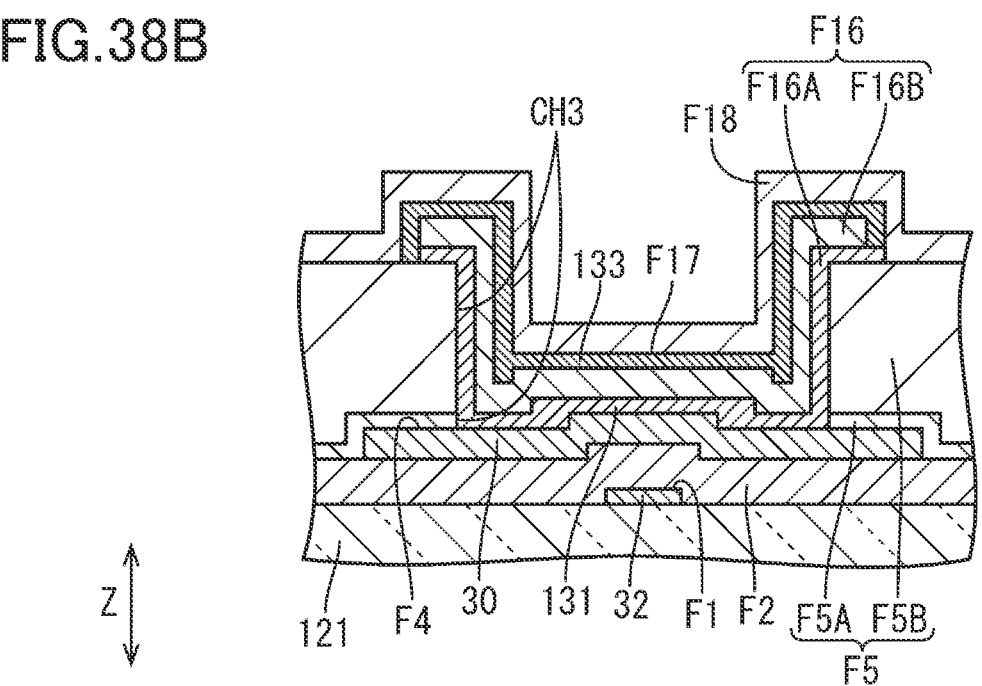
FIG. 38B is a cross-sectional view of the part of the array substrate near the gate circuit unit after the execution of the pixel electrode forming step.
Figure 39A:
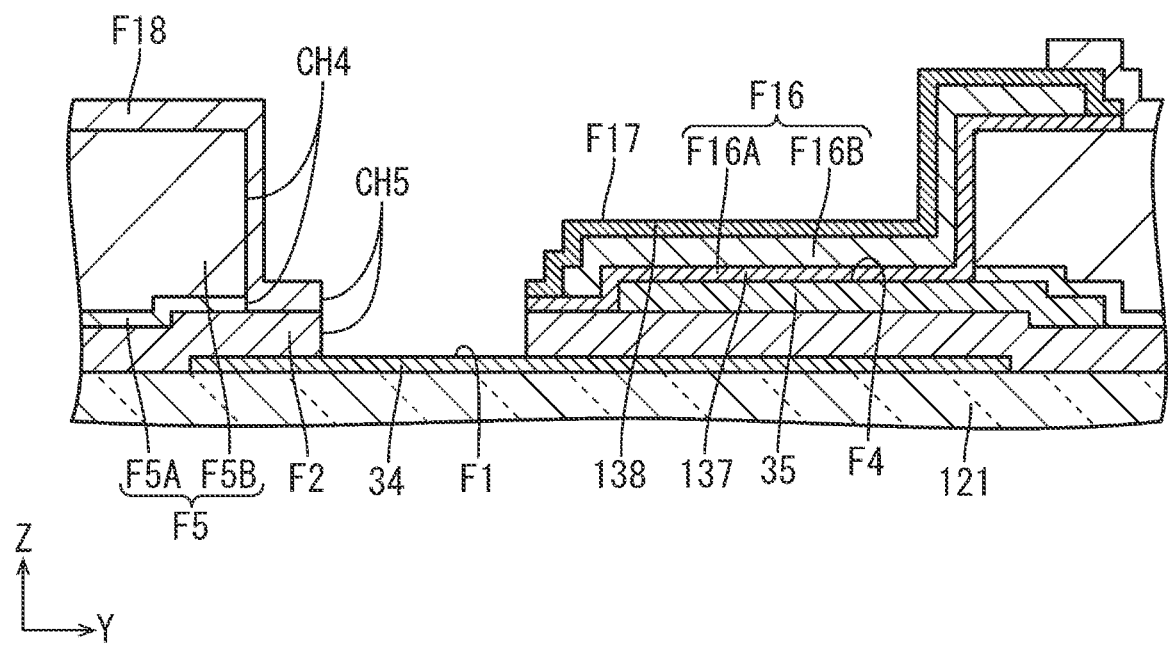
FIG. 39A is a cross-sectional view of the part of the array substrate near the center of the lead wire after the execution of the second insulating film forming step (i.e. a cross-sectional view taken along the line equivalent to line A-A in FIG. 6)
Figure 39B:
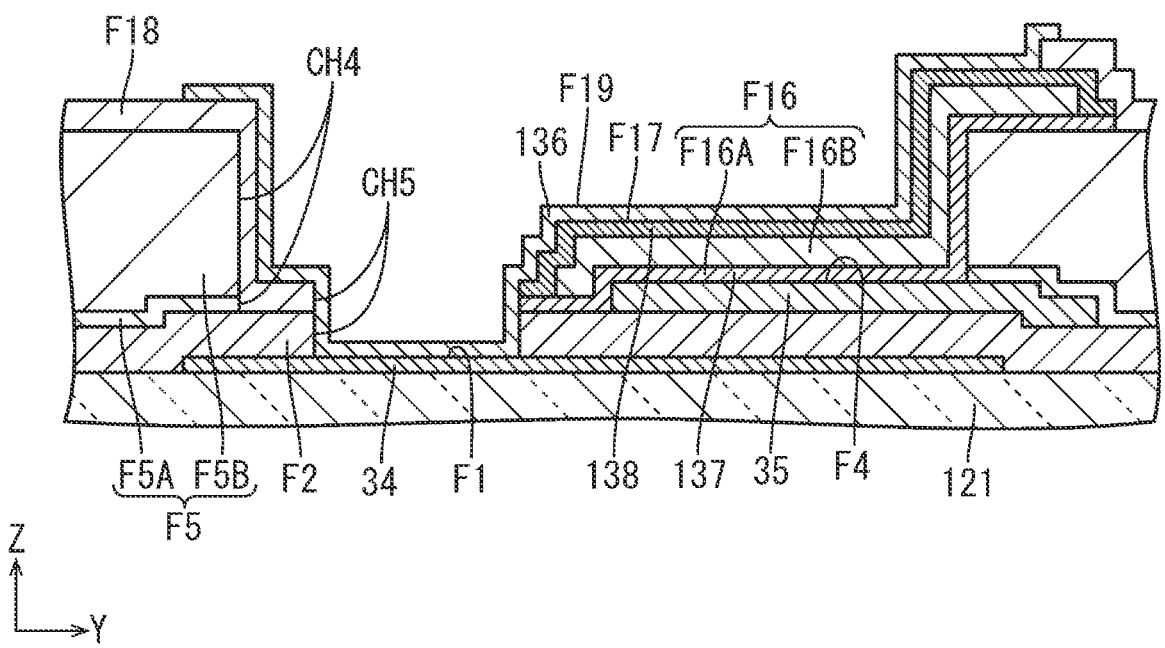
FIG. 39B is a cross-sectional view of the part of the array substrate near the center of the lead wire after the execution of the pixel electrode forming step (i.e. a cross-sectional view taken along the line equivalent to line A-A in FIG. 6)
Figure 40A:
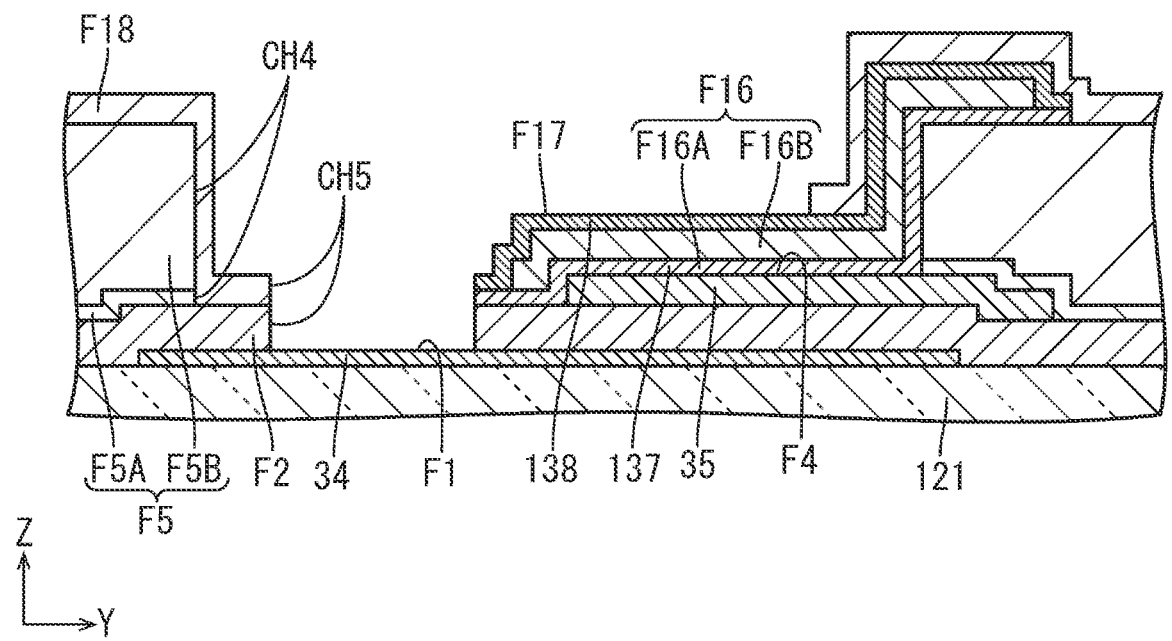
FIG. 40A is a cross-sectional view of the part of the array substrate near the end of the lead wire after the execution of the second insulating film forming step (i.e. a cross-sectional view taken along the line equivalent to line B-B in FIG. 6)
Figure 40B:
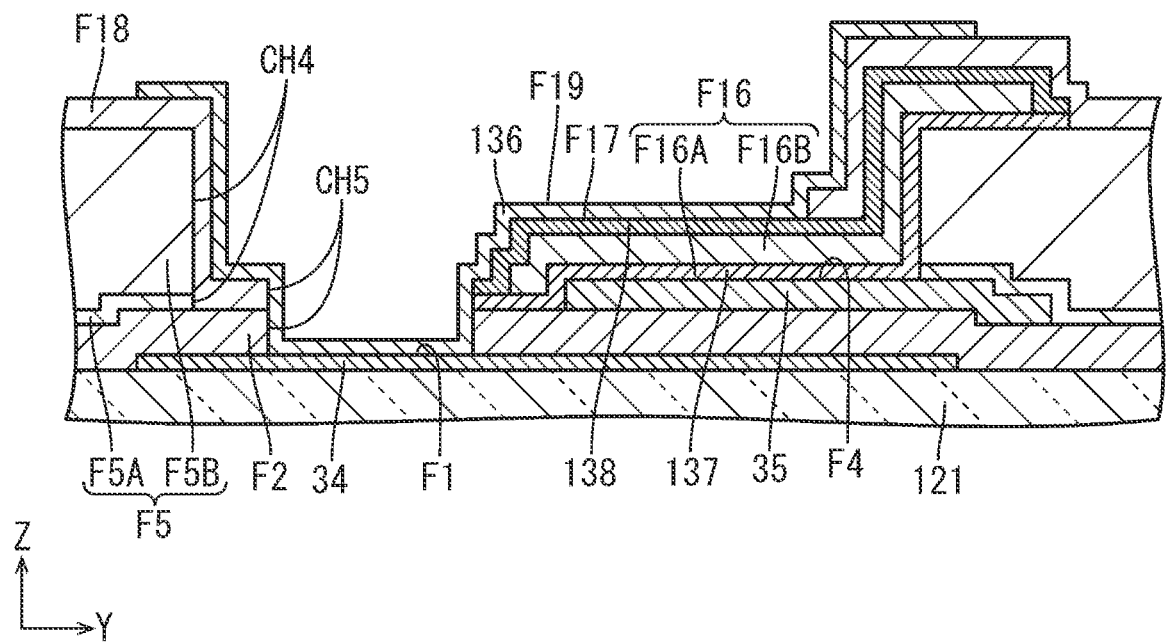
FIG. 40B is a cross-sectional view of the part of the array substrate near the end of the lead wire after the execution of the pixel electrode forming step (i.e. a cross-sectional view taken along the line equivalent to line B-B in FIG. 6)
Figure 41A:
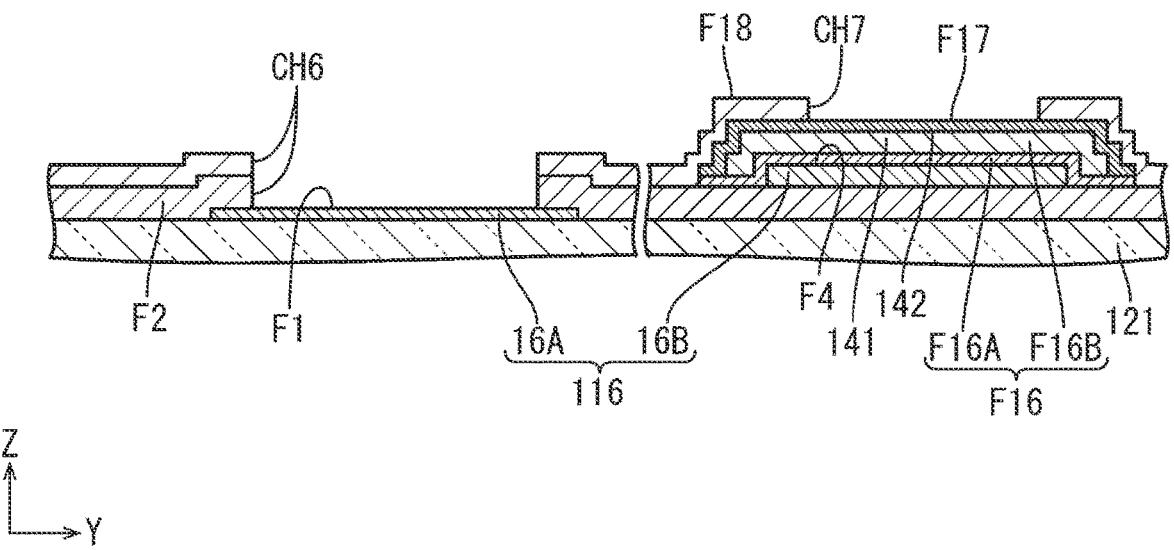
FIG. 41A is a cross-sectional view of the part of the array substrate near the terminal portion after the execution of the second insulating film forming step.
Figure 41B:
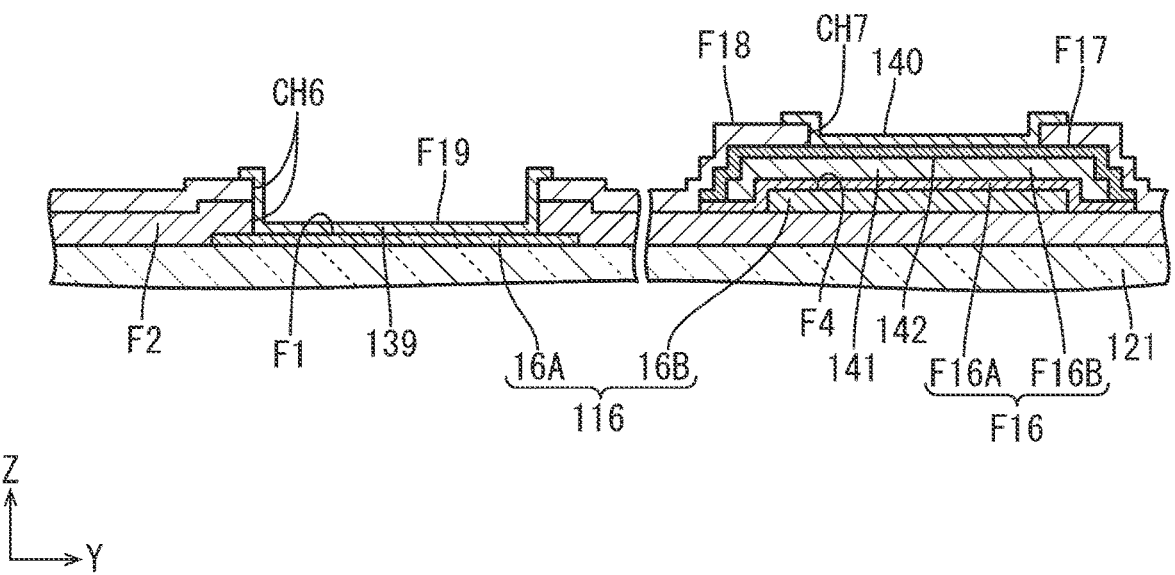
FIG. 41B is a cross-sectional view of the part of the array substrate near the terminal portion after the execution of the pixel electrode forming step.
Figure 42A:
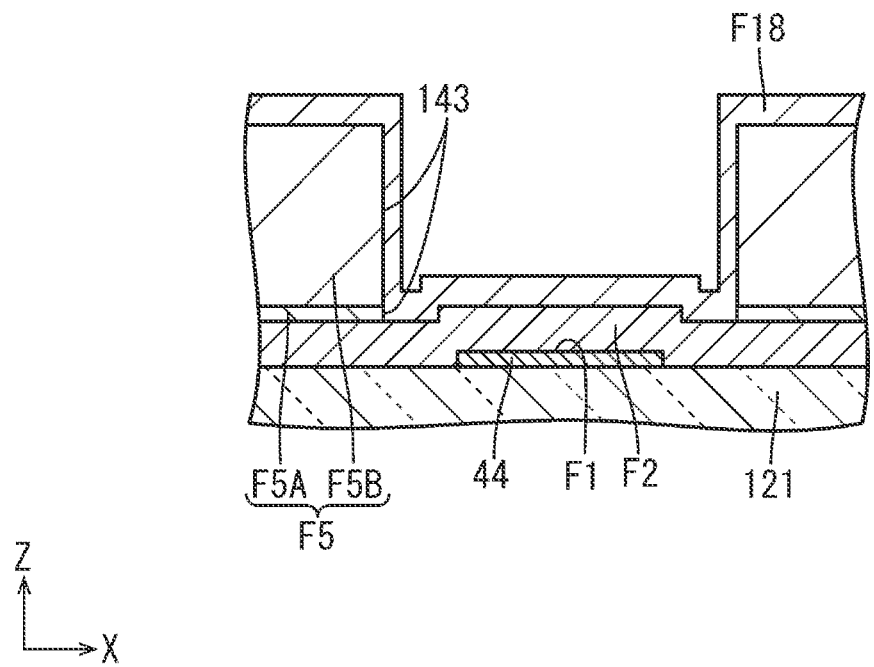
FIG. 42A is a cross-sectional view of the part of the array substrate near the film formation range limiting portion after the execution of the second insulating film forming step (i.e. a cross-sectional view taken along the line equivalent to line C-C in FIG. 11)
Figure 42B:
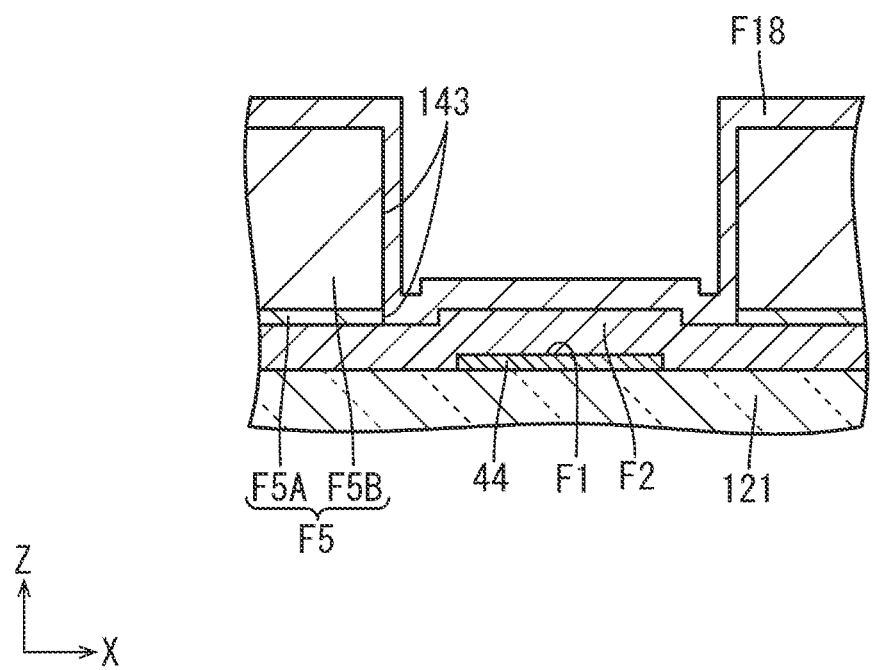
FIG. 42B is a cross-sectional view of the part of the array substrate near the film formation range limiting portion after the execution of the pixel electrode forming step (i.e. a cross-sectional view taken along the line equivalent to line C-C in FIG. 11).

FIG. 37A is a cross-sectional view of the part of the array substrate 121 near the TFT 123 after execution of a second insulating film forming step. FIG. 37B is a cross-sectional view of the part of the array substrate 121 near the TFT 123 after execution of a pixel electrode forming step. FIG. 38A is a cross-sectional view of the part of the array substrate 121 near the gate circuit unit 14 after the execution of the second insulating film forming step. FIG. 38B is a cross-sectional view of the part of the array substrate 121 near the gate circuit unit 14 after the execution of the pixel electrode forming step. FIG. 39A is a cross-sectional view of the part of the array substrate 121 near the center of the lead wire 15 after the execution of the second insulating film forming step (i.e. a cross-sectional view taken along the line equivalent to line A-A in FIG. 6). FIG. 39B is a cross-sectional view of the part of the array substrate 121 near the center of the lead wire 15 after the execution of the pixel electrode forming step (i.e. a cross-sectional view taken along the line equivalent to line A-A in FIG. 6). FIG. 40A is a cross-sectional view of the part of the array substrate 121 near the end of the lead wire 15 after the execution of the second insulating film forming step (i.e. a cross-sectional view taken along the line equivalent to line B-B in FIG. 6). FIG. 40B is a cross-sectional view of the part of the array substrate 121 near the end of the lead wire 15 after the execution of the pixel electrode forming step (i.e. a cross-sectional view taken along the line equivalent to line B-B in FIG. 6). FIG. 41A is a cross-sectional view of the part of the array substrate 121 near the terminal portion 116 after the execution of the second insulating film forming step. FIG. 41B is a cross-sectional view of the part of the array substrate 121 near the terminal portion 116 after the execution of the pixel electrode forming step. FIG. 42A is a cross-sectional view of the part of the array substrate 121 near the film formation range limiting portion 143 after the execution of the second insulating film forming step (i.e. a cross-sectional view taken along the line equivalent to line C-C in FIG. 11). FIG. 42B is a cross-sectional view of the part of the array substrate 121 near the film formation range limiting portion 143 after the execution of the pixel electrode forming step (i.e. a cross-sectional view taken along the line equivalent to line C-C in FIG. 11).

In the common line forming step, a transparent electrode film F16A and a metal film F16B are sequentially and successively formed at a higher layer than the first conducting film F5 to constitute a third conducting film F16. After that, a resist film is applied, and the resist film is patterned by exposing the resist film via a photomask first and then developing the resist film. Then, of the transparent electrode film F16A and the metal film F16B, which constitute the third conducting film F16, the metal film F16B, which is located at a higher layer, is selectively etched via the resist film thus patterned. As a result, only the metal film F16B is patterned, so that as shown in FIG. 31A, a common line 128 and an intermediate electrode 129 are formed. At this point in time, the transparent electrode film F16A has not been patterned yet and is solidly present at a higher layer than the first insulating film F5. Further, as shown in FIG. 32A, a second wire 131 is formed near the gate circuit unit 14. Further, as shown in FIGS. 33A and 34A, a first wire intermediate electrode 137 is formed near the lead wire 15. Further, as shown in FIG. 35A, a terminal intermediate electrode 141 is formed near the terminal formation area TA. Further, as shown in FIG. 36A, the transparent electrode film F16A solidly remains near the area outside the display area AA. After completion of the etching of the third conducting film F16, the resist film is removed.

In the common electrode forming step, a resist film is applied after a fourth conducting film F17 has been formed at a higher layer than the third conducting film F16 or other components, and the resist film is patterned by exposing the resist film via a photomask first and then developing the resist film. Then, the fourth conducting film F17 is etched via the resist film thus patterned. At this point in time, by etching the transparent electrode film F16A, which constitutes the third conducting film F16, in addition to the fourth conducting film F17, the fourth conducting film F17 and the transparent electrode film F16A are patterned into identical patterns. Thus, in the common electrode forming step, the fourth conducting film F17 and the transparent electrode film F16A are patterned together by using the same photomask. In this way, as shown in FIG. 31B, a common electrode 125 is formed. The transparent electrode film F16A is disposed at a lower layer than the common electrode 125 to overlap the common electrode 125, and is electrically connected to the common electrode 125. At this point in time, as shown in FIG. 32B, a wire protecting portion 133 is formed near the gate circuit unit 14. Further, as shown in FIGS. 33B and 34B, a second wire intermediate electrode 138 is formed near the lead wire 15. Further, as shown in FIG. 35B, a secondary terminal protecting portion 142 is formed near the terminal formation area TA. Further, as shown in FIG. 36B, the transparent electrode film F16A is removed and no structure composed of the fourth conducting film F17 is formed near the area outside the display area AA. After completion of the etching of the fourth conducting film F17, the resist film is removed.

In the second insulating film forming step, a resist film is applied after a second insulating film F18 has been formed at a higher layer than the fourth conducting film F17 or other components, and the resist film is patterned by exposing the resist film via a photomask first and then developing the resist film. Then, etching is performed via the resist film thus patterned. At this point in time, the gate insulating film F2 and the second insulating film F18 are patterned by etching the gate insulating film F2 in addition to the second insulating film F18. Then, as shown in FIG. 37A, a second pixel contact hole CH2 is bored through the second insulating film F18 near the TFT 123. At this point in time, as shown in FIG. 38A, the second insulating film F18 is solidly present and covers the wire protecting portion 133 near the gate circuit unit 14. On the other hand, as shown in FIGS. 39A and 40A, a second wire connection contact hole CH5 communicating with the gate insulating film F2 and the second insulating film F18 is bored near the lead wire 15 by etching the gate insulating film F2 together with the second insulating film F18. Further, as shown in FIG. 41A, a lower layer terminal contact hole CH6 and an upper layer terminal contact hole CH7 are bored through the second insulating film F18 near the terminal formation area TA. Further, as shown in FIG. 42A, the second insulating film F18 is solidly present and covers the film formation range limiting groove portion 143 near the area outside the display area AA. After completion of the etching of the gate insulating film F2 and the second insulating film F18, the resist film is removed.

In the pixel electrode forming step, a resist film is applied after a fifth conducting film F19 has been formed at a higher layer than the second insluting film F18 or other components, and the resist film is patterned by exposing the resist film via a photomask first and then developing the resist film. Then, by etching the fifth conducting film F19 via the resist film thus patterned, the fifth conducting film F19 is patterned, so that as shown in FIG. 37B, a pixel electrode 124 is formed. At this point in time, as shown in FIG. 38B, no structure composed of the fifth conducting film F19 is formed near the gate circuit unit 14. Further, as shown in FIGS. 39B and 40B, a wire connection portion 136 is formed near the lead wire 15. Further, as shown in FIG. 41B, a lower layer terminal protecting portion 139 and an upper layer terminal protecting portion 140 are formed near the terminal formation area TA. Further, as shown in FIG. 42B, no structure composed of the fifth conducting film F19 is formed near the area outside the display area AA. After completion of the etching of the fifth conducting film F19, the resist film is removed.

As noted above, although the array substrate 121 has a complex structure, the present embodiment reduces the number of steps involved in manufacturing by using only as many photomasks, i.e. eight photomasks, in the array substrate manufacturing step as does Embodiment 1.

As described above, in the liquid crystal panel 11 according to the present embodiment, the transparent electrode film F16A is disposed to overlap at least the common electrode 125, and is connected to the common electrode 125. In this way, the transparent electrode film F16A, which is one of the conducting films constituting the common line 128, is disposed at a lower layer than the common electrode 125 to overlap the common electrode 125. This is more suitable to reducing a distribution of resistance of the common electrode 125. The transparent electrode film F16A can be patterned by using a photomask that is used for patterning the common electrode 125. This is suitable to reducing the number of photomasks and reducing the number of steps.

As described above, in the method for manufacturing a liquid crystal panel 11 according to the present embodiment, the common line forming step includes forming a transparent electrode film F16A at a higher layer than the first insulating film F5, forming a metal film F16B at a higher layer than the transparent electrode film F16A, and then forming the common line 128 and the intermediate electrode 129 by selectively patterning the metal film F16B, and the common electrode forming step includes forming a fourth conducting film (conducting film) F17 at a higher layer than the metal film F16B and forming the common electrode 125 by patterning the fourth conducting film F17 together with the transparent electrode film F16A disposed at a lower layer than the metal film F16B. In this way, as a result of execution of the common wire forming step, of the transparent electrode film F16A formed at a higher layer than the first insulating film F5 and the metal film F16B formed at a higher layer than the transparent electrode film F16A, the metal film F16B is selectively patterned, so that the common line 128 and the intermediate electrode 129 are formed. Since the transparent electrode film F16A is formed at a higher layer than the first insulating film F5, the common line 128 is kept well adhesive to the first insulating film F5. Since the metal film F16B is formed at a higher layer than the transparent electrode film F16A, an interconnection resistance of the common line 128 is reduced. This is suitable to reducing the distribution of resistance of the common electrode 125. As a result of execution of the common electrode forming step, the fourth conducting film F17 formed at a higher layer than the metal film F16B is patterned, so that the common electrode 125 is formed. In the common electrode forming step, the fourth conducting film F17 formed at a higher layer than the metal film F16B is patterned together with the transparent electrode film F16A disposed at a lower layer than the metal film F16B. As a result, the common line 128 and the intermediate electrode 129, which are laminated structures including the transparent electrode film F16A at a lower layer and the metal film F16B at a higher layer, become electrically independent of each other. Thus, in the common electrode forming step, the transparent electrode film F16A can be patterned by using a photomask that is used for patterning the common electrode 125. This is suitable to reducing the number of photomasks and reducing the number of steps. Moreover, the transparent electrode film F16A is disposed to overlap at least the common electrode 125, and is connected to the common electrode 125. This is more suitable to reducing the distribution of resistance of the common electrode 125.

Other Embodiments

The technology disclosed herein is not limited to the embodiments described with reference to the foregoing description and drawings. For example, embodiments such as those listed below are encompassed in the technical scope.

(1) The wire protecting portions 33 and 133 may be omitted near the gate circuit unit 14.

(2) The lower layer wire 34, which constitutes the lead wire 15, may be connected to the source line 27, and the upper layer wire 35, which constitutes the lead wire 15, may be connected to the terminal portion 16 or 116.

(3) The lower layer wire 34 and the upper layer wire 35, which constitute the lead wire 15, may be disposed not to overlap each other. In that case, too, the wire connection portions 36 and 136 need only be disposed to lie astride the lower layer wire 34 and the upper layer wire 35.

(4) The first wire intermediate electrodes 37 and 137 and the second wire intermediate electrodes 38 and 138 may be omitted.

(5) Specific ranges of formation of the first wire connection contact hole CH4 and the second wire connection contact hole CH5 may be changed as appropriate.

(6) In the terminal formation area TA, the lower layer terminal portion 16A may be disposed at an output side (through which to receive a signal outputted from the driver 12), and the upper layer terminal portion 16B may be disposed at an input side (through which to input a signal to the driver 12).

(7) In the terminal formation area TA, the terminal intermediate electrodes 41 and 141 and the secondary terminal protecting portions 42 and 142 may be omitted.

(8) In the terminal formation area TA, the upper layer terminal protecting portion 40 composed of the fifth conducting film F9 or F19 may be omitted, and the upper layer terminal portion 16B may be protected by the secondary terminal protecting portion 42 composed of the fourth conducting film F7 or F17.

(9) The lower layer terminal protecting portion 39 may be constituted by the fourth conducting film F7 or F17.

(10) The wire 44 may be disposed in a place near the film formation range limiting groove portion 43 or 143 not overlapping the film formation range limiting groove portion 43 or 143. Further, the wire 44 may be omitted.

(11) A terminal portion 16 or 116 may also be present in a mounting area of the flexible substrate 13 as well as the mounting area of the driver 12, and the terminal portions 16 or 116 present in both mounting areas may have a common structure.

(12) The terminal portions 16 or 116 may be arrayed in a staggered arrangement instead of being arrayed in a linear arrangement.

(13) The driver 12 may be mounted on the flexible substrate 13 by COF (chip on film), and the flexible substrate 13 may be mounted on the array substrate 21 or 121 by FOG (film on glass).

(14) The planar shapes of the pixel electrodes 24 and 124 may be horizontally long shapes instead of being vertically long shapes.

(15) The liquid crystal panel 11 may be of a reflective type or a semitransmissive type instead of being of a transmissive type. In a case where the liquid crystal panel 11 is of a reflective type, there is no need for a backlight device.

(16) The liquid crystal panel 11 may be replaced by another type of display panel (such as an organic EL panel, an EPD (microcapsule electrophoretic display panel), or a MEMS (microelectromechanical system) display panel).

The present disclosure contains subject matter related to that disclosed in Japanese Priority Patent Application JP 2020-082075 filed in the Japan Patent Office on May 7, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
   a switching element having a pixel connection portion;
   a first insulating film, disposed at a higher layer than the pixel connection portion, that has a first pixel contact hole formed therein so as to be in a place overlapping at least a part of the pixel connection portion;
   a common line disposed at a higher layer than the first insulating film;
   an intermediate electrode composed of a conducting film which is identical to that of which the common line is composed, disposed to overlap the first pixel contact hole, and connected to the pixel connection portion;
   a common electrode disposed at a higher layer than the common line, not connected to the intermediate electrode, and connected to the common line;
   a second insulating film, disposed at a higher layer than the common electrode, that has a second pixel contact hole formed therein so as to be in a place overlapping at least a part of the intermediate electrode; and
   a pixel electrode disposed at a higher layer than the second insulating film and disposed so that at least a part of the pixel electrode overlaps the second pixel contact hole.

2. The display device according to claim 1, further comprising:
   a first wire composed of a conducting film which is identical to that of which the pixel connection portion is composed; and
   a second wire composed of the conducting film which is identical to that of which the common line is composed, the second wire being disposed so that at least a part of the second wire overlaps the first wire,
   wherein the first insulating film has an inter-wire contact hole formed therein so as to be in a place overlapping the first wire and the second wire.

3. The display device according to claim 2, further comprising a wire protecting portion composed of a conducting film which is identical to that of which the common electrode is composed, the wire protecting portion being disposed to overlap at least a part of the second wire.

4. The display device according to claim 1, further comprising:
   a lower layer insulating film disposed at a lower layer than the pixel connection portion;
   a lower layer wire disposed at a lower layer than the lower layer insulating film;
   an upper layer wire composed of a conducting film which is identical to that of which the pixel connection portion is composed; and
   a wire connection portion composed of a conducting film which is identical to that of which the pixel electrode is composed, the wire connection portion being disposed so that at least a part of the wire connection portion overlaps the lower layer wire and the upper layer wire,
   wherein
   the first insulating film has a first wire connection contact hole formed therein so as to be in a place overlapping at least a part of the wire connection portion, and
   the lower layer insulating film and the second insulating film have a second wire connection contact hole formed therein so as to be in a place overlapping the lower layer wire and at least a part of the first wire connection contact hole but not overlapping the upper layer wire.

5. The display device according to claim 4, further comprising a wire intermediate electrode composed of the conducting film which is identical to that of which the common line is composed, the wire intermediate electrode being disposed to overlap the first wire connection contact hole but not to overlap the second wire connection contact hole in the lower layer insulating film.

6. The display device according to claim 5, further comprising a secondary wire intermediate electrode composed of a conducting film which is identical to that of which the common electrode is composed, the secondary wire intermediate electrode being disposed to overlap the wire intermediate electrode.

7. The display device according to claim 1, further comprising:
   a display area in which at least the common electrode and the pixel electrode are disposed and in which an image is displayed; and
   an alignment film disposed in at least the display area at a higher layer than the pixel electrode,
   wherein the first insulating film has a film formation range limiting groove portion, formed in a place located in an area outside the display area, that limits a film formation range of the alignment film.

8. The display device according to claim 1, further comprising:
- a terminal portion disposed in a terminal formation area not overlapping the common electrode or the pixel electrode and composed of a conducting film which is identical to that of which the pixel connection portion is composed; and
- a terminal protecting portion composed a conducting film which is identical to that of which the pixel electrode is composed, the terminal protecting portion being disposed to overlap the terminal portion, wherein the first insulating film is not formed in the terminal formation area, and the second insulating film has a terminal contact hole formed therein so as to be in a place overlapping the terminal portion and the terminal protecting portion.

9. The display device according to claim 8, further comprising a terminal intermediate electrode composed of the conducting film which is identical to that of which the common line is composed, the terminal intermediate electrode being disposed to overlap the terminal portion.

10. The display device according to claim 8, further comprising a secondary terminal protecting portion composed of a conducting film which is identical to that of which the common electrode is composed, the secondary terminal protecting portion being disposed to overlap the terminal portion and the terminal protecting portion.

11. The display device according to claim 1, further comprising:
- a lower layer insulating film disposed at a lower layer than the pixel connection portion;
- a lower layer terminal portion disposed in a terminal formation area not overlapping the common electrode or the pixel electrode and disposed at a lower layer than the lower layer insulating film; and
- a lower layer terminal protecting portion composed of a conducting film which is identical to that of which the pixel electrode is composed, the lower layer terminal protecting portion being disposed to overlap the lower layer terminal portion, wherein the first insulating film is not formed in the terminal formation area, and the lower layer insulating film and the second insulating film have a lower layer terminal contact hole formed therein so as to be in a place overlapping the lower layer terminal portion and the lower layer terminal protecting portion.

12. The display device according to claim 1, wherein the common line is constituted by a conducting film having a laminated structure including a transparent electrode film at a lower layer and a metal film at a higher layer.

13. The display device according to claim 12, wherein the transparent electrode film is disposed to overlap at least the common electrode, and is connected to the common electrode.

14. A method for manufacturing a display device, the method comprising:
- forming a pixel connection portion of a switching element;
- forming a first insulating film at a higher layer than the pixel connection portion and forming a first pixel contact hole in a place in the first insulating film overlapping the pixel connection portion;
- forming a common line at a higher layer than the first insulating film and forming an intermediate electrode disposed to overlap the first pixel contact hole and composed of a conducting film which is identical to that of which the common line is composed;
- forming, at a higher layer than the common line, a common electrode that is not connected to the intermediate electrode but is connected to the common line;
- forming a second insulating film at a higher layer than the common electrode and forming a second pixel contact hole in a place in the second insulating film overlapping at least a part of the intermediate electrode; and
- forming a pixel electrode at a higher layer than the second insulating film so that at least a part of the pixel electrode overlaps the second pixel contact hole.

15. The method according to claim 14, wherein the forming of the common line includes forming a transparent electrode film at a higher layer than the first insulating film, forming a metal film at a higher layer than the transparent electrode film, and then forming the common line and the intermediate electrode by selectively patterning the metal film, and the forming of the common electrode includes forming a conducting film at a higher layer than the metal film and forming the common electrode by patterning the conducting film together with the transparent electrode film disposed at a lower layer than the metal film.

* * * * *